(12) United States Patent
Itoi

(10) Patent No.: US 10,885,688 B2
(45) Date of Patent: Jan. 5, 2021

(54) COMPUTER READABLE MEDIA, INFORMATION PROCESSING APPARATUS AND INFORMATION PROCESSING METHOD

(71) Applicant: HOBONICHI CO., LTD., Tokyo (JP)

(72) Inventor: Shigesato Itoi, Tokyo (JP)

(73) Assignee: HOBONICHI CO., LTD., Tokyo (JP)

( * ) Notice: Subject to any disclaimer, the term of this patent is extended or adjusted under 35 U.S.C. 154(b) by 22 days.

(21) Appl. No.: 16/013,604

(22) Filed: Jun. 20, 2018

(65) Prior Publication Data
US 2019/0221019 A1 Jul. 18, 2019

(30) Foreign Application Priority Data
Jan. 18, 2018 (JP) ................................ 2018-006763

(51) Int. Cl.
| | | |
|---|---|---|
| G06T 11/60 | (2006.01) | |
| G06F 3/14 | (2006.01) | |
| H04L 29/08 | (2006.01) | |
| G06F 3/147 | (2006.01) | |
| G06F 3/0488 | (2013.01) | |
| H04L 29/06 | (2006.01) | |

(Continued)

(52) U.S. Cl.
CPC .......... *G06T 11/60* (2013.01); *G06F 3/04886* (2013.01); *G06F 3/14* (2013.01); *G06F 3/147* (2013.01); *H04L 67/18* (2013.01); *G06F 3/0482* (2013.01); *G06F 3/0486* (2013.01); *G06F 3/0488* (2013.01); *G09G 2354/00* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 10,140,739 B1* | 11/2018 | Burgin | G06F 16/00 |
| 2003/0052896 A1* | 3/2003 | Higgins | G06T 17/05 |
| | | | 345/619 |

(Continued)

FOREIGN PATENT DOCUMENTS

| | | | |
|---|---|---|---|
| JP | 2005-284882 A | 10/2005 | |
| JP | 2013-92407 A | 5/2013 | |

(Continued)

OTHER PUBLICATIONS

Nishihata et al, English translation of JP 2005284882 A, Oct. 13, 2005.*

(Continued)

*Primary Examiner* — Sultana M Zalalee
(74) *Attorney, Agent, or Firm* — Bret E. Field; Bozicevic, Field & Francis LLP

(57) ABSTRACT

An object of the present disclosure is to provide a program enabling a user to freely set a content. An information processing program causes a computer to execute processing for: accepting selection of a display image to be displayed in a superimposed manner on a photographed image of a sphere having a marker on a surface thereof; obtaining location information corresponding to the display image; and transmitting the accepted display image and the obtained location information in association with a user ID. Thus, each user can freely set a content.

20 Claims, 50 Drawing Sheets

(51) Int. Cl.
*G06F 3/0486* (2013.01)
*G06F 3/0482* (2013.01)

(56) References Cited

U.S. PATENT DOCUMENTS

| | | | | |
|---|---|---|---|---|
| 2004/0064338 | A1* | 4/2004 | Shiota | H04N 1/00132 |
| | | | | 705/1.1 |
| 2004/0070602 | A1* | 4/2004 | Kobuya | G01C 21/36 |
| | | | | 715/738 |
| 2004/0076311 | A1* | 4/2004 | Miki | G06T 7/20 |
| | | | | 382/107 |
| 2004/0145602 | A1* | 7/2004 | Sun | G06F 16/58 |
| | | | | 715/720 |
| 2006/0181546 | A1* | 8/2006 | Jung | G01C 21/3667 |
| | | | | 345/619 |
| 2007/0244634 | A1* | 10/2007 | Koch | G01C 21/00 |
| 2009/0111434 | A1* | 4/2009 | Yu | H04L 51/14 |
| | | | | 455/414.1 |
| 2009/0245691 | A1* | 10/2009 | Naimark | G06T 19/006 |
| | | | | 382/285 |
| 2010/0074555 | A1* | 3/2010 | Diaz | G06K 9/00637 |
| | | | | 382/284 |
| 2010/0184451 | A1* | 7/2010 | Wang | H04L 67/18 |
| | | | | 455/456.1 |
| 2011/0187741 | A1* | 8/2011 | Akiya | G09B 29/10 |
| | | | | 345/625 |
| 2011/0199286 | A1* | 8/2011 | Dziama | G09B 27/06 |
| | | | | 345/82 |
| 2012/0195506 | A1* | 8/2012 | Kim | G06Q 10/00 |
| | | | | 382/195 |
| 2013/0314402 | A1* | 11/2013 | Furumura | G06T 15/205 |
| | | | | 345/419 |
| 2014/0040774 | A1* | 2/2014 | Charytoniuk | G06F 16/58 |
| | | | | 715/753 |
| 2014/0078183 | A1* | 3/2014 | Watson | G06T 3/40 |
| | | | | 345/667 |
| 2014/0160251 | A1* | 6/2014 | Halamish | G06T 19/006 |
| | | | | 348/47 |
| 2014/0229862 | A1 | 8/2014 | St. Clair | |
| 2014/0267226 | A1* | 9/2014 | Yoon | G06T 11/206 |
| | | | | 345/419 |
| 2015/0077435 | A1* | 3/2015 | Koga | G06T 19/006 |
| | | | | 345/633 |
| 2015/0153934 | A1* | 6/2015 | Zherebtsov | G06F 16/00 |
| | | | | 715/810 |
| 2015/0212595 | A1* | 7/2015 | Liu | G06F 3/0321 |
| | | | | 345/156 |
| 2015/0235397 | A1* | 8/2015 | Beckman | G06T 11/206 |
| | | | | 345/440 |
| 2017/0004651 | A1 | 1/2017 | Xiong | |
| 2017/0289287 | A1* | 10/2017 | Modi | G06F 16/951 |
| 2018/0061011 | A1* | 3/2018 | Kim | G06T 7/30 |
| 2018/0181358 | A1* | 6/2018 | Asai | G06T 11/60 |
| 2018/0343388 | A1* | 11/2018 | Matsushita | H04N 5/23238 |
| 2019/0147631 | A1* | 5/2019 | Itoi | G06K 9/00671 |
| | | | | 345/633 |

FOREIGN PATENT DOCUMENTS

| | | | |
|---|---|---|---|
| JP | 2013140547 A | * | 7/2013 |
| JP | 2013-161103 A | | 8/2013 |
| JP | 2015-090664 A | | 5/2015 |
| JP | 2016-517054 A | | 6/2016 |
| JP | 2017-117082 A | | 6/2017 |
| JP | 2017-522682 A | | 8/2017 |
| KR | 10-2010-0022428 A | | 3/2010 |
| WO | WO2014126949 A1 | | 8/2014 |

OTHER PUBLICATIONS

Sato, Educational AR globe "Orboot" which is a perfect gift to celebrate kids' entrance into school—Images pop up on the earth, [online] CNTET Japan, Mar. 3, 2017, [searched on May 2, 2018], https://japan.cnet.com/article/35097547/; English translation enclosed.

Extended European Search Report for European Application No. 18800458.4 dated Jan. 23, 2020, 13 pages.

Ahn et al., Webizing mobile augmented reality content, New Review of Hypermedia and Multimedia, 2014, vol. 20, No. 1, 79-100.

Notification of Reason for Refusal for Korean Application No. 10-2018-7032327 dated Mar. 5, 2020, with its English translation, 18 pages.

PlayShifu, "Shifu Orboot—An Astonishing Journey Around the World" from YouTube, https://www.youtube.com/watch?v=5IvPBd9gw1w, accessed Feb. 24, 2017.

* cited by examiner

F I G. 2
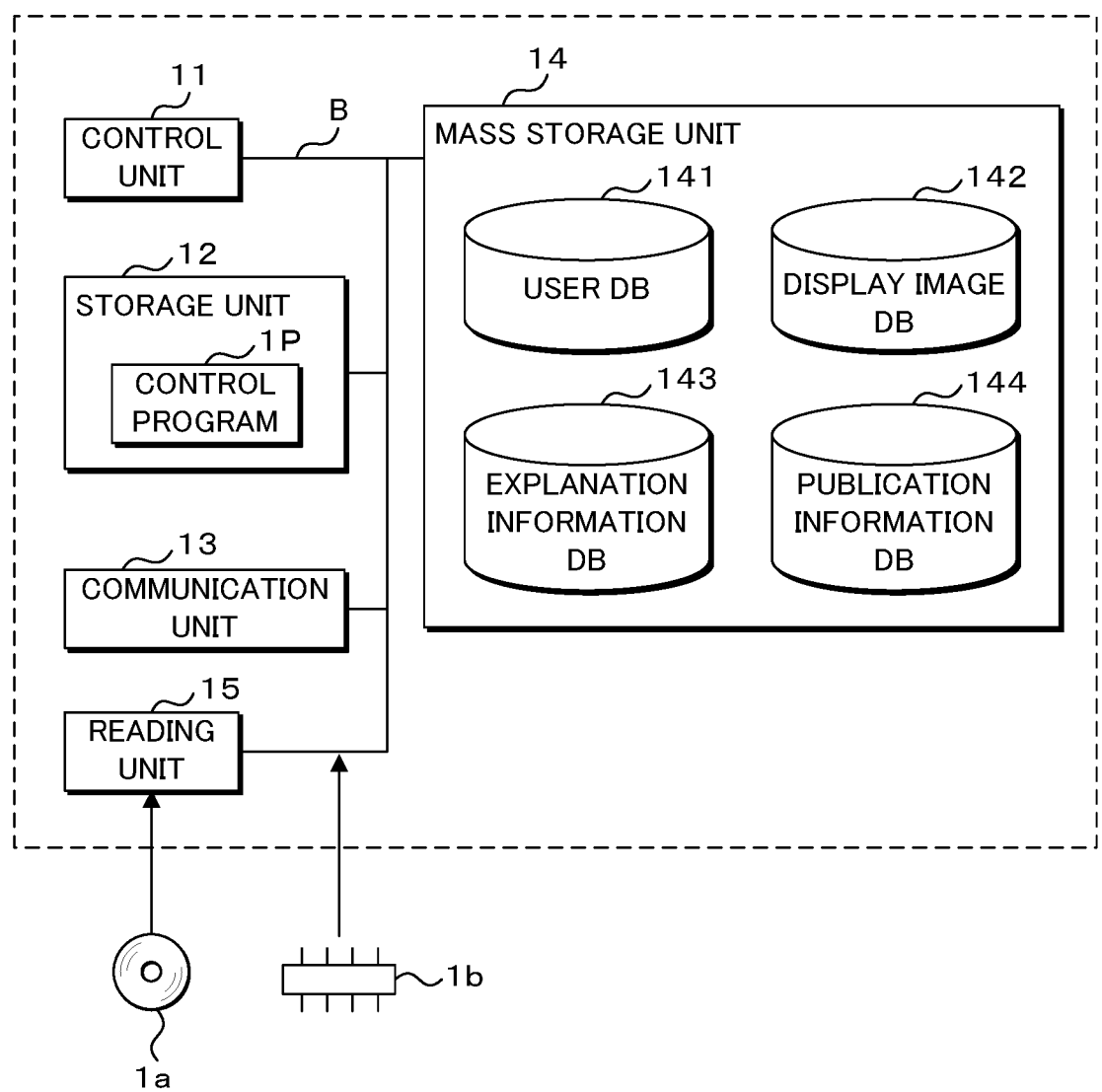

FIG. 3

| USER ID | USER RANK | IMAGE ID | LOCATION (LONGITUDE, LATITUDE) |
|---|---|---|---|
| u1 | REGULAR | p1 | (35.676795,139.737269) |
| u2 | SILVER | p2 | (67.676355,89.737567) |
| u3 | GOLD | p3 | (105.676701,101.732349) |

FIG. 4

| IMAGE ID | TYPE | IMAGE | EXPLANATION INFORMATION ID | PUBLICATION INFORMATION ID |
|---|---|---|---|---|
| p1 | STILL IMAGE | photo1.jpg | d1 | p1 |
| p2 | MOVIE | movie1.mp4 | d2 | p2 |
| p3 | STILL IMAGE | photo2.jpg | d3 | p31 |
| p4 | STILL IMAGE | photo3.jpg | d4 | p32 |
| p5 | THREE-DIMENSIONAL IMAGE | 3d_image1.jpg | d5 | p1 |

F I G. 5

| EXPLANATION INFORMATION ID | TYPE | EXPLANATION INFORMATION |
|---|---|---|
| d1 | TEXT | You can see the inside of Hawaii Farm and experience roasting coffee beans. It is a beautiful recommended place where you can have valuable experiences that make you like coffee more. When you visit Hawaii Island, please come to our farm. We are waiting for your visit. |
| d2 | SPEECH | voice1.mp3 |
| d3 | TEXT | Hint: Go to the sea and search! |
| d4 | TEXT | Congratulations! You won the treasure! |
| d5 | TEXT | http://www.description.com |

FIG. 6

| PUBLICATION INFORMATION ID | TYPE | PUBLICATION RANGE |
|---|---|---|
| p1 | OPEN | ALL |
| p2 | NOT OPEN | – |
| p31 | PARTLY OPEN | REGULAR |
| p32 | | SILVER |
| p33 | | GOLD |

F I G. 7
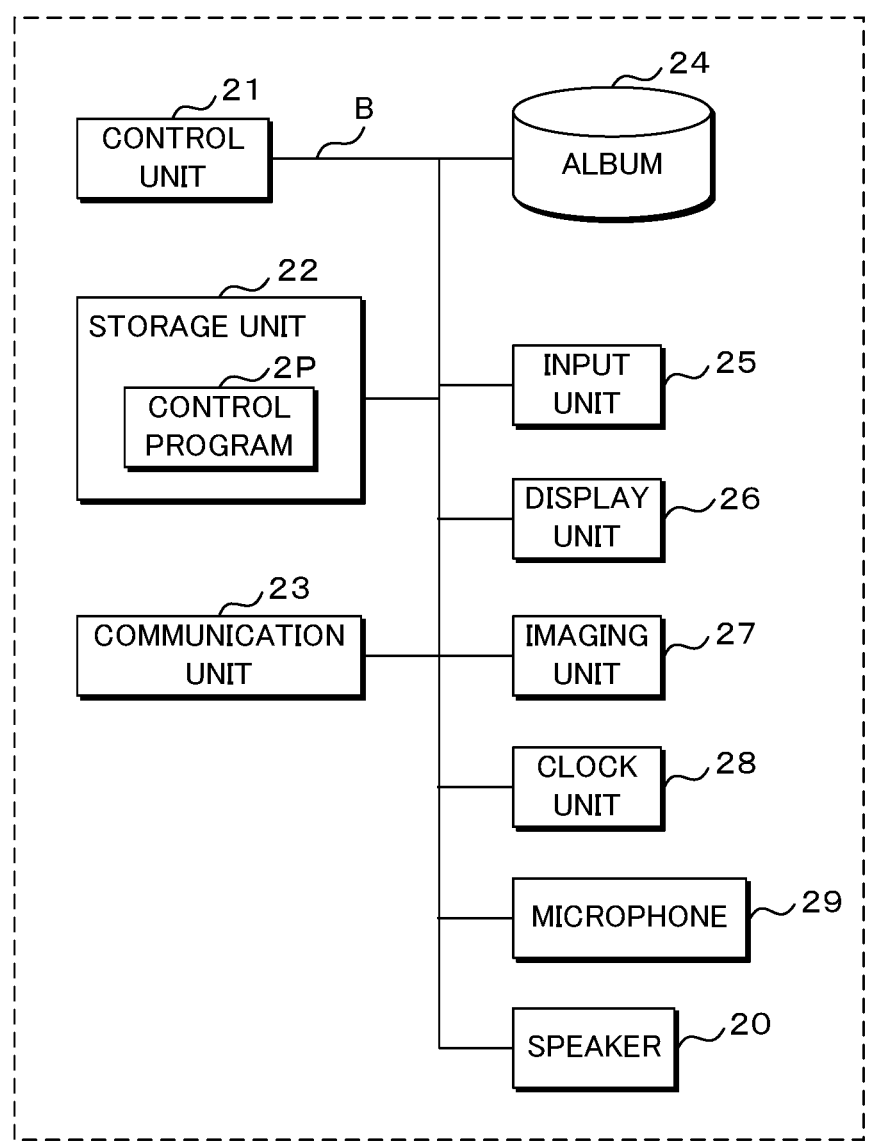

FIG. 23
A 
B 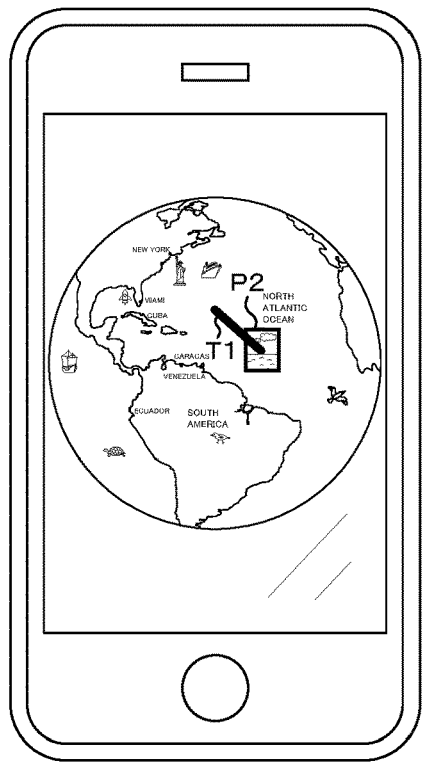
5 SECONDS ELAPSED
5 SECONDS ELAPSED
D 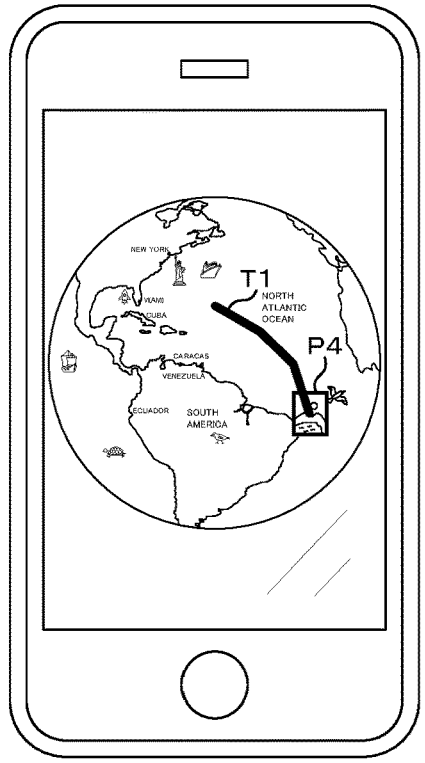
C 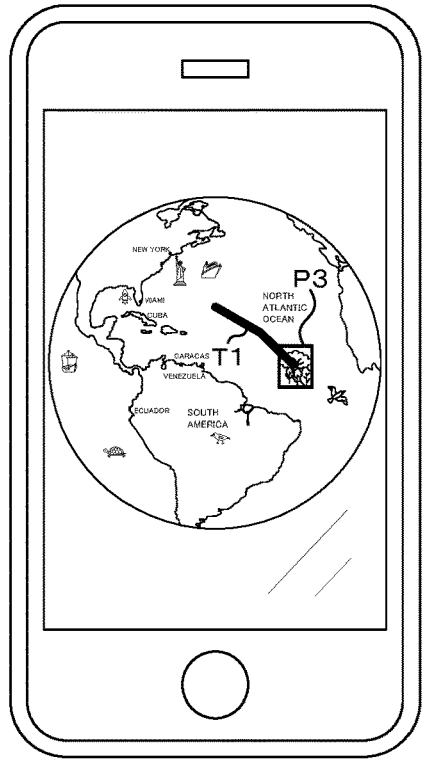
5 SECONDS ELAPSED

F I G. 2 6

| USER ID | USER RANK | IMAGE ID | MUSIC ID | LOCATION (LONGITUDE, LATITUDE) |
|---|---|---|---|---|
| u1 | REGULAR | p1 | m1 | (35.676795,139.737269) |
| u2 | SILVER | p3 | m2 | (67.676355,89.737567) |
| u3 | GOLD | p4 | m3 | (105.676701,101.732349) |

F I G. 2 7

| MUSIC ID | MUSIC |
|---|---|
| m1 | music1.mp3 |
| m2 | music2.mp3 |
| m3 | music3.mp3 |

FIG. 28
A
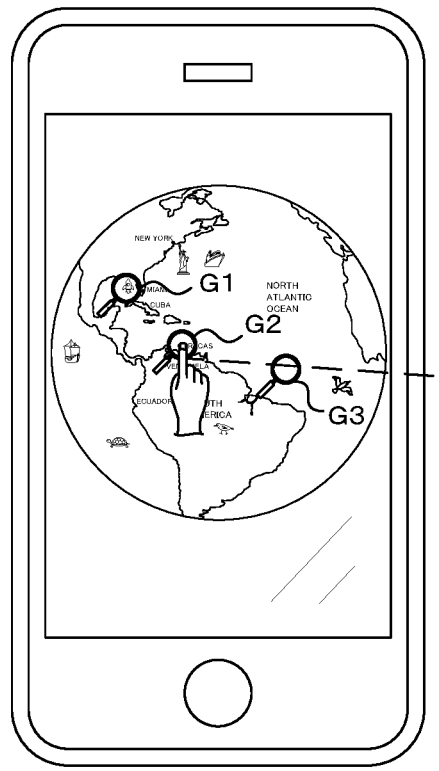
B
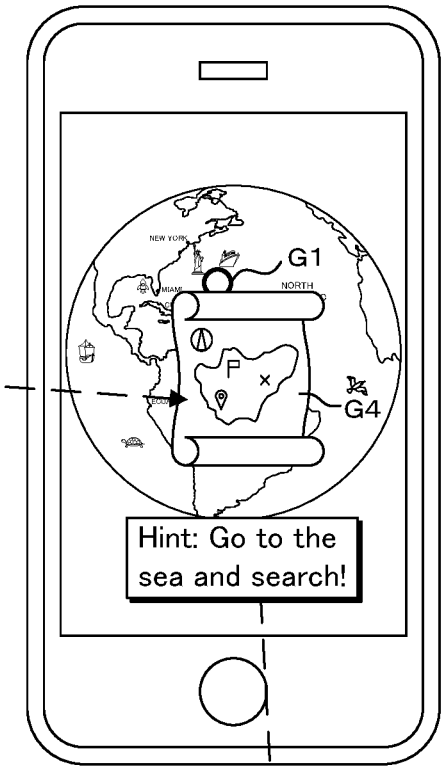
D
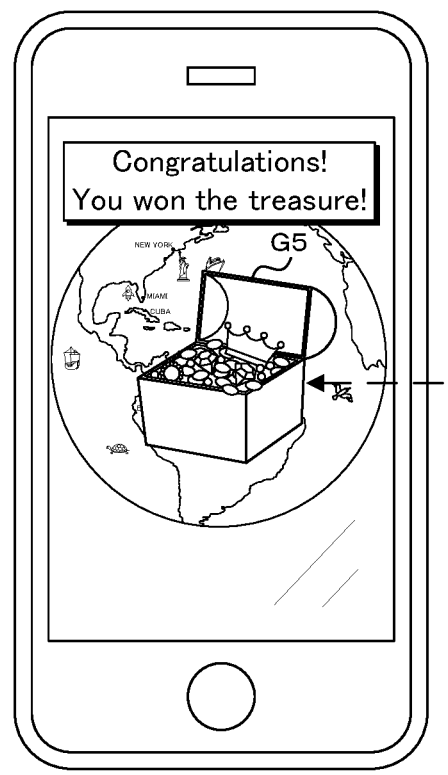
C
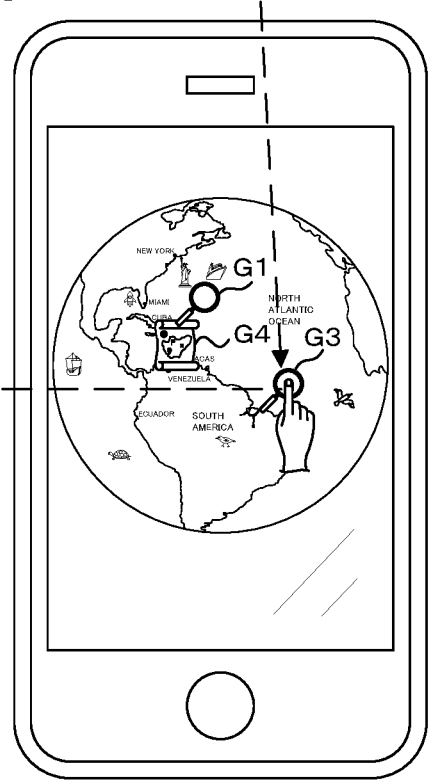

F I G. 3 3

| SPHERE ID | USER ID | USER RANK | IMAGE ID | LOCATION (LONGITUDE, LATITUDE) |
|---|---|---|---|---|
| g1 | u1 | REGULAR | p1 | (35.676795,139.737269) |
| g2 | u2 | SILVER | p2 | (67.676355,89.737567) |
| g2 | u3 | GOLD | p3 | (105.676701,101.732349) |

F I G. 3 4

| SPHERE ID | MAKER | SIZE | LANGUAGE |
|---|---|---|---|
| g1 | MAKER A | MEDIUM | JAPANESE |
| g2 | MAKER B | SMALL | ENGLISH |

F I G. 3 5
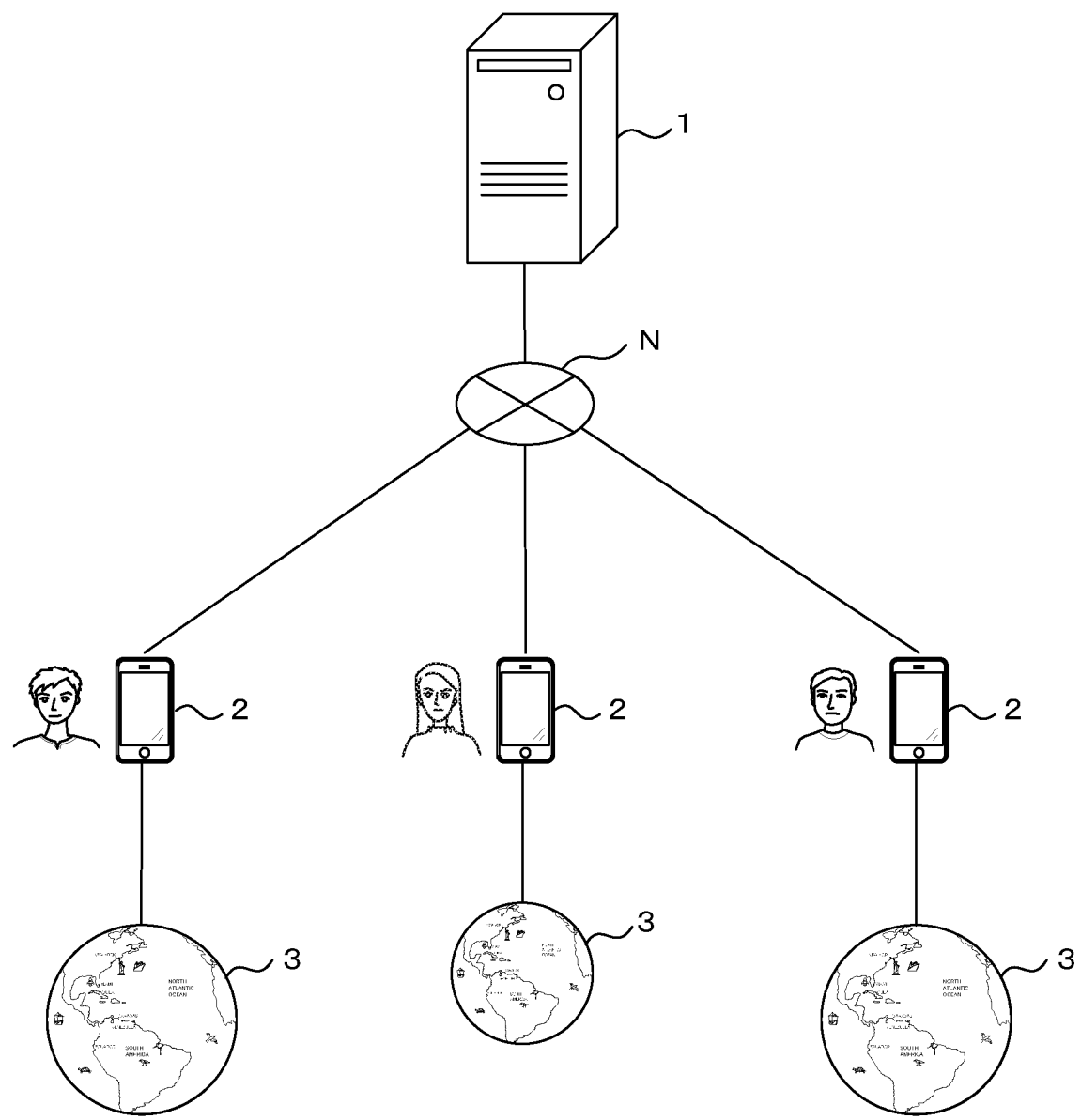

F I G. 3 8
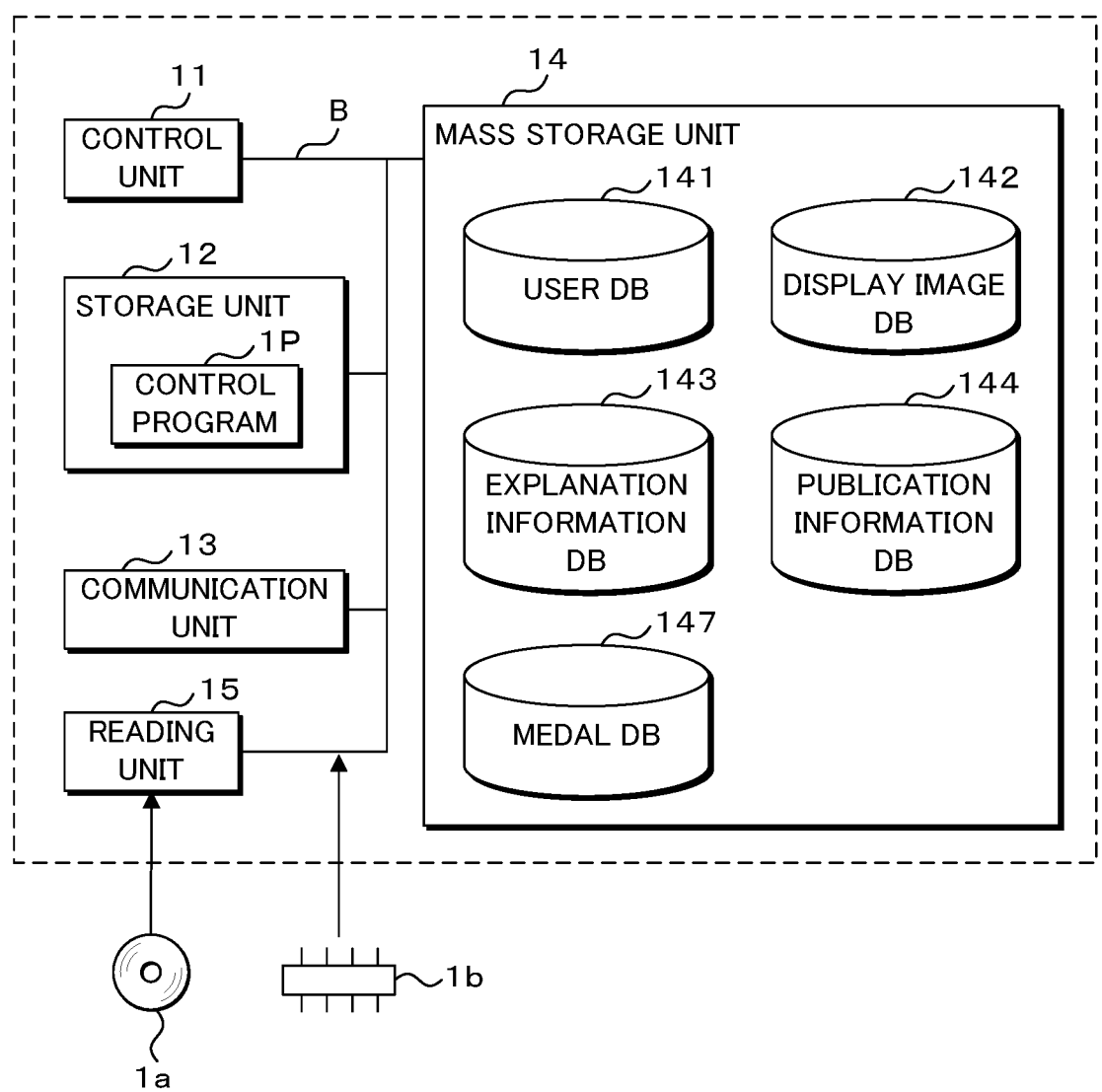

F I G. 39

| IMAGE ID | TYPE | IMAGE | EXPLANATION INFORMATION ID | PUBLICATION INFORMATION ID |
|---|---|---|---|---|
| p6 | THREE-DIMENSIONAL IMAGE | medal.png | d6 | p1 |
| p7 | STILL IMAGE | pct1.jpg | d7 | p1 |
| p8 | STILL IMAGE | pct2.jpg | d8 | p1 |
| p9 | STILL IMAGE | pct3.jpg | d9 | p1 |
| p10 | STILL IMAGE | pct4.jpg | d10 | p1 |

F I G. 4 0

| COUNTRY | | MEDAL | | | |147|
|---|---|---|---|---|---|
| NAME | IMAGE ID1 | GOLD | SILVER | BRONZE | IMAGE ID2 |
| JAPAN | p7 | 3 | 4 | 5 | p6 |
| CHINA | p8 | 3 | 4 | 5 | |
| KOREA | p9 | 2 | 4 | 6 | |
| UNITED STATES | p10 | 3 | 4 | 6 | |

F I G. 4 6

| EXPLANATION INFORMATION ID | TYPE | EXPLANATION INFORMATION |
|---|---|---|
| d6 | TEXT | Olympic medals! |
| d7 | TEXT | http://www.sports.japanInfo.co.jp |
| d8 | TEXT | http://www.sports.chinaInfo.co.jp |
| d9 | TEXT | http://www.sports.koreaInfo.co.jp |
| d10 | TEXT | http://www.sports.usaInfo.co.jp |

143

COMPUTER READABLE MEDIA, INFORMATION PROCESSING APPARATUS AND INFORMATION PROCESSING METHOD

This non-provisional application claims priority under 35 U.S.C. § 119(a) on Patent Application No. 2018-006763 filed in Japan on Jan. 18, 2018 the entire contents of which are hereby incorporated by reference.

FIELD

The present invention relates to a computer readable media, an information processing apparatus and an information processing method.

BACKGROUND

In recent years, products using an AR (Augmented Reality) system have been developed. In the AR system, an application program for recognizing an AR marker is precedently installed in information equipment including a camera and a display unit, such as a smartphone, a tablet terminal and a portable game machine.

When an image of a subject provided with an AR marker is photographed by using such information equipment, the information equipment recognizes the AR marker and displays a content corresponding to the recognized AR marker to be superimposed on the photographed image. Thus, a user can see, in the display unit, an image in which the content is superimposed on the photographed subject. Japanese Patent Application Laid-Open Publication No. 2013-92407 discloses a system in which a three-dimensional object is photographed and additional information of an image, letters or the like is displayed to be superimposed on the three-dimensional object in the photographed image.

SUMMARY

The convention technique has, however, a problem that contents to be displayed in a superimposed manner on a photographed image of a subject are limited to those unilaterally provided by a trader.

The present invention was devised in consideration of these circumstances, and an object is to provide a program and the like enabling a user to freely set a content.

A computer readable media including program instruction according to an aspect of the present disclosure cause a computer to execute processing for: accepting selection of a display image to be displayed in a superimposed manner on a photographed image of a sphere having a marker on a surface thereof; obtaining location information corresponding to the display image; and transmitting the accepted display image and the obtained location information in association with a user ID.

According to an aspect of the present disclosure, a program and the like enabling a user to freely set a content can be provided.

The above and further objects and features will more fully be apparent from the following detailed description with accompanying drawings.

BRIEF DESCRIPTION OF THE DRAWINGS

FIG. 2 is a block diagram illustrating a structure example of a server of Embodiment 1.

FIG. 3 is an explanatory diagram illustrating an example of a record layout of a user DB of Embodiment 1.

FIG. 4 is an explanatory diagram illustrating an example of a record layout of a display image DB.

FIG. 5 is an explanatory diagram illustrating an example of a record layout of an explanation information DB.

FIG. 6 is an explanatory diagram illustrating an example of a record layer of a publication information DB.

FIG. 7 is a block diagram illustrating a structure example of a terminal.

FIG. 23 is an explanation diagram used for explaining an operation including route information performed by the terminal of Embodiment 2.

FIG. 26 is an explanatory diagram illustrating an example of a record layout of a user DB of Embodiment 3.

FIG. 27 is an explanatory diagram illustrating an example of a record layout of a music DB.

FIG. 28 is an explanatory diagram used for explaining an operation of an AR system of Embodiment 3.

FIG. 33 is an explanatory diagram illustrating an example of a record layout of a user DB of Embodiment 4.

FIG. 34 is an explanatory diagram illustrating an example of a record layout of a sphere DB.

FIG. 35 is an explanatory diagram used for explaining an operation of an AR system of Embodiment 4.

FIG. 38 is a block diagram illustrating a structure example of a server of Embodiment 5.

FIG. 39 is an explanatory diagram illustrating an example of a record layout of a display image DB of Embodiment 5.

FIG. 40 is an explanatory diagram illustrating an example of a record layout of a medal DB.

FIG. 46 is an explanatory diagram illustrating an example of a record layout of an explanation information DB of Embodiment 5.

DETAILED DESCRIPTION

The present disclosure will now be described in detail with reference to accompanying drawings illustrating embodiments thereof.

Embodiment 1

Figure 1:
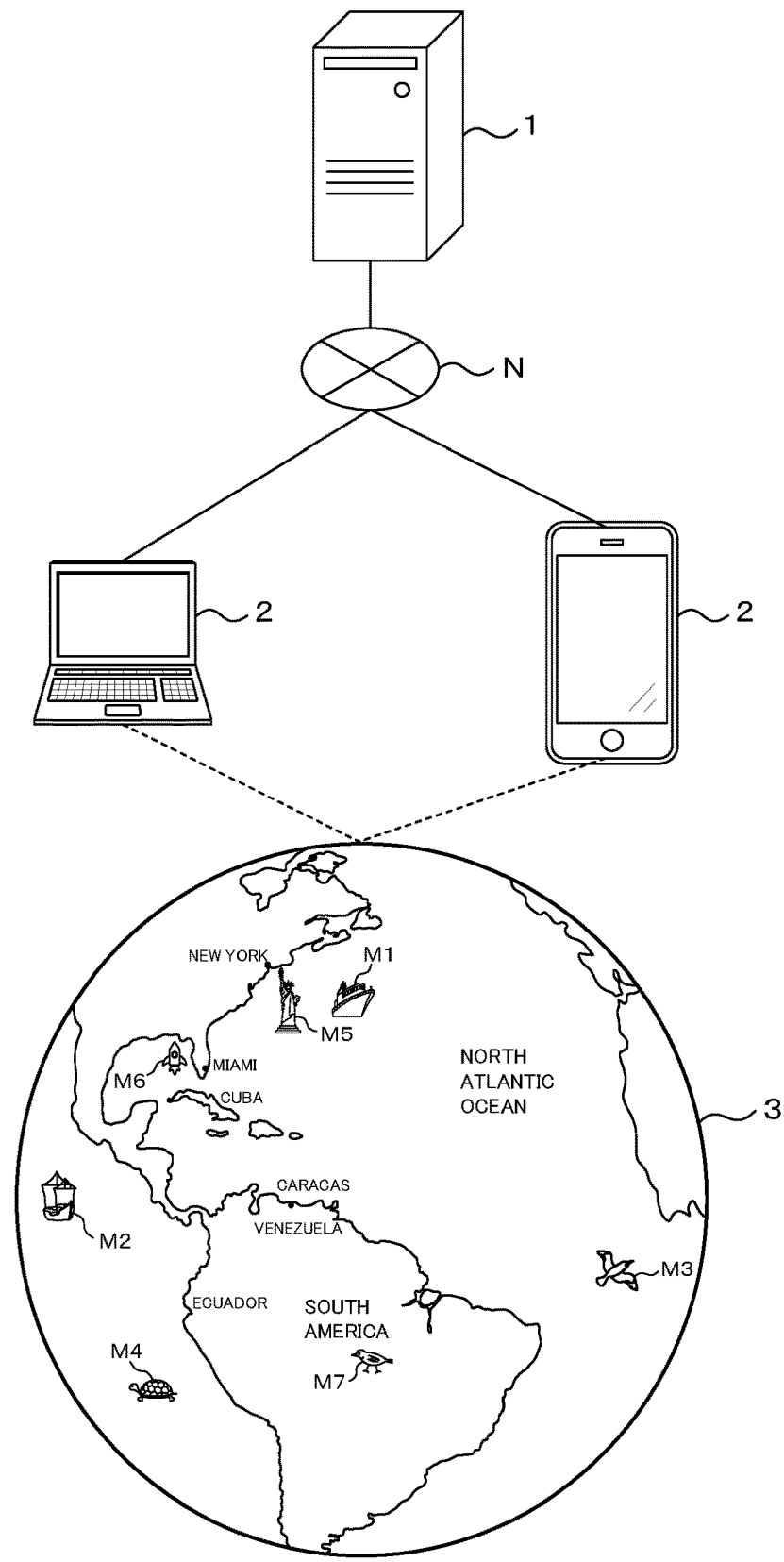
FIG. 1 is a schematic diagram illustrating a structure example of an AR system.

FIG. 1 is a schematic diagram illustrating a structure example of an AR system. The AR system of the present embodiment includes an information processing apparatus 1, an information processing terminal 2 and an earth ball 3 that is a sphere having an AR marker (marker) on a surface thereof. The information processing apparatus 1 and the information processing terminal 2 transmit/receive information through a network N such as the Internet.

The information processing apparatus 1 is an information processing apparatus that performs various information processing and processing for storing information and for transmitting/receiving information, and is, for example, a server apparatus, a personal computer or the like. In the present embodiment, the information processing apparatus 1 is assumed as a server apparatus, and in the following description, is referred to as the server 1 for the sake of simplification.

The information processing terminal 2 is a terminal apparatus of each user, and is information processing equipment such as a smartphone, a cellular phone, a tablet, a personal computer terminal or a game machine. In the following description, the information processing terminal 2 is referred to as the terminal 2 for the sake of simplification.

The earth ball 3 is used as a subject to be photographed with the terminal 2. The earth ball 3 is, but is not limited to, for example, a PVC (polyvinyl chloride) ball formed into a spherical shape by filling air therein. On a surface of the earth ball 3, a map of the earth is printed, and AR markers are provided in appropriate positions on the map. For example, in a map exemplified in FIG. 1, seas and continents are respectively provided with their names, and countries and cities are respectively provided with their names. These letters correspond to the AR markers. Besides, although not illustrated in FIG. 1, borders between the countries are included in the map, and each of these borders also corresponds to the AR marker. Furthermore, landforms such as rivers, plains and mountain ranges are distinguishably colored in the map, and each of these colors also corresponds to the AR marker. In addition, the seas included in the map are respectively provided with prescribed marks M1 to M4 (such as ship marks M1 and M2 and marks M3 and M4 of animals such as a turtle and a seagull) for distinguishing respective seas and sea areas. Besides, the continents included in the map are provided with prescribed marks M5 to M7 for distinguishing respective continents and regions. Each of these marks M1 to M7 also corresponds to the AR marker.

FIG. 2 is a block diagram illustrating a structure example of the server 1 of Embodiment 1. The sever 1 includes a control unit 11, a storage unit 12, a communication unit 13, a mass storage unit 14, and a reading unit 15. These components are connected to one another via busses B.

The control unit 11 includes processors such as a CPU (central processing unit) and an MPU (micro-processing unit), and performs various information processing, control processing and the like of the server 1 by reading a control program 1P stored in the storage unit 12 and executing it. Although the control unit 11 of FIG. 2 is described as a single processor system, it may be a multiprocessor system. The storage unit 12 includes memory devices such as a RAM (random access memory) and a ROM (read only memory), and stores the control program 1P, data and the like necessary for the control unit 11 to execute the processing. Besides, the storage unit 12 temporarily stores data and the like necessary for the control unit 11 to execute the processing. The communication unit 13 includes a processing circuit or the like for performing processing relating to communication, and transmits/receives information to/from the terminal 2 and the like via the network N.

The mass storage unit 14 is a mass storage device including, for example, a hard disk or the like. The mass storage unit 14 stores a user DB 141, a display image DB 142, an explanation information DB 143 and a publication information DB 144. The user DB 141 stores user information, a display image ID and location information relating to each user. The display image DB 142 stores various display images to be displayed in a superimposed manner on a photographed image of the earth ball 3. The explanation information DB 143 stores speech-form or text-form explanation information on each of the display images. The publication information DB 144 stores publication information on each of the display images.

It is noted that the storage unit 12 and the mass storage unit 14 of the present embodiment may be constructed as an integral storage device. Besides, the mass storage unit 14 may include a plurality of storage devices. Furthermore, the mass storage unit 14 may be an external storage device connected to the server 1.

The reading unit 15 reads a portable storage medium 1a including a CD (compact disc)-ROM or a DVD (digital versatile disc)-ROM. The control unit 11 may cause the reading unit 15 to read the control program 1P from the portable storage medium 1a to store the read program in the mass storage unit 14. Alternatively, the control unit 11 may download the control program 1P from another computer via the network N to store the downloaded program in the mass storage unit 14. Further alternatively, the control unit 11 may read the control program 1P from a semiconductor memory 1b.

It is noted that the structure of the server 1 of the present embodiment is not limited to that described above, but may include, for example, an input unit accepting an operation input, a display unit displaying information on the server 1 and the like. Incidentally, the server 1 of the present embodiment is a single apparatus in the present embodiment, which does not limit the present disclosure. For example, the server 1 may physically include a plurality of servers, or may include a plurality of virtual machines.

FIG. 3 is an explanatory diagram illustrating an example of a record layout of the user DB 141 of Embodiment 1. The user DB 141 includes a user ID column, a user rank column, an image ID column and a location (latitude and longitude) column. In the user ID column, an ID of each user uniquely specified for identifying the user is stored. In the user rank column, rank information on each user account is stored. As the user rank, for example, three ranks of "regular", "silver" and "gold" are provided. A point system for the user rank is introduced so that points can be added in accordance with the number of purchases, the purchase price and the like, and when the added points reach a prescribed number, the rank is upgraded in the order of "regular", "silver" and "gold". In the image ID column, an ID of each display image to be displayed in a superimposed manner on the photographed image of the earth ball 3 is stored. In the location (latitude and longitude) column, location information associated with each display image is stored. The location information includes the latitude and longitude. It is noted that the location information may be a post code, an address, a name of a facility or the like.

FIG. 4 is an explanatory diagram illustrating an example of a record layout of the display image DB 142. The display image DB 142 includes an image ID column, a type column, an image column, an explanation information ID column and a publication information ID column. In the image ID column, an ID of each display image uniquely specified for identifying the display image is stored. In the type column, a type of the display image is stored. The types of the display images include a still image, a three-dimensional image and a movie. In the image column, data of the display image corresponding to the image ID is stored. In the explanation information ID column, an ID of explanation information associated with the display image is stored. In the publication information ID column, an ID of publication information associated with the display image is stored. Incidentally, the publication information need not be always set for each display image but may be set for contents as a whole. For example, all the display images of a given user may be open to his/her friends.

FIG. 5 is an explanatory diagram illustrating an example of a record layout of the explanation information DB 143. The explanation information DB 143 includes an explanation information ID column, a type column and an explanation information column. In the explanation information ID column, an ID of each explanation information uniquely specified for identifying the explanation information associated with each display image is stored. In the type column, the type of the explanation information is stored. The types of explanation information include speech information and text information. The text information may include letters alone or letters including an URL (uniform resource locator) or the like. In the explanation information column, speech data or text data corresponding to the explanation information ID is stored.

FIG. 6 is an explanatory diagram illustrating an example of a record layout of the publication information DB 144. The publication information DB 144 includes a publication information ID column, a type column and a publication range column. In the publication information ID column, an ID of each publication information uniquely specified for identifying the publication information is stored. In the type column, a publication type is stored. In the present embodiment, the publication type include types of "open", "not open" and "partly open". In the publication range column, information on a publication range corresponding to the publication information ID is stored. In the present embodiment, the types of the publication are classified into "open", "not open" and "partly open". When the publication type is set as "open", "all" is set in the publication range column. When the publication type is set as "not open", "–" is set in the publication range column. When the publication type is set as "partly open", a rank of users is set in the publication range column. The ranks of users are the same as the user ranks stored in the user DB 141, and include the three ranks of "regular", "silver" and "gold". When the publication range is set in accordance with the rank of users, information on pre-sale, information on promotional items, valuable privilege information and the like can be open to specific users alone.

Incidentally, the types of the publication range are not limited to those described above, but may be set, for example, based on a region in the world. Specifically, the publication range may be divided in accordance with the geographical division into six regions of Africa, Asia, Europe, North America, Central and South America and Oceania. Each region may be further divided, and for example, Africa may be divided into East Africa, Central Africa, North Africa, South Africa and West Africa. When the publication range is thus set in accordance with the region, various services for a region where pre-sale is offered, a region where a mail order cannot be accepted, a region where sales are ended and the like can be provided. Alternatively, a user may be allowed to freely set the publication range. For example, information may be open to merely friends specified by a user.

FIG. 7 is a block diagram illustrating a structure example of the terminal 2. The terminal 2 includes a control unit 21, a storage unit 22, a communication unit 23, an album 24, an input unit 25, a display unit 26, an imaging unit 27, a clock unit 28, a microphone 29 and a speaker 20. These components are connected to one another via buses B.

The control unit 21 includes processors such as a CPU and an MPU, and performs various information processing, control processing and the like of the terminal 2 by reading a control program 2P stored in the storage unit 22 and executing the read program. It is noted that the control unit 21 of FIG. 7 is described as a single processor system but may be a multiprocessor system. The storage unit 22 includes memory devices such as a RAM and a ROM, and stores the control program 2P, data and the like necessary for the control unit 21 to execute the processing. Besides, the storage unit 22 temporarily stores data and the like necessary for the control unit 21 to execute the processing. The communication unit 23 includes a processing circuit or the like for performing processing relating to communication, and transmits/receives information to/from the server 1 via the network N. The album 24 includes display images and music. The input unit 25 is a keyboard or a mouse. The display unit 26 is a liquid crystal display device. Alternatively, the input unit 25 may be integrated with the display unit 26 in the form of a touch panel.

The imaging unit 27 is an imaging device such as a CCD (charge coupled device) camera or a CMOS (complementary metal oxide semiconductor) camera. The control unit 21 can recognize, using the imaging unit 27, marker information on a spherical surface of the earth ball 3 in the photographed image, or a QR code (registered trademark) or the like. Incidentally, the imaging unit 27 need not be included in the terminal 2 but may be externally directly connected to the terminal 2 so that a photograph can be taken.

The clock unit 28 shows a time or counts elapsed time or the like, and is a circuit for imparting a timed result to the control unit 21 in response to a request from the control unit 21. Besides, the clock unit 28 provides a timer function. The timer function is a function to inform the control unit 21 that a precedently set time has elapsed since a start instruction. Alternatively, the timer function is a function to respond, in response to an inquiry from the control unit 21, whether or not a precedently set time has elapsed since a start instruction.

The microphone 29 is a device for converting sound into an electric signal. The speaker 20 is a device for converting an electric signal into sound. It is noted that the microphone 29 and the speaker 20 may be a headset connected to the terminal 2 by a short-range wireless communication system such as Bluetooth (registered trademark).

Figure 8A:
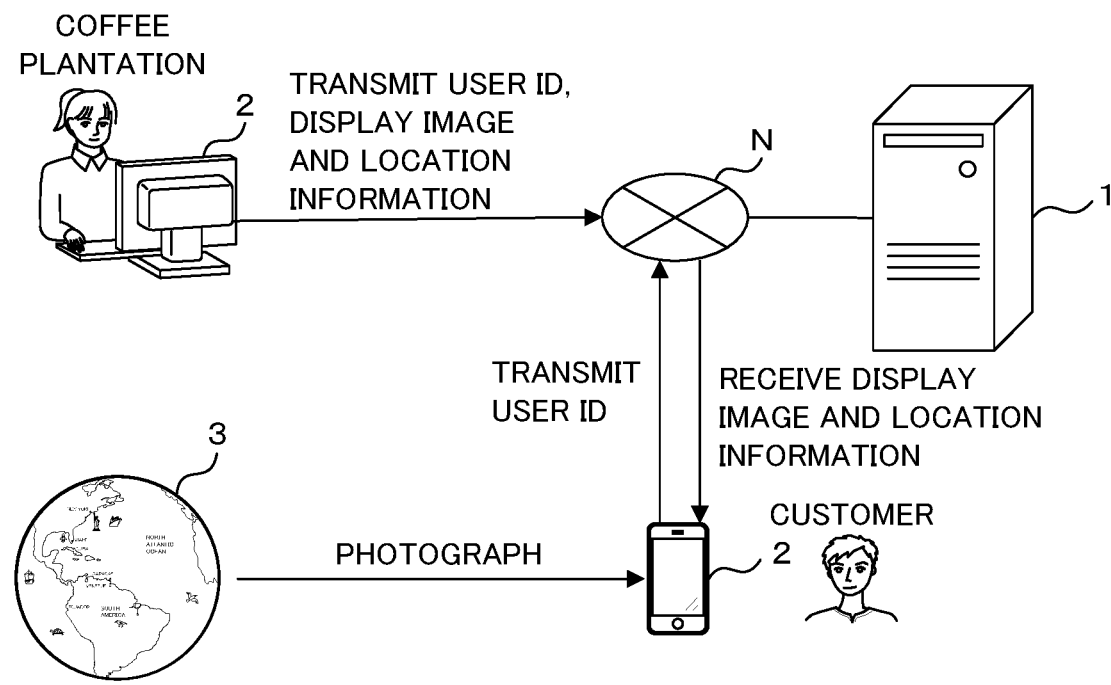
FIG. 8A is an explanatory diagram used for explaining an operation of the AR system of Embodiment 1.
Figure 8B:
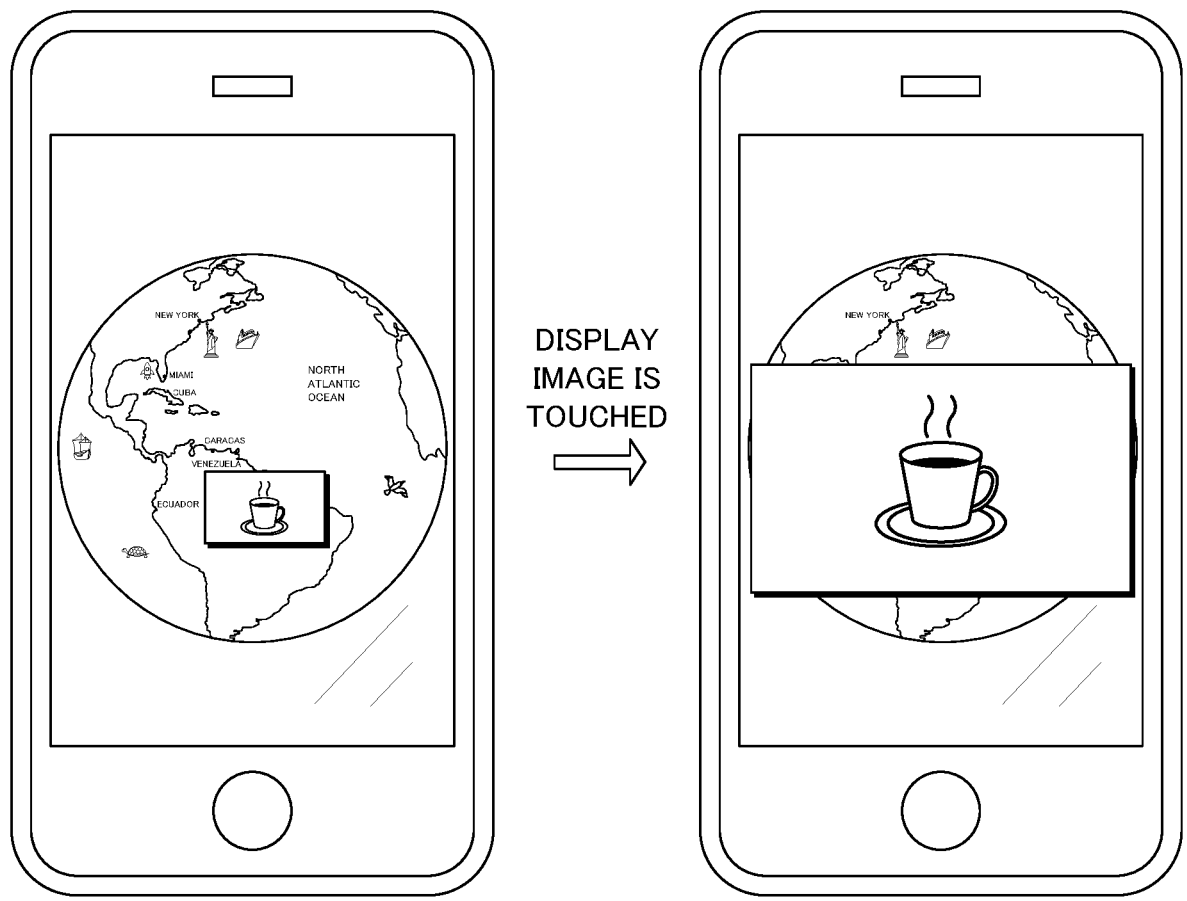
FIG. 8B is an explanatory diagram used for explaining another operation of the AR system of Embodiment 1.

FIGS. 8A and 8B are explanatory diagrams used for explaining an operation of the AR system of Embodiment 1. In the present embodiment, a sales system for a coffee plantation will be exemplarily described as an example of the aspect of the AR system. FIG. 8A is an explanatory diagram illustrating the whole operation. The control unit 21 of the terminal 2 of the coffee plantation (which terminal 2 will be hereinafter referred to as the coffee plantation terminal 2) accepts selection of a display image to be displayed in a superimposed manner on a photographed image of the earth ball 3. The display images to be displayed include a still image, a three-dimensional image and a movie. The display image may be obtained from the album 24 of the coffee plantation terminal 2, or may be obtained by photographing with the imaging unit 27 of the coffee plantation terminal 2. Alternatively, the display image may be received from an external apparatus not shown through the communication unit 23 of the coffee plantation terminal 2. The display image thus accepted is, for example, a photograph of a coffee flower blooming in the plantation, a photograph of a scene of harvesting coffee beans, or a photograph of a scene of shipping out coffee beans.

The control unit 21 of the coffee plantation terminal 2 obtains location information corresponding to the accepted display image. Incidentally, the location information may be obtained on the side of the server 1. In this case, information on the latitude and longitude accompanying the image may be obtained. In obtaining the location information, if the image is photographed with a digital camera, a smartphone or the like equipped with a GPS function, the latitude and longitude information may be added by using the GPS so that the location information can be extracted from the photographed image. Alternatively, the location information may be manually input through the input unit 25 of the coffee plantation terminal 2.

Alternatively, the location information may be obtained using the Google (registered trademark) Map service. For example, Google Maps API (application programming interface) is used to display, as an inline frame, a map in an application of the terminal 2 based on data of the Google Map. The terminal 2 accepts information on a place tapped on the screen in the map or input keyword information of an address, and transmits the accepted information through Google Maps API to the Google Map server. The Google Map server obtains location information such as the latitude and longitude corresponding to the information transmitted from the terminal 2, and transmits the resultant to the terminal 2. The communication unit 23 of the terminal 2 receives the location information transmitted from the Google Map server.

Figure 9A:
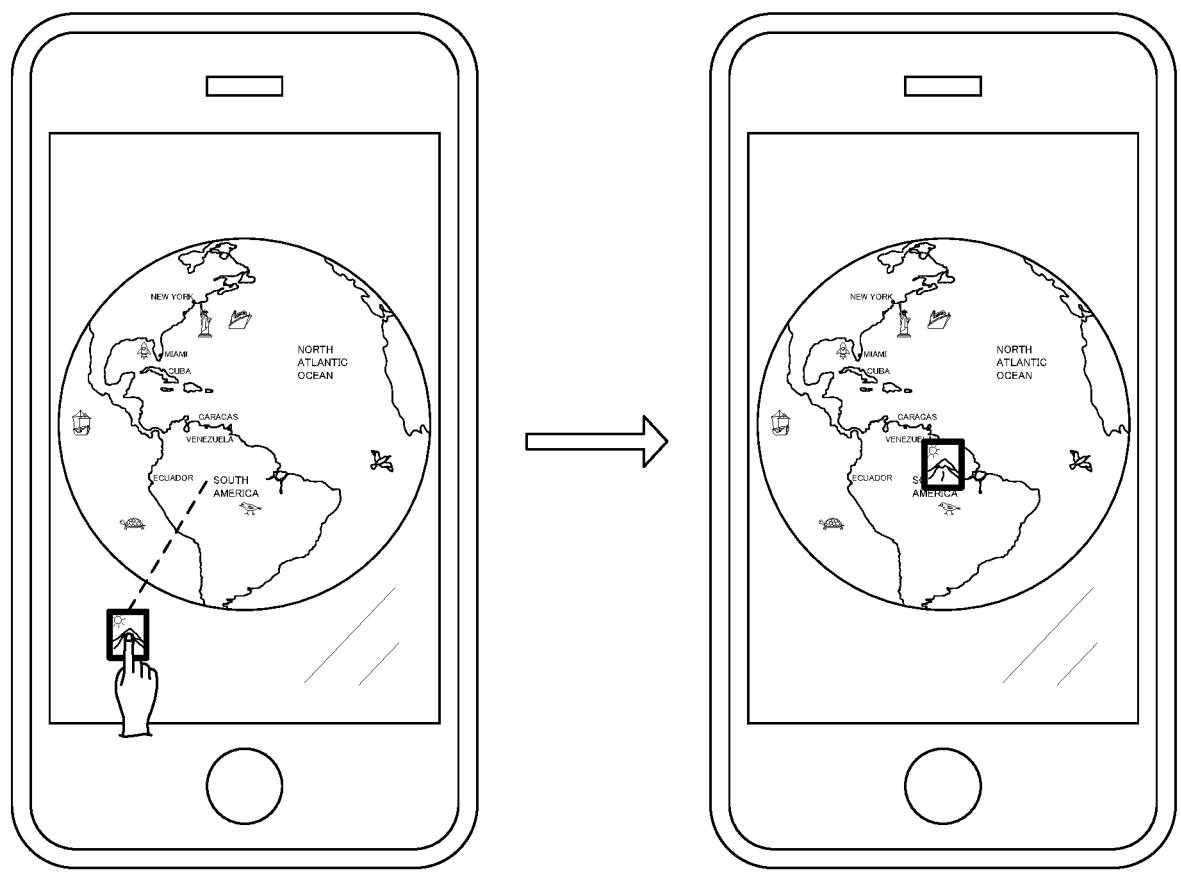
FIG. 9A is an image diagram illustrating an exemplified method for obtaining location information.
Figure 9B:
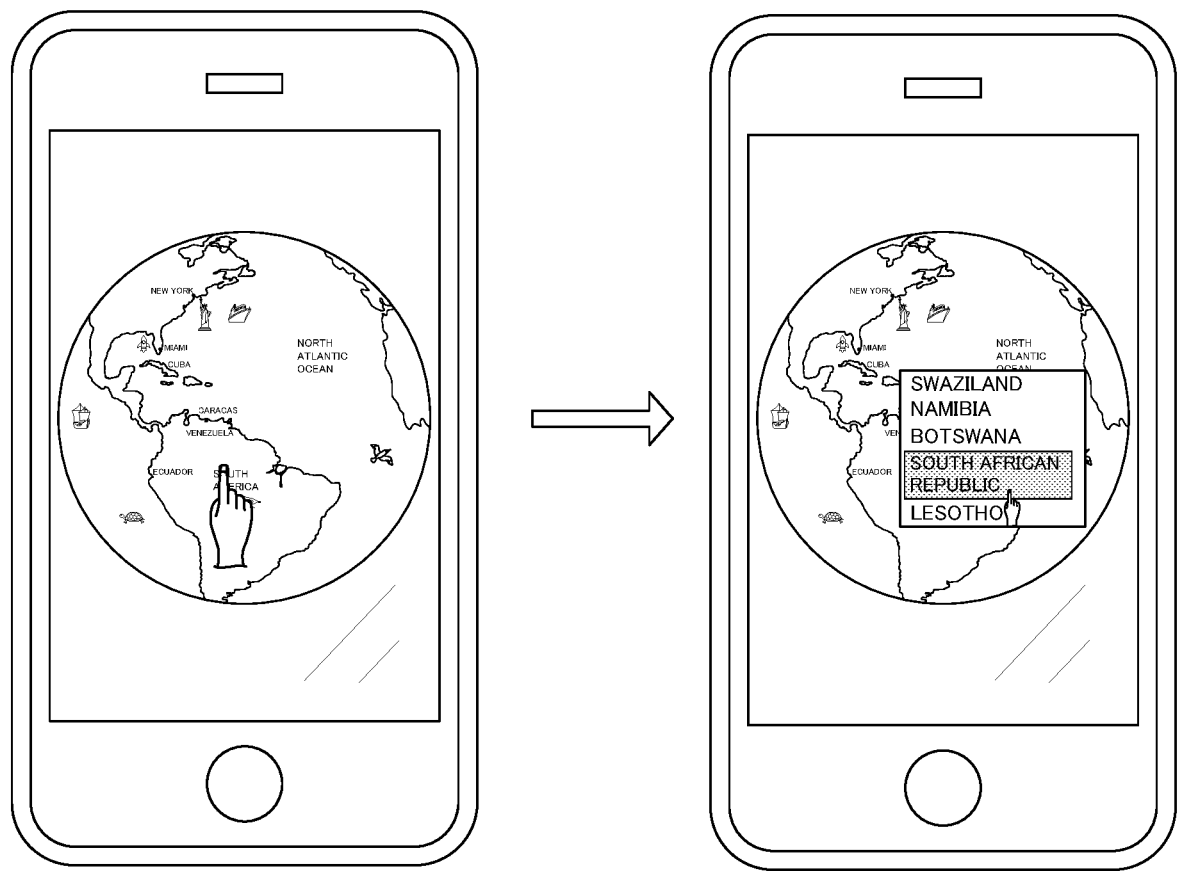
FIG. 9B is an image diagram illustrating another exemplified method for obtaining location information.

Alternatively, the location information may be extracted based on information on a marker provided in the photographed image of the earth ball 3. FIGS. 9A and 9B are image diagrams illustrating exemplified methods for obtaining the location information. These are methods for obtaining the location information based on AR marker information included in the photographed image of the earth ball 3.

FIG. 9A is an image diagram illustrating an exemplified method for obtaining location information by a drag and drop operation. The control unit 21 of the terminal 2 moves, by the drag and drop operation, a selected display image to a set destination in the photographed image of the earth ball 3. The control unit 21 of the terminal 2 recognizes AR marker information according with the set destination in the photographed image of the earth ball 3, and extracts the location information based on the recognized AR marker information.

FIG. 9B is an image diagram illustrating an exemplified method for obtaining location information by a menu operation. The control unit 21 of the terminal 2 recognizes, through an operation of tapping a set destination in the photographed image of the earth ball 3, AR marker information according with the set destination in the photographed image. The control unit 21 of the terminal 2 extracts the location information based on the recognized AR marker information, and generates a position selecting menu based on the extracted location information. The control unit 21 of the terminal 2 displays, through the display unit 26 of the terminal 2, the position selecting menu thus generated in a superimposed manner on the photographed image of the earth ball 3. For example, the control unit 21 of the terminal 2 accepts a tapping operation in the "South Africa" region in the photographed image, and recognizes AR markers disposed in or around the tapped point. The control unit 21 of the terminal 2 obtains division information on the "South Africa" region based on the recognized AR marker information, and generates a menu based on the obtained division information on the "South Africa" region. The generated menu has items of, for example, "Swaziland", "Namibia", "Botswana", "Republic of South Africa" and "Lesotho". The control unit 21 of the terminal 2 displays, through the display unit 26 of the terminal 2, the generated menu in a superimposed manner on the photographed image of the earth ball 3. The control unit 21 of the terminal 2 may accept a tapping operation on one item of the menu to obtain location information corresponding to the accepted item of the menu. Incidentally, a display form is not limited to one using a menu but may be one using a dialogue box or a combo box.

The control unit 21 of the coffee plantation terminal 2 associates, to a user ID of the coffee plantation, the selected display image and the location information associated with the display image. The communication unit 23 of the coffee plantation terminal 2 transmits, to the server 1, the user ID of the coffee plantation, the display image and the location information associated with the display image. In the example described in the present embodiment, the control unit 21 of the terminal 2 first accepts the selection of a display image and then accepts the acquisition of location information, which does not limit the present disclosure. For example, the control unit 21 of the terminal 2 may accept the acquisition of location information first, and then accept the selection of a display image corresponding to the accepted location information.

The communication unit 13 of the server 1 receives the user ID of the coffee plantation, the display image to be displayed in a superimposed manner on the photographed image of the earth ball 3 and the location information associated with the display image that are transmitted from the coffee plantation terminal 2. The control unit 11 of the server 1 stores the display image and the location information associated with the display image thus received in the mass storage unit 14 in association with the received user ID of the coffee plantation. Specifically, the control unit 11 of the server 1 assigns a unique display image ID to the display image, and stores the user ID of the coffee plantation, the display image ID and the location information in the user DB 141 as one record. The control unit 11 of the server 1 stores the display image ID and data of the display image in the display image DB 142 as one record.

Figure 10:
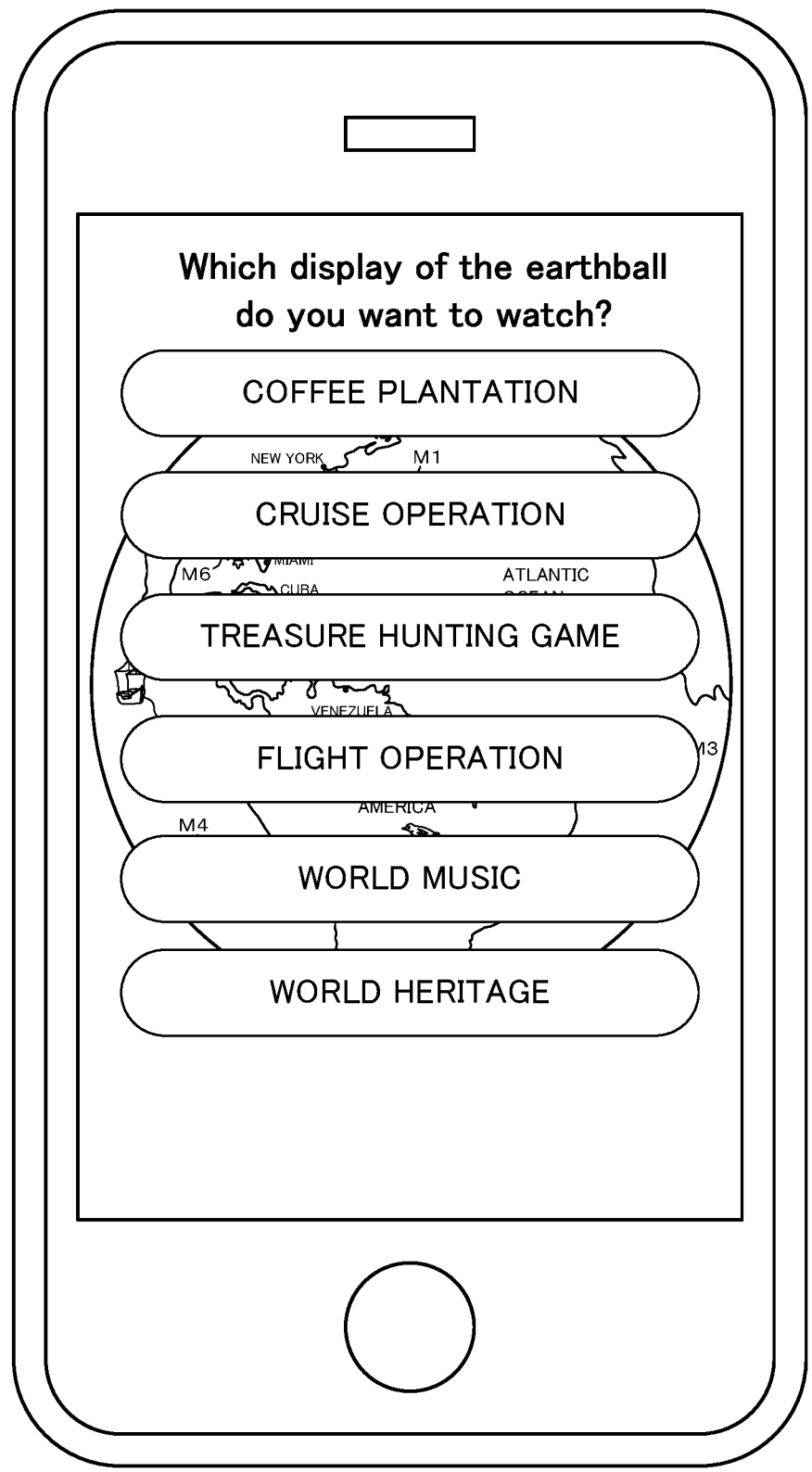
FIG. 10 is an image diagram illustrating an exemplified method for obtaining a user ID by a terminal.

Next, processing for displaying a display image transmitted by a user of the coffee plantation will be described. Incidentally, contents to be displayed in a superimposed manner on the photographed image of the earth ball 3 may include, in addition to those of the coffee plantation, those of a cruise operation, a treasure hunting game, a flight operation, world music and world heritages. In the present embodiment, use of the contents of the coffee plantation will be exemplarily described. In order to display the display image corresponding to the user ID of the coffee plantation in a superimposed manner on the photographed image of the earth ball 3, the communication unit 23 of the terminal 2 of a customer of the coffee plantation (which terminal 2 will be hereinafter referred to as the customer terminal 2) transmits the user ID of the coffee plantation to the server 1. FIG. 10 is an image diagram illustrating an exemplified method for obtaining the user ID by the terminal 2. Specifically, the control unit 21 of the customer terminal 2 obtains the photographed image of the earth ball 3 taken with the imaging unit 27 of the customer terminal 2. The control unit 21 of the customer terminal 2 accepts a tapping operation on the "Coffee Plantation" through the input unit 25 of the customer terminal 2, and thus, the user ID of the coffee plantation is obtained. The communication unit 23 of the customer terminal 2 transmits the thus obtained user ID of the coffee plantation to the server 1. Incidentally, the method for obtaining the user ID is not limited to the above-described method, and the user ID may be obtained by, for example, manual input. In the example described in the present embodiment, the user ID of the coffee plantation is transmitted, which does not limit the present disclosure. Instead, an URL, content ID information or the like with which the type of content to be displayed in a superimposed manner on the photographed image of the earth ball 3 can be specified may be transmitted.

The communication unit 13 of the server 1 receives the user ID of the coffee plantation transmitted from the customer terminal 2. The control unit 11 of the server 1 retrieves the received user ID of the coffee plantation from the user DB 141 of the mass storage unit 14, and obtains a display image ID of a display image corresponding to the user ID of the coffee plantation and location information. The control unit 11 obtains the display image corresponding to the obtained display image ID from the display image DB 142. The communication unit 13 of the server 1 transmits, to the customer terminal 2, the obtained displayed image and the location information associated with the display image.

The communication unit 23 of the customer terminal 2 receives the display image corresponding to the user ID of the coffee plantation and the location information associated with the display image that are transmitted from the server 1. As illustrated in FIG. 8B, the control unit 21 of the customer terminal 2 specifies a spherical position in the photographed image of the earth ball 3 corresponding to the received location information. The control unit 21 of the customer terminal 2 displays, through the display unit 26 of the customer terminal 2, a thumbnail image of the received display image to be superimposed in the specified spherical position. Besides, when a tapping operation on the display image is accepted through the input unit 25 of the customer terminal 2, the control unit 21 of the customer terminal 2 performs processing for enlarging the display image. The control unit 21 of the customer terminal 2 can display, through the display unit 26 of the customer terminal 2, the enlarged display image in a superimposed manner on the photographed image of the earth ball 3. Incidentally, a display form is not limited to one described above, but the received display image may be displayed to cover the whole screen of the display unit 26 of the customer terminal 2. Besides, when the received display image is a movie, the reproduction of the movie may be started by a tapping operation.

Incidentally, in the example described in the present embodiment, the display image of the user of the coffee plantation is received and displayed in the customer terminal 2, which does not limit the present disclosure. A display image having been transmitted by a user himself/herself may be received and displayed. For example, the coffee plantation terminal 2 transmits its own user ID to the server 1 so as to receive, from the server 1, the display image corresponding to its own user ID and the location information associated with the display image. The control unit 21 of the coffee plantation terminal 2 specifies a spherical position in the photographed image of the earth ball 3 corresponding to the received location information. The control unit 21 of the coffee plantation terminal 2 may display, through the display unit 26 of the coffee plantation terminal 2, the received display image to be superimposed in the specified spherical position.

Figure 11:
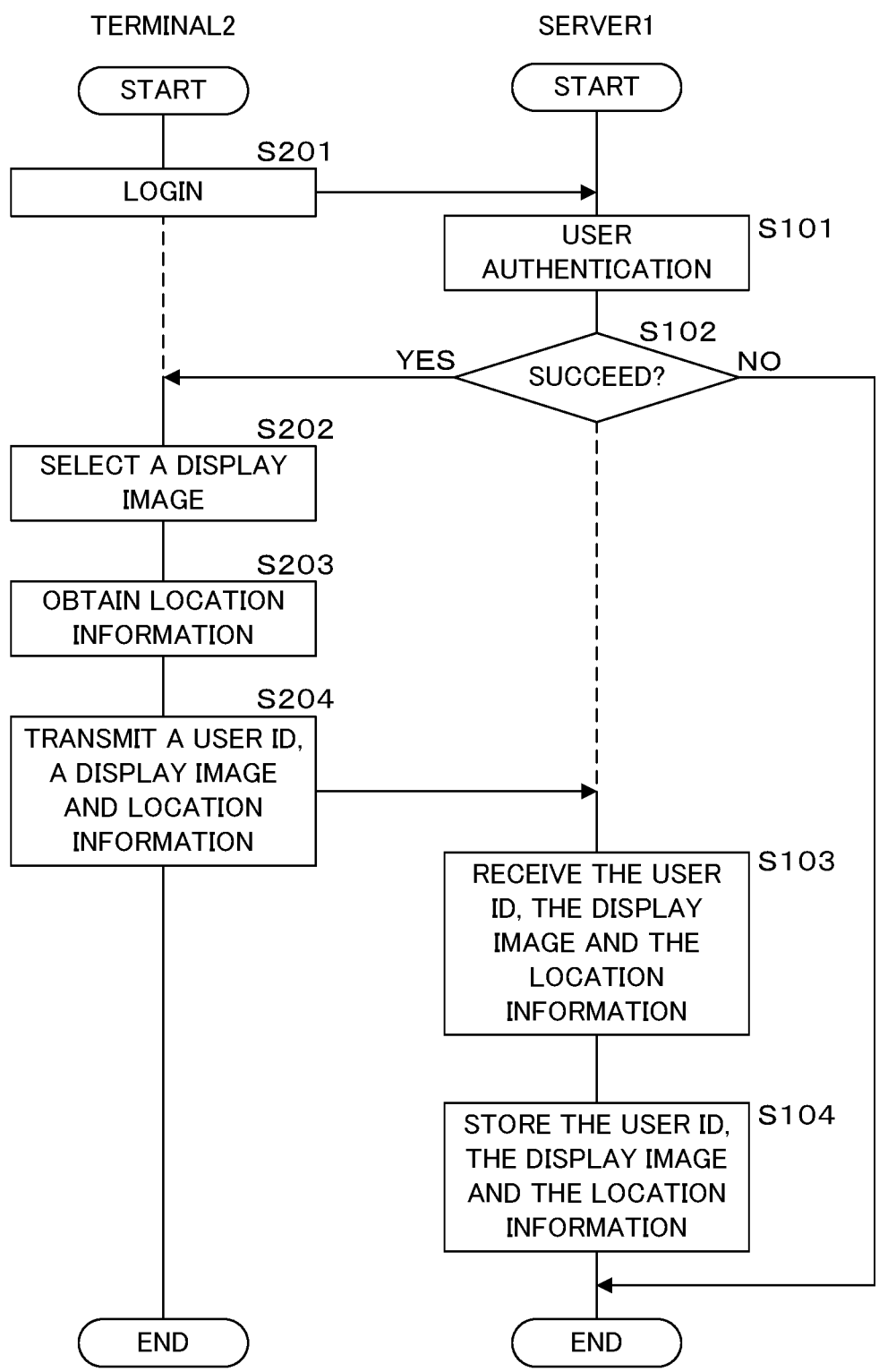
FIG. 11 is a flowchart illustrating procedures in processing for transmitting a display image by a terminal of Embodiment 1.

FIG. 11 is a flowchart illustrating procedures in processing for transmitting a display image by the terminal 2 of Embodiment 1. The control unit 21 of the terminal 2 accepts an input of authentication information such as a user ID through the input unit 25 of the terminal 2. The communication unit 23 of the terminal 2 transmits the accepted authentication information to the server 1 (step S201). The control unit 11 of the server 1 performs authentication processing on the authentication information such as a user ID received from the communication unit 13 of the server 1 (step S101). The control unit 11 of the server 1 determines whether or not the user authentication has succeeded (step S102). If it is determined that the user authentication has succeeded (YES in step S102), the communication unit 13 of the server 1 transmits an authentication success message to the terminal 2. If it is determined that the user authentication has failed (NO in step S102), the control unit 11 of the server 11 ends the processing. When the communication unit 23 of the terminal 2 receives the user authentication success message, the control unit 21 of the terminal 2 accepts the selection of a display image to be displayed in a superimposed manner on the photographed image of the earth ball 3 (step S202). The control unit 21 of the terminal 2 obtains location information corresponding to the selected display image (step S203), and associates the selected display image and the obtained location information with the user ID. The communication unit 23 of the terminal 2 transmits the user ID, the display image and the location information to the server 1 (step S204). The communication unit 13 of the server 1 receives the user ID, the display image and the location information associated with the display image that are transmitted from the terminal 2 (step S103). The control unit 11 of the server 1 stores the received display image and the location information associated with the display image in the mass storage unit 14 in association with the user ID (step S104). Incidentally, the user ID is transmitted together with the display image in step S204 in the example described in the present embodiment, which does not limit the present disclosure. The display image may be associated based on the user ID received in step S101.

Figure 12:
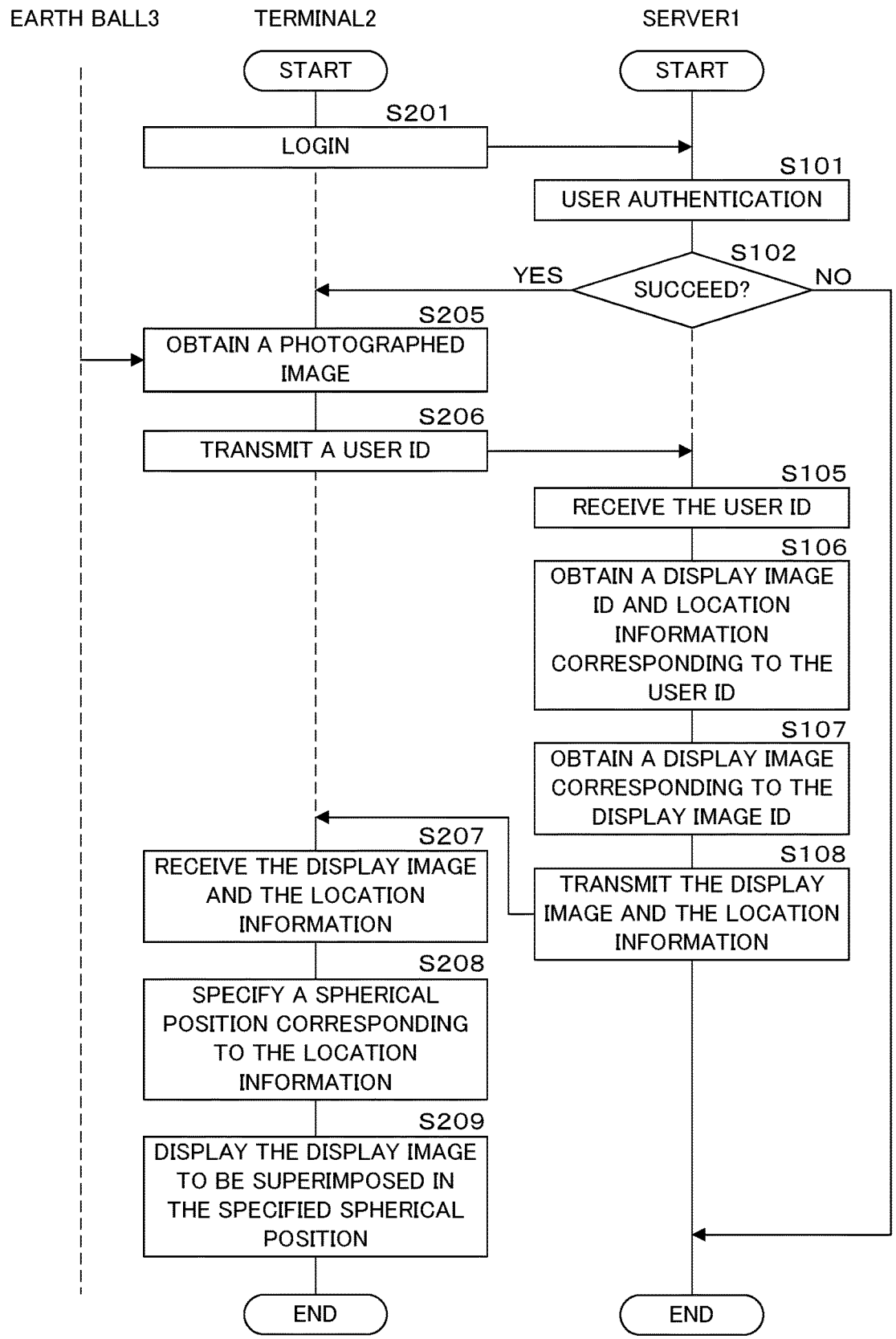
FIG. 12 is a flowchart illustrating procedures in processing for receiving a display image by the terminal of Embodiment 1.

FIG. 12 is a flowchart illustrating procedures in processing for receiving a display image by the terminal 2 of Embodiment 1. Procedures common to those illustrated in FIG. 11 are not described here with like reference signs used. The control unit 21 of the terminal 2 obtains a photographed image of the earth ball 3 photographed with the imaging unit 27 of the terminal 2 (step S205). The communication unit 23 of the terminal 2 transmits, to the server 1, a user ID corresponding to a display image to be displayed in a superimposed manner on the photographed image of the earth ball 3 (step S206). The communication unit 13 of the server 1 receives the user ID transmitted from the terminal 2 (step S105). The control unit 11 of the server 1 compares the received user ID with user IDs stored in the user DB 141 of the mass storage unit 14, and obtains a display image ID and location information corresponding to the identical user ID (step S106). The control unit 11 of the server 1 obtains a display image corresponding to the obtained display image ID from the display image DB 142 of the mass storage unit 14 (step S107). The communication unit 13 of the server 1 transmits, to the terminal 2, the obtained display image and the location information associated with the display image (step S108). The communication unit 23 of the terminal 2 receives the display image and the location information associated with the display image that are transmitted from the server 1 (step S207). Incidentally, when there are a plurality of display images, these images may be received in one batch, or may be received dividedly in several batches. The control unit 21 of the terminal 2 specifies a spherical position in the photographed image of the earth ball 3 corresponding to the received location information (step S208). The control unit 21 of the terminal 2 displays, through the display unit 26 of the terminal 2, the received display image to be superimposed in the specified spherical position in the photographed image (step S209).

Subsequently, processing for setting explanation information correspondingly to a display image to be displayed in a superimposed manner on the photographed image of the earth ball 3 will be described. The explanation information includes speech information or text information. The control unit 21 of the terminal 2 may receive speech information through the microphone 29 of the terminal 2. Besides, the communication unit 23 of the terminal 2 may accept speech information from an external apparatus. The control unit 21 of the terminal 2 accepts text information through the input unit 25 of the terminal 2. The explanation information may be set simultaneously with a display image or separately from the display image. When the explanation information is set separately from the display image, a display image ID of the display image corresponding to the user ID is obtained, and the explanation information is set correspondingly to the obtained display image ID.

In the present embodiment, the processing will be described on the assumption that explanation information is to be set correspondingly to a display image having been transmitted by the coffee plantation terminal 2. The communication unit 23 of the coffee plantation terminal 2 transmits the user ID of the coffee plantation to the server 1. The control unit 11 of the server 1 obtains a display image ID of the display image corresponding to the user ID of the coffee plantation received from the communication unit 13 of the server 1. The communication unit 13 of the server 1 transmits the obtained display image ID to the coffee plantation terminal 2.

The communication unit 23 of the coffee plantation terminal 2 receives the display image ID transmitted from the server 1. The control unit 21 of the coffee plantation terminal 2 accepts an input of explanation information, and associates the accepted explanation information with the user ID of the coffee plantation and the display image ID. The communication unit 23 of the coffee plantation terminal 2 transmits, to the server 1, the user ID of the coffee plantation, the display image ID and the explanation information. The communication unit 13 of the server 1 receives the user ID of the coffee plantation, the display image ID and the explanation information that are transmitted from the coffee plantation terminal 2. The control unit 11 of the server 1 stores the received explanation information in the mass storage unit 14 in association with the user ID of the coffee plantation and the display image ID. Specifically, the control unit 11 of the server 1 assigns a unique explanation information ID to the explanation information, and stores the explanation information ID in a record of the user DB 141 corresponding to the user ID of the coffee plantation and the display image ID that are received. The control unit 11 of the server 1 stores the explanation information ID and data of the explanation information in the explanation information DB 143 as one record.

In this manner, the explanation information associated with the display image can be displayed in a superimposed manner on the photographed image of the earth ball 3 in the display unit 26 of the coffee plantation terminal 2 or the customer terminal 2. For example, the communication unit 23 of the customer terminal 2 transmits the user ID of the coffee plantation to the server 1. The control unit 11 of the server 1 obtains the display image corresponding to the user ID of the coffee plantation received from the communication unit 13 of the server 1, and the location information and the explanation information associated with the display image. The communication unit 13 of the server 1 transmits, to the customer terminal 2, the display image, the location information and the explanation information associated with the display image thus obtained.

Figure 13A:
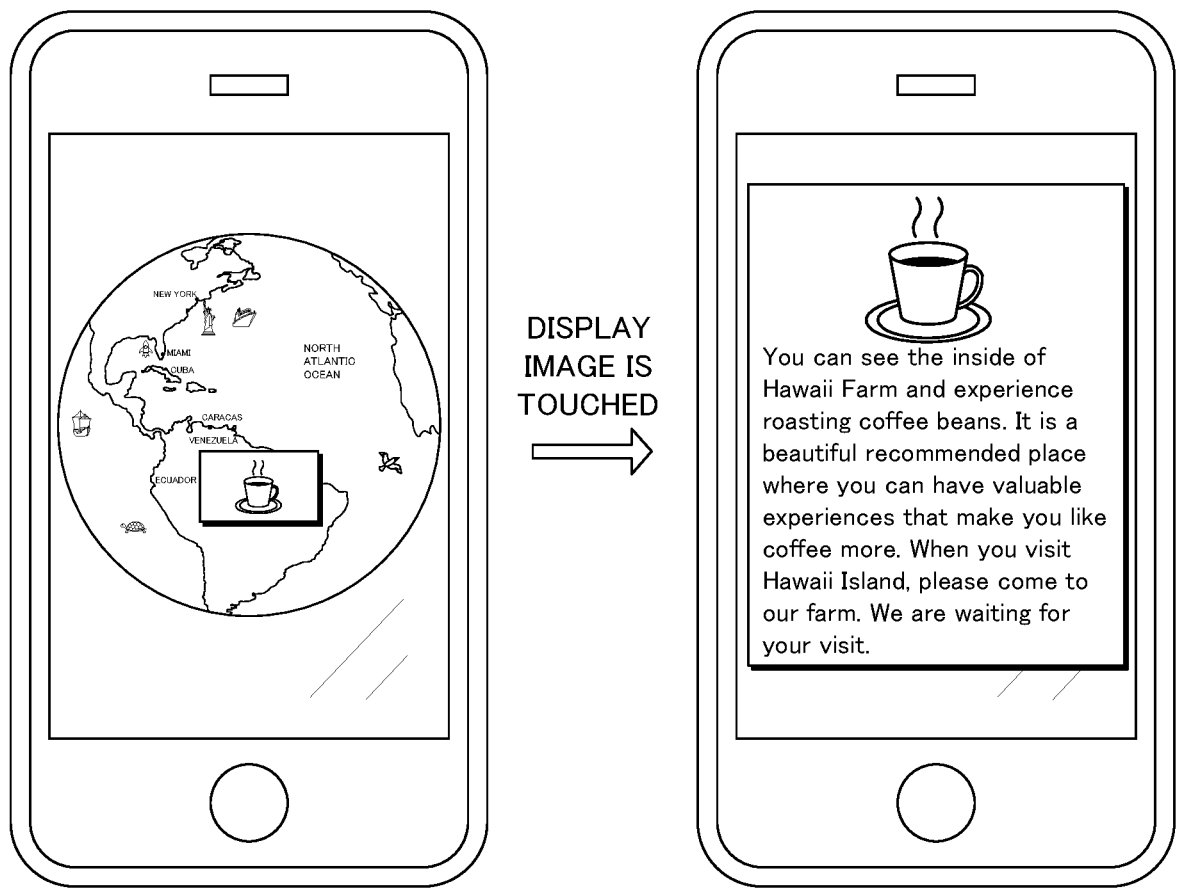
FIG. 13A is an explanatory diagram illustrating explanation information displayed in the terminal of Embodiment 1.
Figure 13B:
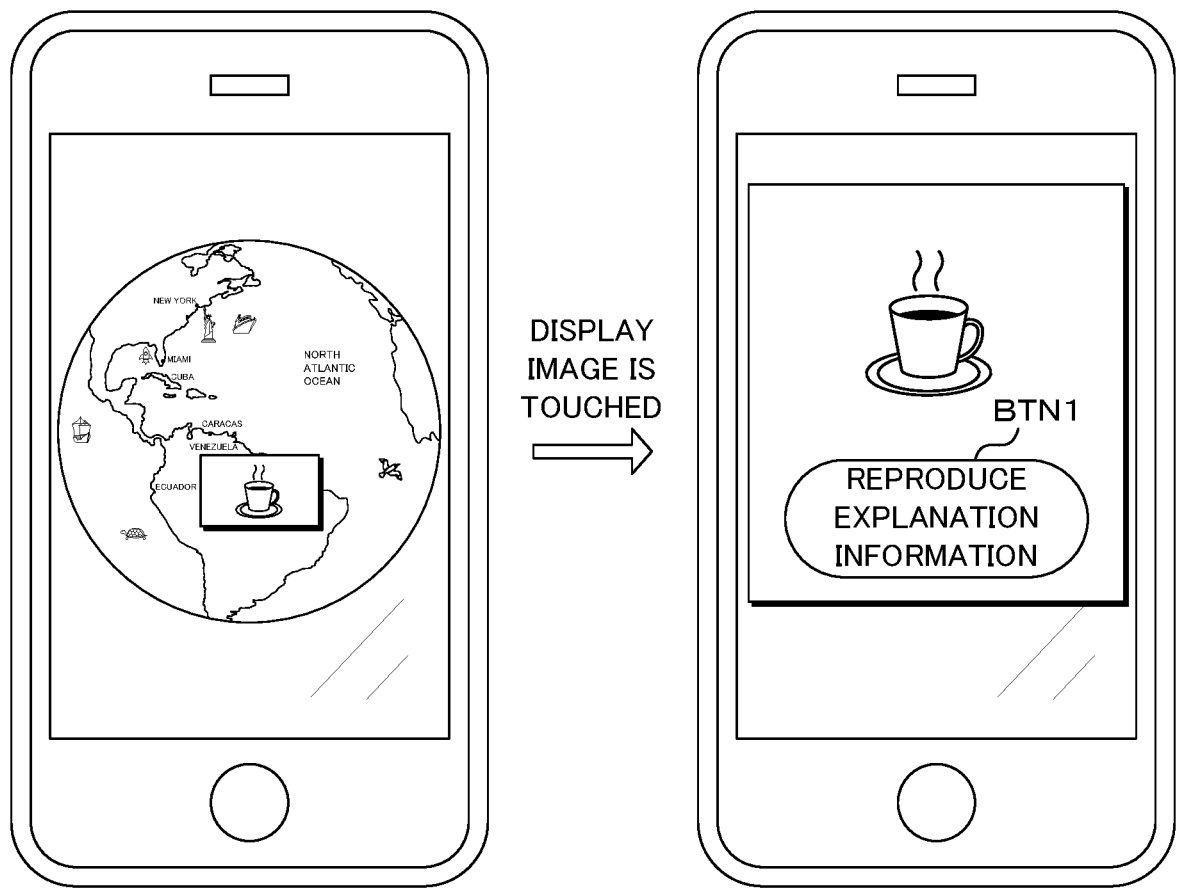
FIG. 13B is another explanatory diagram illustrating the explanation information displayed in the terminal of Embodiment 1.

FIGS. 13A and 13B are explanatory diagrams illustrating the explanation information displayed on the terminal 2 of Embodiment 1. The communication unit 23 of the customer terminal 2 receives the display image, and the location information and the explanation information associated with the display image that are transmitted from the server 1.

FIG. 13A is an image diagram of displaying text-form explanation information. The control unit 21 of the customer terminal 2 specifies a spherical position in the photographed image of the earth ball 3 corresponding to the received location information. The control unit 21 of the customer terminal 2 displays, through the display unit 26 of the customer terminal 2, the display image to be superimposed in the specified spherical position. Besides, when a tapping operation on the display image is accepted through the input unit 25 of the customer terminal 2, the control unit 21 of the customer terminal 2 performs processing for enlarging the display image. The control unit 21 of the customer terminal 2 can display, through the display unit 26 of the customer terminal 2, the enlarged display image and the explanation information associated with the display image in a superimposed manner on the photographed image of the earth ball 3. Incidentally, the display form is not limited to the above-described one, but the display image and the explanation information associated with the display image may be displayed over the whole screen of the display unit 26 of the customer terminal 2.

FIG. 13B is an image diagram of speech-form explanation information. The control unit 21 of the customer terminal 2 specifies a spherical position in the photographed image of the earth ball 3 corresponding to the received location information. The control unit 21 of the customer terminal 2 displays, through the display unit 26 of the customer terminal 2, the display image to be superimposed in the specified spherical position. Besides, when a tapping operation on the display image is accepted through the input unit 25 of the customer terminal 2, the control unit 21 of the customer terminal 2 performs the processing for enlarging the display image, and generates an explanation information reproducing button BTN1. The control unit 21 of the customer terminal 2 displays, through the display unit 26 of the customer terminal 2, the enlarged display image and the generated explanation information reproducing button BTN1 to be superimposed on the photographed image of the earth ball 3. When a tapping operation on the explanation information reproducing button BTN1 is accepted through the input unit 25 of the customer terminal 2, the control unit 21 of the customer terminal 2 can reproduce the received speech information through the speaker 20 of the customer terminal 2. Incidentally, a reproducing form of speech information is not limited to the above-described one. For example, without generating the explanation information reproducing button BTN1, the control unit 21 of the terminal 2 may automatically reproduce the speech information through the speaker 20 of the customer terminal 2 in displaying the display image to be superimposed on the photographed image of the earth ball 3.

Figure 14:
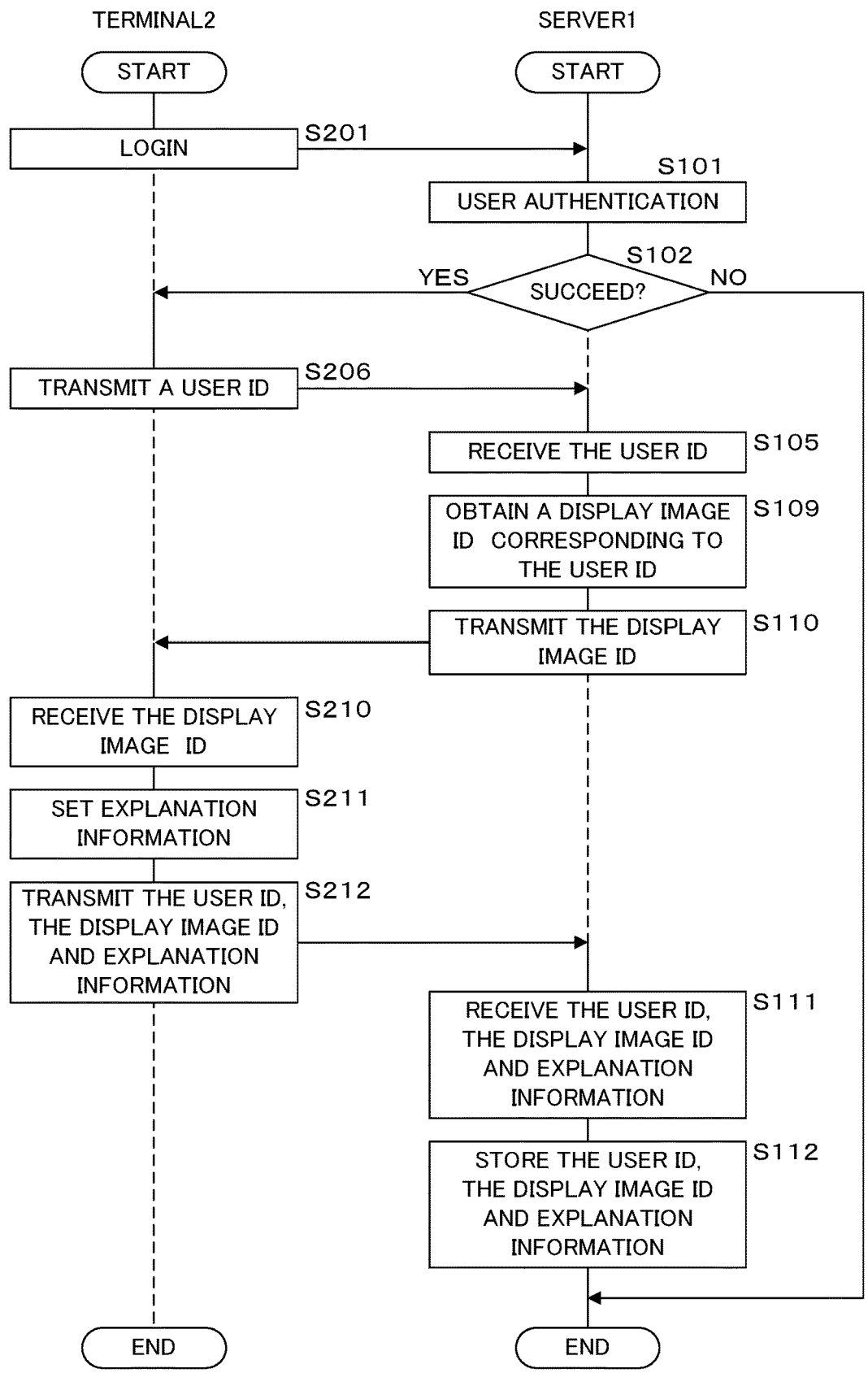
FIG. 14 is a flowchart illustrating procedures in processing for transmitting explanation information by the terminal of Embodiment 1.

FIG. 14 is a flowchart illustrating procedures in processing for transmitting explanation information by the terminal 2 of Embodiment 1. Procedures common to those illustrated in FIGS. 11 and 12 are not described here with like reference signs used. The control unit 11 of the server 1 obtains, from the user DB 141 of the mass storage unit 14, a display image ID corresponding to a user ID transmitted from the terminal 2 (step S109). The communication unit 13 of the server 1 transmits the obtained display image ID to the terminal 2 (step S110). The communication unit 23 of the terminal 2 receives the display image ID transmitted from the server 1 (step S210). The control unit 21 of the terminal 2 sets explanation information including speech information or text information in association with the user ID and the received display image ID (step S211). The communication unit 23 of the terminal 2 transmits the user ID, the display image ID and the explanation information to the server 1 (step S212). The communication unit 13 of the server 1 receives the user ID, the display image ID and the explanation information that are transmitted from the terminal 2 (step S111). The control unit 11 of the server 1 stores the received explanation information in the explanation information DB 143 of the mass storage unit 14 in association with the user ID and the display image ID received (step S112).

Figure 15:
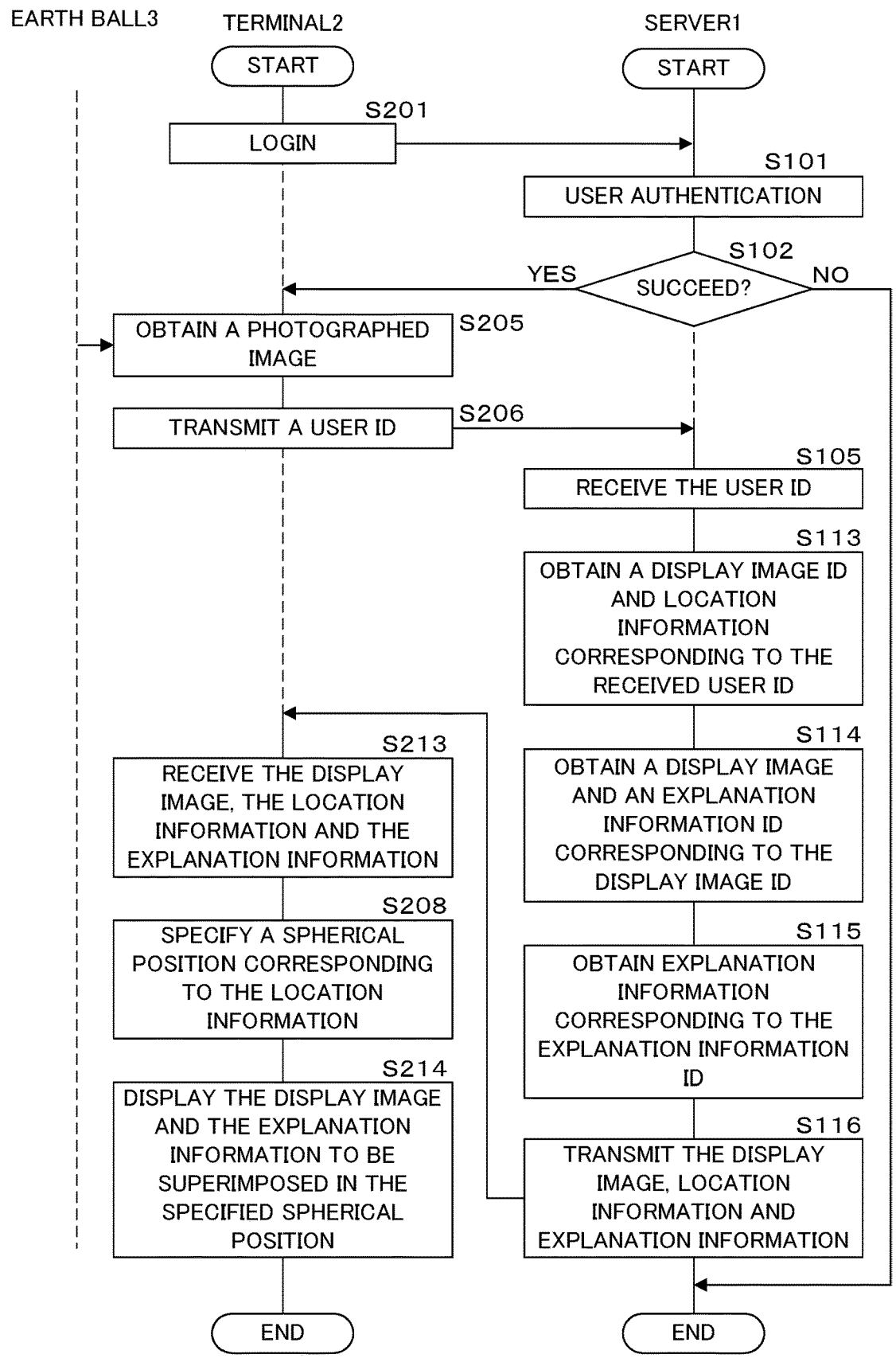
FIG. 15 is a flowchart illustrating procedures in receiving explanation information by the terminal of Embodiment 1.

FIG. 15 is a flowchart illustrating procedures in processing for receiving explanation information by the terminal 2 of Embodiment 1. Procedures common to those illustrated in FIG. 12 are not described here with like reference signs used. The control unit 11 of the server 1 obtains, from the user DB 141 of the mass storage unit 14, a display image ID and location information corresponding to the received user ID (step S113). The control unit 11 obtains, from the display image DB 142 of the mass storage unit 14, a display image and an explanation information ID corresponding to the obtained display image ID (step S114). The control unit 11 obtains, from the explanation information DB 143 of the mass storage unit 14, explanation information corresponding to the obtained explanation information ID (step S115). The communication unit 23 of the server 1 transmits, to the terminal 2, the obtained display image, and location information and explanation information associated with the display image (step S116). The communication unit 23 of the terminal 2 receives the display image, and the location information and the explanation information associated with the display image that are transmitted from the server 1 (step S213). The control unit 21 of the terminal 2 specifies a spherical position in the photographed image of the earth ball 3 corresponding to the received location information. The control unit 21 of the terminal 2 displays, through the display unit 26 of the terminal 2, the received display image and the explanation information associated with the display image to be superimposed in the specified spherical position (step S214).

Subsequently, processing for setting publication information correspondingly to a display image to be displayed in a superimposed manner on the photographed image of the earth ball 3 will be described. The types of publication information include types of "open", "not open" and "partly open". When "open" is set, the display image is open to the public without restriction. When "not open" is set, the display image is open to merely users having the display image but not open to the other users. When "partly open" is set, the display image is open to users meeting a condition in a publication range. In the present embodiment, the publication ranges that can be set for the "partly open" is the same ranks as those stored in the user DB 141, that is, the three ranks of "regular", "silver" and "gold". In summary, the display image is open to users set in the rank equal to or higher than a specified rank. Specifically, if the rank "regular" is set as the condition for the "partly open", the display image is open to users in the "regular", "silver" and "gold" ranks. If the rank "silver" is set as the condition for the "partly open", the display image is open to users in the "silver" and "gold" ranks. If the rank "gold" is set as the condition for the "partly open", the display image is open to users in the "gold" rank alone. Besides, the publication information may be set in selecting a display image so as to be transmitted to the server 1 simultaneously with the display image, or the publication information may be additionally set correspondingly to a display image already transmitted and transmitted to the server 1. The control unit 11 of the server 1 stores, in the publication information DB 144 of the mass storage unit 14, the publication information transmitted from the terminal 2.

Figure 16:
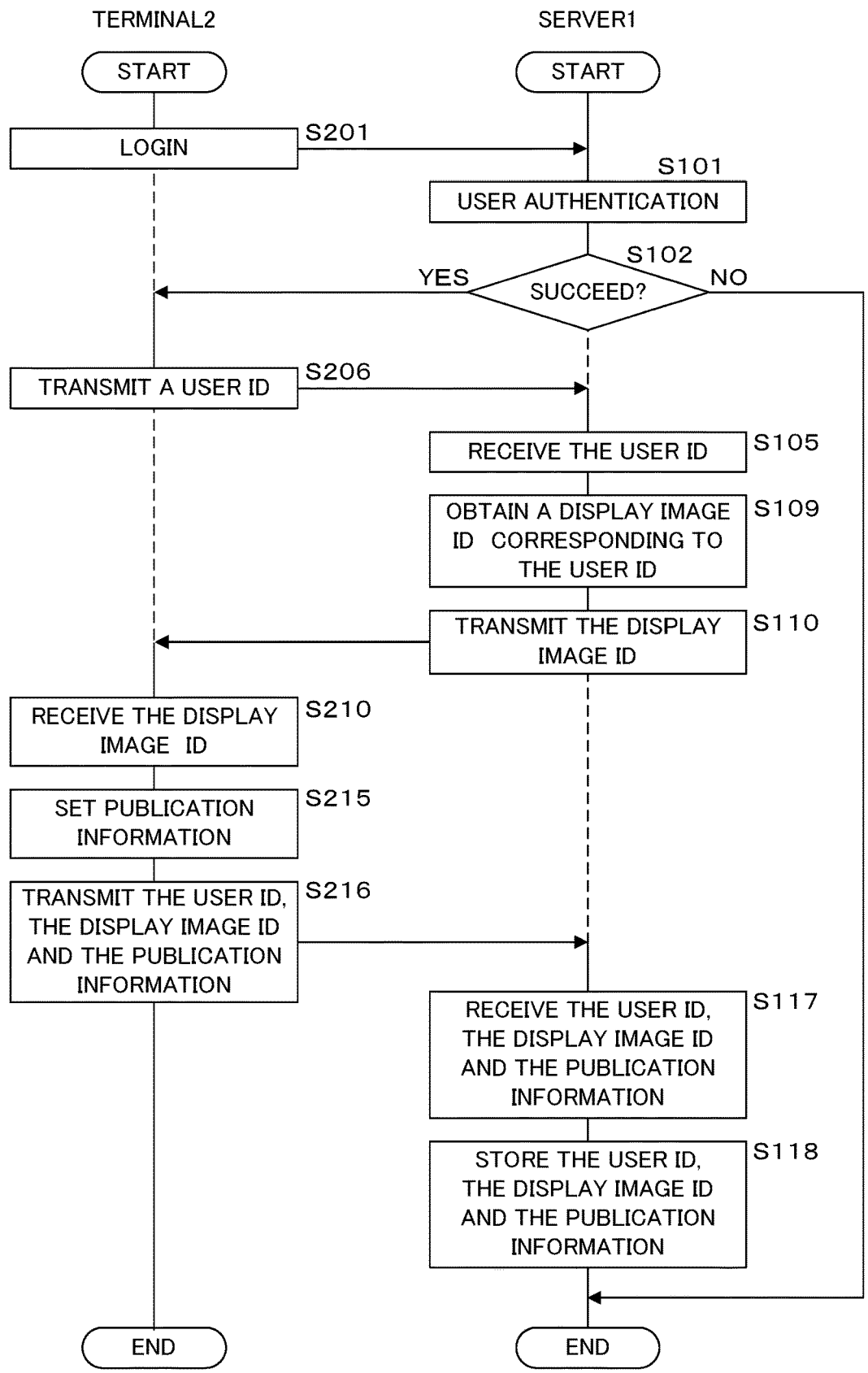
FIG. 16 is a flowchart illustrating procedures in processing for transmitting publication information by the terminal of Embodiment 1.

FIG. 16 is a flowchart illustrating procedures in processing for transmitting publication information by the terminal 2 of Embodiment 1. Procedures common to those illustrated in FIG. 14 are not described here with like reference signs used. The control unit 21 of the terminal 2 sets publication information in association with the user ID and the received display image ID (step S215). The communication unit 23 of the terminal 2 transmits the user ID, the display image ID and the publication information to the server 1 (step S216). The communication unit 13 of the server 1 receives the user ID, the display image ID and the publication information that are transmitted from the terminal 2 (step S117). The control unit 11 of the server 1 stores, in association with the user ID and the display image ID thus received, the received publication information in the publication information DB 144 of the mass storage unit 14 (step S118).

Figure 17:
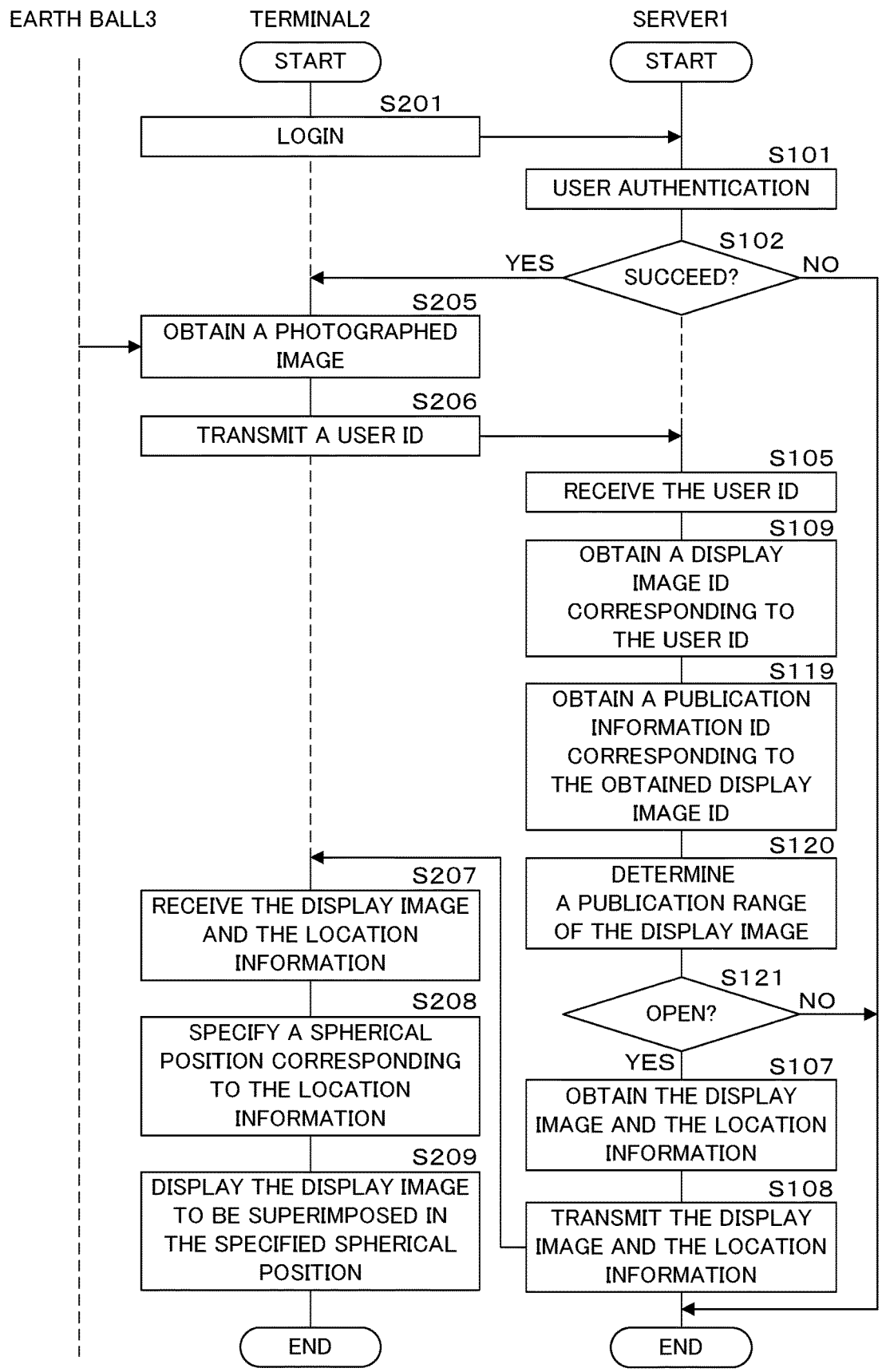
FIG. 17 is a flowchart illustrating procedures in processing for receiving a display image based on the publication information by the terminal of Embodiment 1.

FIG. 17 is a flowchart illustrating procedures in processing for receiving a display image based on publication information by the terminal 2 of Embodiment 1. Procedures common to those illustrated in FIGS. 12 and 14 are not described here with like reference signs used. The control unit 11 of the server 1 obtains, from the display image DB 142 of the mass storage unit 14, a publication information ID corresponding to the obtained display image ID (step S119). The control unit 11 determines a publication range of the display image based on the obtained publication information ID (step S120). Subroutine processing for determining the publication range will be described later. The control unit 11 of the server 1 determines whether or not the publication range is "open" (step S121). If it is determined that the publication range is "open" (YES in step S121), the control unit 11 of the server 1 obtains the display image and location information associated with the display image. If it is determined that the publication range is "not open" (NO in step S121), the control unit 11 of the server 1 ends the processing.

Figure 18:
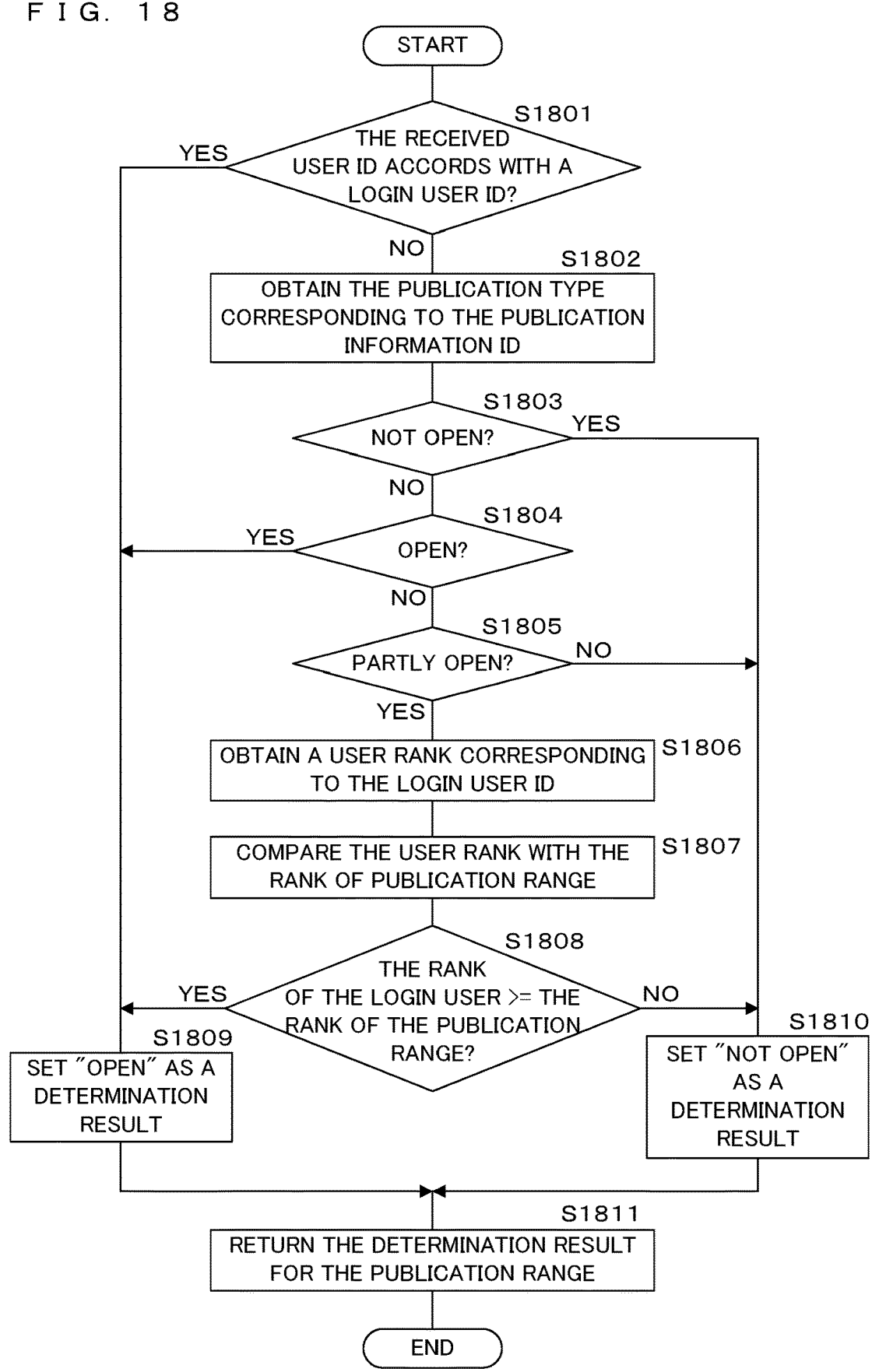
FIG. 18 is a flowchart illustrating procedures in subroutine processing for determining a publication range in Embodiment 1.

FIG. 18 is a flowchart illustrating procedures in the subroutine processing for determining the publication range in Embodiment 1. The control unit 11 of the server 1 determines whether or not the received user ID accords with a login user ID (step S1801). If it is determined that the received user ID accords with the login user ID (YES in step S1801), the control unit 11 sets "open" as a determination result because the display restriction is not put on the user himself/herself (step S1809). If it is determined that the received user ID does not accord with the login user ID (NO in step S1801), the control unit 11 obtains the publication type corresponding to the publication information ID from the publication information DB 144 of the mass storage unit (step S1802). The control unit 11 determines whether or not the publication type is "not open" (step S1803). If it is determined that the publication type is "not open" (YES in step S1803), the control unit 11 sets "not open" as the determination result (step S1810). If it is determined that the publication type is not "not open" (NO in step S1803), the control unit 11 determines whether or not the publication type is "open" (step S1804). If it is determined that the publication type is "open" (YES in step S1804), the control unit 11 sets "open" as the determination result (step S1809). If it is determined that the publication type is not "open" (NO in step S1804), the control unit 11 determines whether or not the publication type is "partly open" (step S1805). If it is determined that the publication type is "partly open" (YES in step S1805), the control unit 11 obtains, from the user DB 141 of the mass storage unit 14 of the server 1, a user rank corresponding to the login user ID (step S1806). The control unit 11 compares the obtained user rank with the rank of the publication range (step S1807). The control unit 11 determines whether or not the user rank is equal to or higher than the rank of the publication range (step S1808). If it is determined that the user rank is equal to or higher than the rank of the publication range (YES in step S1808), the control unit 11 sets "open" as the determination result (step S1809). If it is determined that the user rank is lower than the rank of the publication range (NO in step S1808), the control unit 11 sets "not open" as the determination result (step S1810). If it is determined that the publication information is not "partly open" (NO in step S1805), the control unit 11 sets "not open" as the determination result (step S1810). After the procedures of step S1809 and step S1810, the control unit 11 returns the determination result for the publication range (step S1811).

According to the present embodiment, as a user can freely perform setting of a display image, self-direction of the user can be induced.

According to the present embodiment, explanation information associated with a display image can be displayed in a superimposed manner on a photographed image of a sphere.

According to the present embodiment, a display image can be shared by users belonging to a publication range. Besides, when "open", "not open" or "partly open" is set, a security level can be increased. Furthermore, a multipurpose AR system can be realized with the publication range appropriately set.

Embodiment 2

In the present embodiment, a cruise operation system will be exemplarily described as an exemplified aspect of the AR system. A control unit 21 of a terminal 2 of a travel agency (which terminal 2 will be hereinafter referred to as the travel agency terminal 2) accepts, based on a cruise operation route, selection of display images of a plurality of tourist attractions to be displayed in a superimposed manner on a photographed image of an earth ball 3. The display images of the tourist attractions may be photographed with an imaging unit 27 of the travel agency terminal 2, may be selected from an album 24 of the travel agency terminal 2, or may be received from an external apparatus not shown via a communication unit 23 of the travel agency terminal 2. The control unit 21 of the travel agency terminal 2 obtains location information of each of the accepted plural display images, and associates the accepted plural display images and the obtained location information with a user ID thereof. The processing for obtaining the location information is performed in the same manner as the processing for obtaining the location information described in Embodiment 1, and hence is not described here. The communication unit 23 of the travel agency terminal 2 transmits, to a server 1, the accepted plural display images and the location information associated with the display images. The server 1 stores, in a mass storage unit 14, the user ID, the plural display images and the location information associated with the display images that are transmitted from the travel agency terminal 2.

In this manner, the display images relating to the cruise operation information provided by the travel agency can be displayed, through a display unit 26 of the terminal 2 of a tourist (which terminal 2 will be hereinafter referred to as the tourist terminal 2), in a superimposed manner on the photographed image of the earth ball 3. The control unit 21 of the tourist terminal 2 obtains the photographed image of the earth ball 3 photographed with the imaging unit 27 of the tourist terminal 2. The communication unit 23 of the tourist terminal 2 transmits the user ID of the travel agency to the server 1.

A communication unit 13 of the server 1 receives the user ID of the travel agency transmitted from the tourist terminal 2. A control unit 11 of the server 1 obtains, from a user DB 141 of the mass storage unit 14, the plural display images corresponding to the user ID of the travel agency and the location information associated with the display images. The communication unit 13 of the server 1 transmits, to the tourist terminal 2, the obtained plural display image and the location information associated with the display images.

The communication unit 23 of the tourist terminal 2 receives the plural display images and the location information associated with the display images relating to the cruise operation information of the travel agency that are transmitted from the server 1. The plural display images thus received can be switched in a time order or in a displaying order to be displayed in a superimposed manner on the photographed image of the earth ball 3. The time order may be an order from the oldest or the newest. The displaying order may be set by manual input or another method. For example, the control unit 21 may set the displaying order of the plural display images to be randomly displayed.

Figure 19:
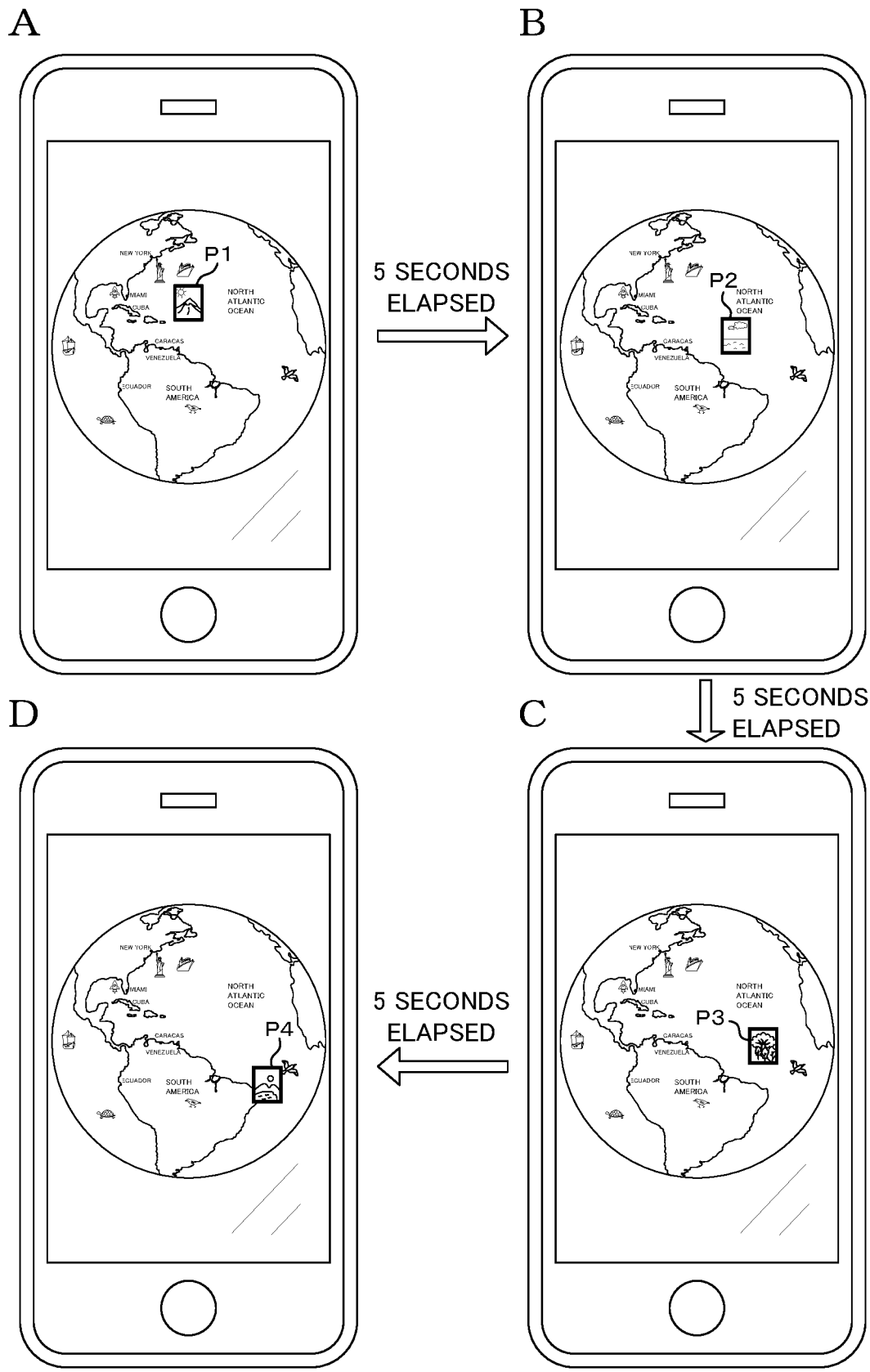
FIG. 19 is an explanatory diagram illustrating a sequential displaying operation of a terminal of Embodiment 2.

FIG. 19 is an explanatory diagram used for explaining a sequential display operation of the terminal 2 of Embodiment 2. In the following description, it is assumed that the display images are displayed in the time order. For example, display images P1, P2, P3 and P4 illustrated in these drawings represent sightseeing spots relating to the cruise operation route. The communication unit 23 of the tourist terminal 2 receives the display images P1, P2, P3 and P4. The received display images P1, P2, P3 and P4 are images created, based on a travel direction of the cruise operation route, in the time order from the oldest. When, for example, the display image P1 corresponds to a place of departure, the display image P1 is the oldest, and when the display image P4 corresponds to a final destination, the display image P4 is the newest. The control unit 21 of the tourist terminal 2 extracts time information from the received display images P1, P2, P3 and P4. The control unit 21 of the terminal 2 sorts the display images P1, P2, P3 and P4 in the time order from the oldest based on the extracted time information. For example, as a result of sorting, the display images are sorted in the order of P1, P2, P3 and P4. The control unit 21 of the tourist terminal 2 sets, with respect to the sorted plural display images, a display time interval to 5 seconds. It is noted that the display time interval may be set to an arbitrary time interval.

The control unit 21 of the tourist terminal 2 obtains the first display image from the sorted plural display images. The control unit 21 of the tourist terminal 2 specifies a spherical position in the photographed image corresponding to location information associated with the first display image. The control unit 21 of the tourist terminal 2 displays, through the display unit 26 of the tourist terminal 2, the first display image to be superimposed in the specified spherical position. A timer of a clock unit 28 of the tourist terminal 2 is activated for counting elapsed time. After the elapse of 5 seconds, the control unit 21 of the tourist terminal 2 clears the first display image having been displayed from the photographed image of the earth ball 3, and obtains the second display image from the plural display images. The control unit 21 of the tourist terminal 2 specifies a spherical position in the photographed image corresponding to the location information associated with the second display image. The control unit 21 of the tourist terminal 2 displays, through the display unit 26 of the tourist terminal 2, the second display image to be superimposed in the specified spherical position. It is noted that the display image having been displayed in the spherical position may not be cleared from the photographed image before obtaining the next display image from the plural display images. The processing for displaying the third and fourth display images is the same as that for the second display image, and hence not described here. After displaying the fourth display image to be superimposed in the spherical position in the photographed image corresponding to the location information associated with the fourth display image, the timer is stopped. Incidentally, the above-described processing may be continuously executed without stopping the timer. In this case, for example, the first display image is obtained again from the plural display images, and is displayed to be superimposed in the spherical position in the photographed image corresponding to the location information associated with the first display image, and thus, the plural display images can be repeatedly switched to be displayed.

Figure 20:
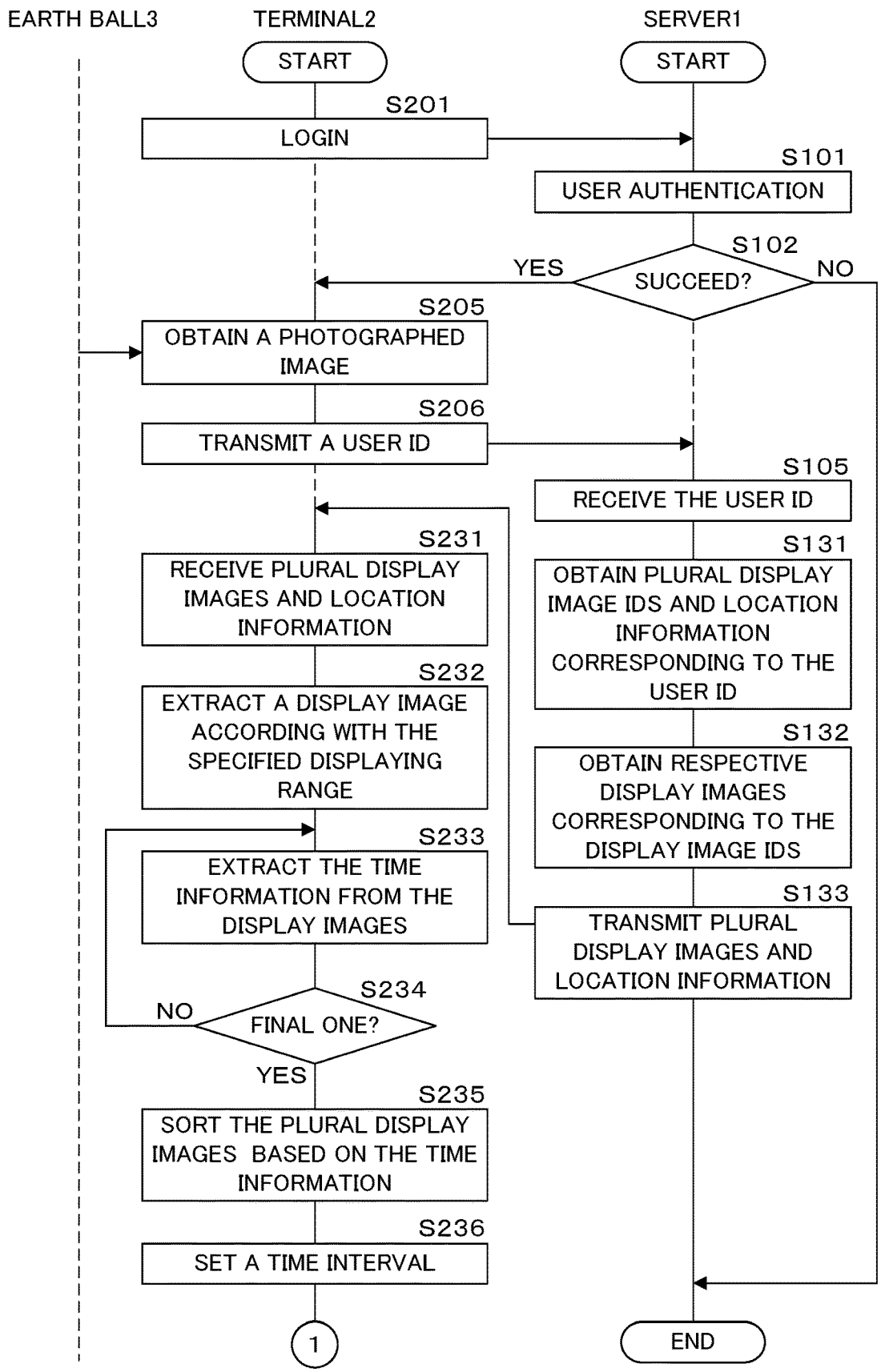
FIG. 20 is a flowchart illustrating procedures in processing for sorting a plurality of display images in date and time order in receiving the display images by the terminal of Embodiment 2.

FIG. 20 is a flowchart illustrating procedures in the sorting processing in the time order performed in receiving a plurality of display images by the terminal 2 of Embodiment 2. Procedures common to those illustrated in FIG. 12 are not described here with like reference signs used. The control unit 11 of the server 1 obtains, from the user DB 141 of the mass storage unit 14, plural display image IDs and location information corresponding to the received user ID (step S131). The control unit 11 of the server 1 obtains, from a display image DB 142 of the mass storage unit 14, respective display images corresponding to the obtained display image IDs (step S132). The communication unit 13 of the server 1 transmits, to the terminal 2, the obtained plural display images and location information associated with the display images (step S133). The communication unit 23 of the terminal 2 receives the plural display images and the location information associated with the display images that are transmitted from the server 1 (step S231). The control unit 21 of the terminal 2 specifies a displaying range based on obtained AR marker information in the photographed image of the earth ball 3, and extracts, from the received plural display images, a display image according with the specified displaying range (step S232). In the processing for specifying the displaying range, for example, the control unit 21 of the terminal 2 extracts a display center and a display radius in the photographed image of the earth ball 3, and recognizes latitude/longitude location information with respect to the extracted display center. The control unit 21 of the terminal 2 may specify the displaying range in accordance with the location information within a radius extracted with a point of the recognized latitude/longitude centered. The control unit 21 of the terminal 2 extracts the time information successively from the extracted plural display images (step S233), and determines whether or not a current display image is a final one (step S234). If it is determined that the display image is not a final one (NO in step S234), the control unit 21 of the terminal 2 returns to the procedure for extracting the time information of the display image to extract the time information of a next display image (step S233). If it is determined that the display image is a final one (YES in step S234), the control unit 21 of the terminal 2 sorts, based on the extracted plural time information, the plural display images in the order from the oldest or the newest (step S235). The control unit 21 of the terminal 2 sets a time interval for switching display of the sorted plural display images (step S236).

Figure 21:
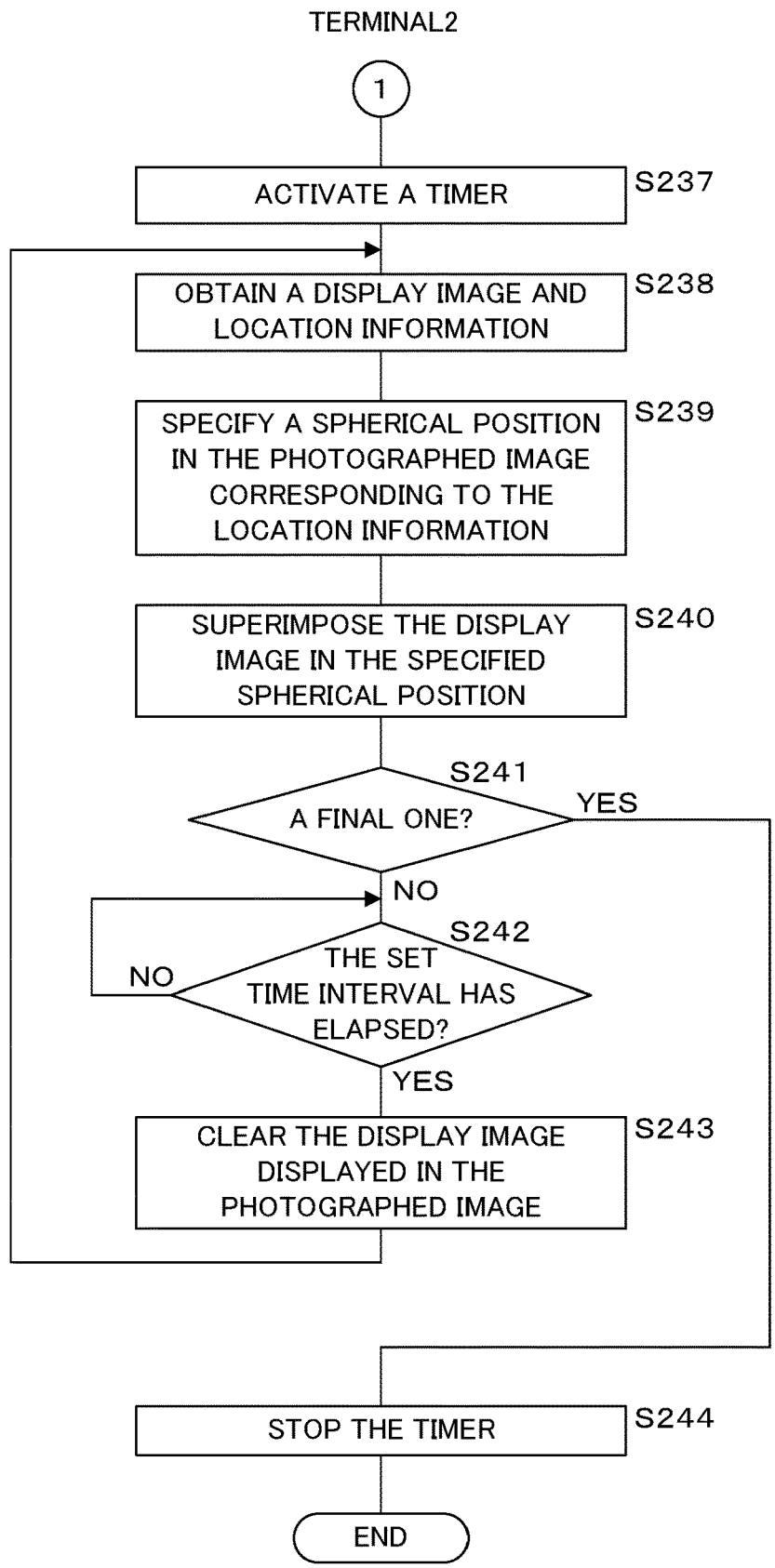
FIG. 21 is a flowchart illustrating procedures in processing for switching display images to be displayed by the terminal of Embodiment 2.

FIG. 21 is a flowchart illustrating procedures in processing for switching the display by the terminal 2 of Embodiment 2. For monitoring the time interval, a timer is activated and executed by the clock unit 28 of the terminal 2 (step S237). The control unit 21 of the terminal 2 obtains, successively from the sorted plural display images, a display image and location information associated with the display image (step S238), and specifies a spherical position in the photographed image corresponding to the obtained location information (step S239). The control unit 21 of the terminal 2 displays, through the display unit 26 of the terminal 2, the display image to be superimposed in the specified spherical position in the photographed image (step S240). The control unit 21 of the terminal 2 determines whether or not the obtained display image is a final one (step S241). If it is determined that the display image is a final one (YES in step S241), the control unit 21 of the terminal 2 stops the timer (step S244). If it is determined that the display image is not a final one (NO in step S241), the control unit 21 of the terminal 2 determines whether or not the set time interval has elapsed (step S242). If it is determined that the set time interval has not elapsed (NO in step S242), the control unit 21 of the terminal 2 continuously monitors the time with the timer. If it is determined that the set time interval has elapsed (YES in step S242), the control unit 21 of the terminal 2 clears the display image having been displayed in the photographed image (step S243). The control unit 21 of the terminal 2 returns the processing to the procedures for obtaining a display image and location information, so as to obtain, from the plural display images, a next display image and location information associated with the display image (step S238).

Figure 22:
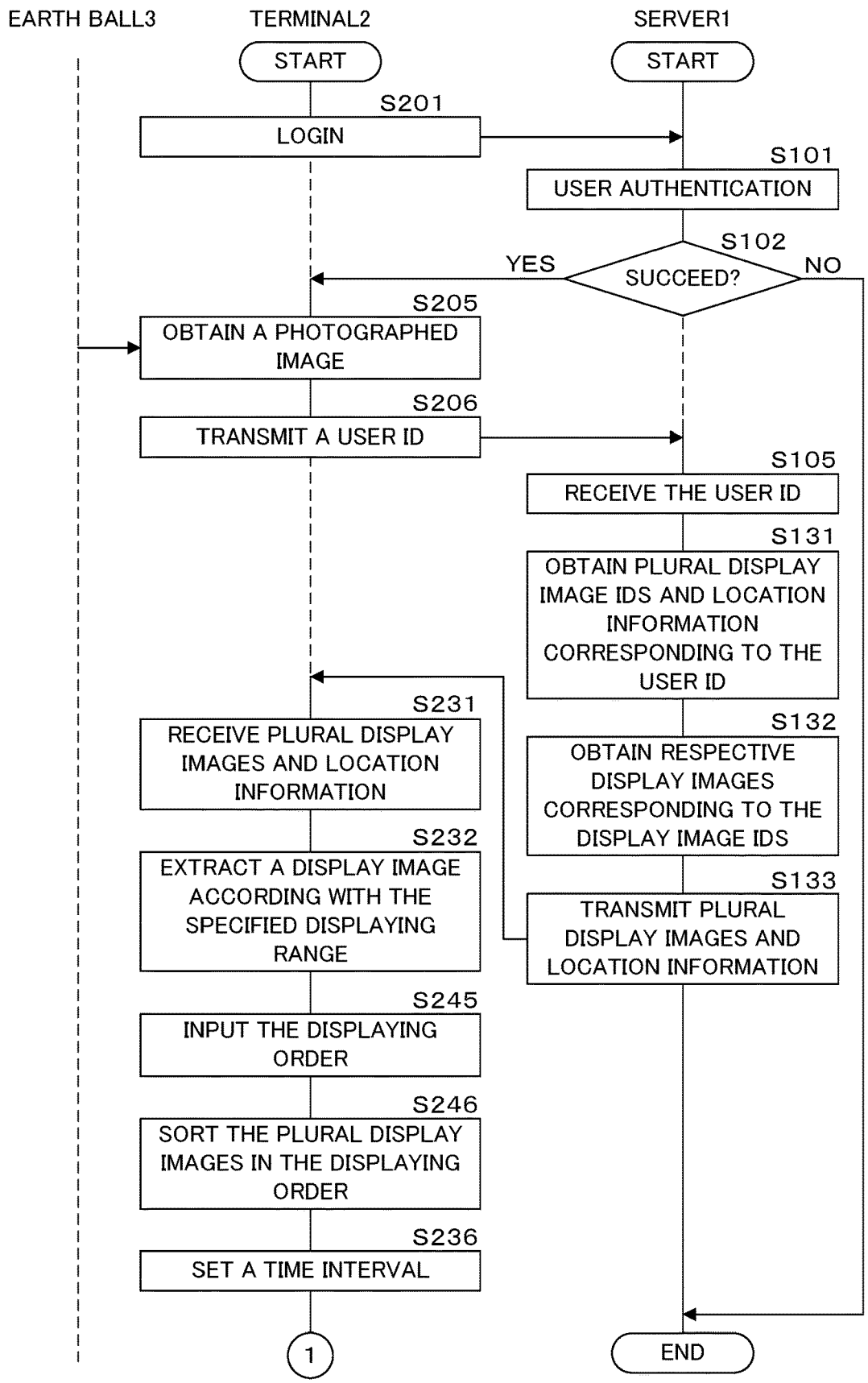
FIG. 22 is a flowchart illustrating procedures in sorting processing performed by the terminal of Embodiment 2.

FIG. 22 is a flowchart illustrating procedures in the sorting processing performed by the terminal 2 of Embodiment 2. Procedures common to those illustrated in FIG. 12 are not described here with like reference signs used. The control unit 21 of the terminal 2 accepts an input of the displaying order of the received plural display images (step S245). The control unit 21 of the terminal 2 sorts the plural display images in the order of the accepted displaying order (step S246). The procedures following this procedure are the same as those illustrated in FIG. 21 and hence are not described here.

FIG. 23 is an explanation diagram used for explaining an operation including route information performed by the terminal 2 of Embodiment 2. Here, it is assumed, based on the above-described example where the plural display images are displayed to be superimposed in the time order, that the display images are displayed to be superimposed on the photographed image of the earth ball 3 together with route information. The control unit 21 of the tourist terminal 2 sorts the display images P1, P2, P3 and P4 of the plural sightseeing spots in the time order from the oldest. The display images of the sightseeing spots are sorted, for example, in the order of P1, P2, P3 and P4. The control unit 21 of the tourist terminal 2 sets the time interval for switching the display of the plural display images. The time interval is set to, for example, 5 seconds.

As illustrated in A of FIG. 23, the control unit 21 of the tourist terminal 2 obtains, from the plural display images, the first display image P1 and the location information associated with the first display image P1. The control unit 21 of the tourist terminal 2 generates route information T1 based on the obtained location information associated with the first display image P1. The control unit 21 of the tourist terminal 2 specifies a spherical position in the photographed image of the earth ball 3 corresponding to the obtained location information associated with the first display image P1. The control unit 21 of the tourist terminal 2 displays, through the display unit 26 of the tourist terminal 2, the obtained first display image P1 and the generated route information T1 to be superimposed in the specified spherical position.

Subsequently, as illustrated in B of FIG. 23, the control unit 21 of the tourist terminal 2 obtains, after the elapse of the set time interval of 5 seconds, the next display image P2 and the location information associated with the next display image P2 from the plural display images successively along the cruse operation route. On the basis of the location information associated with the first display image P1 and the location information associated with the next display image P2, the control unit 21 of the tourist terminal 2 updates the existing route information T1. The control unit 21 of the tourist terminal 2 clears the first display image P1 having been displayed from the photographed image of the earth ball 3. The control unit 21 of the tourist terminal 2 specifies a spherical position in the photographed image of the earth ball 3 corresponding to the location information associated with the obtained next display image P2. The control unit 21 of the tourist terminal 2 displays, through the display unit 26 of the tourist terminal 2, the obtained next display image P2 and the updated route information T1 to be superimposed in the specified spherical position.

Subsequently, as illustrated in C of FIG. 23, the control unit 21 of the tourist terminal 2 obtains, after the elapse of the set time interval of 5 seconds, the next display image P3 and the location information associated with the next display image P3 from the plural display images successively along the cruse operation route. On the basis of the location information associated with the display image P1, the display image P2 and the next display image P3, the control unit 21 of the tourist terminal 2 updates the existing route information T1. The control unit 21 of the tourist terminal 2 clears the second display image P2 having been displayed from the photographed image of the earth ball 3. The control unit 21 of the tourist terminal 2 specifies a spherical position in the photographed image of the earth ball 3 corresponding to the location information associated with the obtained next display image P3. The control unit 21 of the tourist terminal 2 displays, through the display unit 26 of the tourist terminal 2, the obtained next display image P3 and the updated route information T1 to be superimposed in the specified spherical position.

Subsequently, as illustrated in D of FIG. 23, the control unit 21 of the tourist terminal 2 obtains, after the elapse of the set time interval of 5 seconds, the next display image P4 and the location information associated with the next display image P4 from the plural display images successively along the cruse operation route. On the basis of the location information associated with the display image P1, the display image P2, the display image P3 and the display image P4, the control unit 21 of the tourist terminal 2 updates the existing route information T1. The control unit 21 of the tourist terminal 2 clears the display image P3 having been displayed from the photographed image of the earth ball 3. The control unit 21 of the tourist terminal 2 specifies a spherical position in the photographed image of the earth ball 3 corresponding to the location information associated with the obtained next display image P4. The control unit 21 of the tourist terminal 2 displays, through the display unit 26 of the tourist terminal 2, the obtained next display image P4 and the updated route information T1 to be superimposed in the specified spherical position, and stops the timer. Incidentally, the above-described processing may be continuously executed without stopping the timer. In this case, the first display image is obtained again from the plural display images and the existing route information is cleared to regenerate, so that the plural display images can be repeatedly switched to be displayed together with the route information.

Incidentally, the display form of the route information is not limited to the update of the cruise operation route at every set time interval. For example, the control unit 21 of the tourist terminal 2 obtains all location information associated with a plurality of display images to generate route information on the whole operation route. The control unit 21 of the tourist terminal 2 may display, through the display unit 26 of the tourist terminal 2, the thus generated route information on the whole operation route to be superimposed in spherical positions in the photographed image corresponding to the location information. Alternatively, without displaying the display images in the display unit 26 of the tourist terminal 2, the generated route information alone may be displayed in a superimposed manner.

Figure 24:
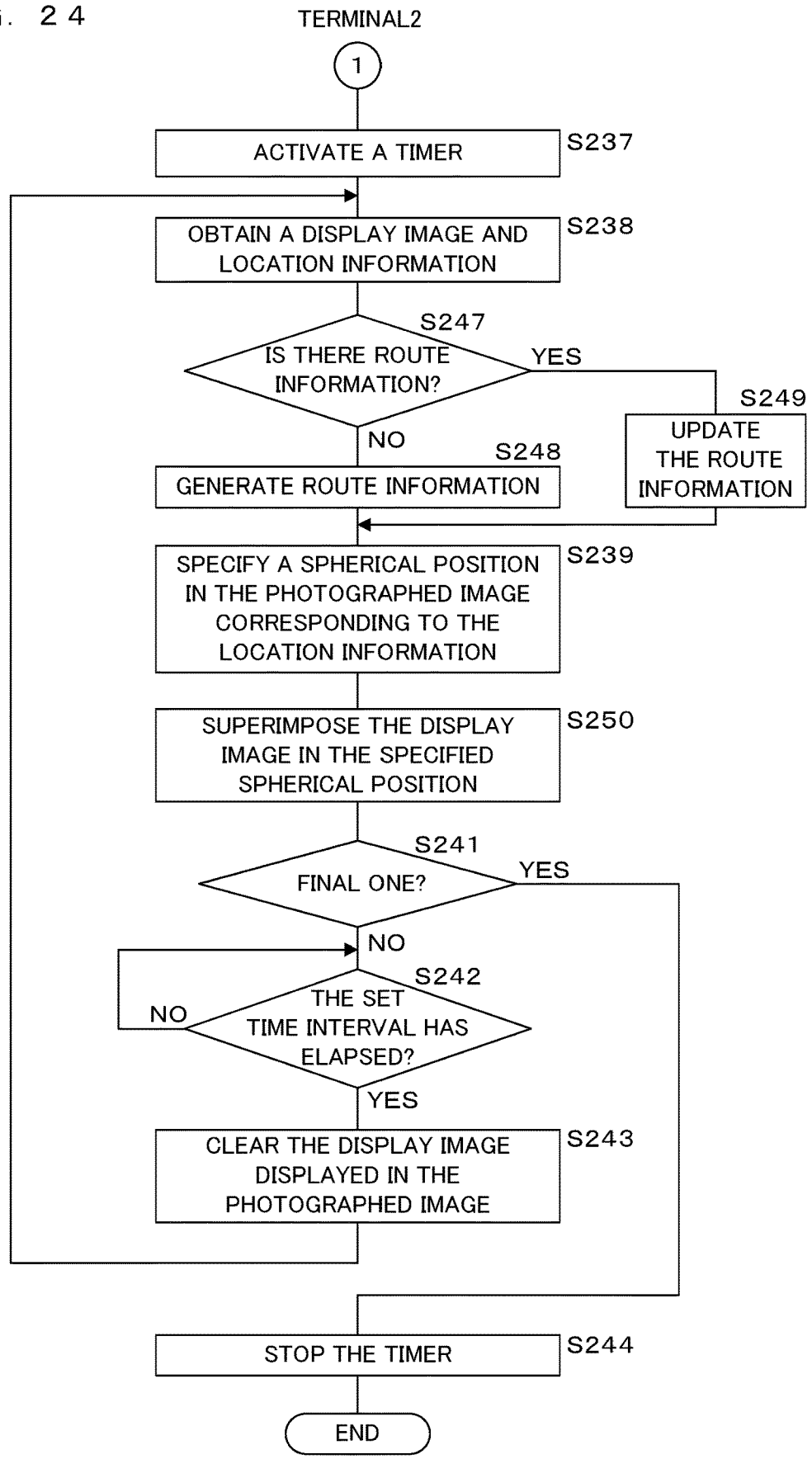
FIG. 24 is a flowchart illustrating procedures in processing for switching display including the route information performed by the terminal of Embodiment 2.

FIG. 24 is a flowchart illustrating procedures in processing for switching the display including the route information by the terminal 2 of Embodiment 2. The procedures in the processing for receiving the plural display images and the processing for sorting the display images in the time order are the same as those illustrated in FIG. 20, and hence are not described here. Besides, in FIG. 24, procedures common to those illustrated in FIG. 21 are not described here with like reference signs used. The control unit 21 of the terminal 2 determines whether or not there is route information (step S247). If it is determined that there is no route information (NO in step S247), the control unit 21 of the terminal 2 generates route information based on the location information associated with the obtained display image (step S248). If it is determined that there is existing route information (YES in step S247), the control unit 21 of the terminal 2 updates the existing route information based on the location information associated with the obtained display image (step S249). The control unit 21 of the terminal 2 specifies a spherical position in the photographed image corresponding to the location information associated with the display image. The control unit 21 of the terminal 2 displays, through the display unit 26 of the terminal 2, the display image and the route information to be superimposed in the specified spherical position (step S250).

According to the present embodiment, display images can be displayed, in an order corresponding to time information, to be superimposed in spherical positions in the photographed image corresponding to location information associated with the display images.

According to the present embodiment, display images can be displayed, in a displaying order, to be superimposed in spherical positions in the photographed image corresponding to location information associated with the display images.

According to the present embodiment, route information is generated based on location information associated with a plurality of display images, and the generated route information can be displayed to be superimposed in spherical positions in the photographed image corresponding to location information associated with the display images.

According to the present embodiment, various information including images of tourist attractions relating to a cruise operation and visit schedule can be provided. A cruising route is thus visualized so that services relating to a cruise operation route, a travel direction and the like can be provided.

The present embodiment is applicable to a climbing route, a flight route of an airline company or the like. For example, in application to a climbing route, a three-dimensional image is generated by a drawing method for 3D objects or the like with the heights of mountains, a river, a lake, a sea and the like respectively distinguishably colored, and the generated three-dimensional image can be displayed to be superimposed on a photographed image of the earth ball 3.

Embodiment 3

In the present embodiment, a treasure hunting game system will be exemplarily described as an exemplified aspect of the AR system.

Figure 25:
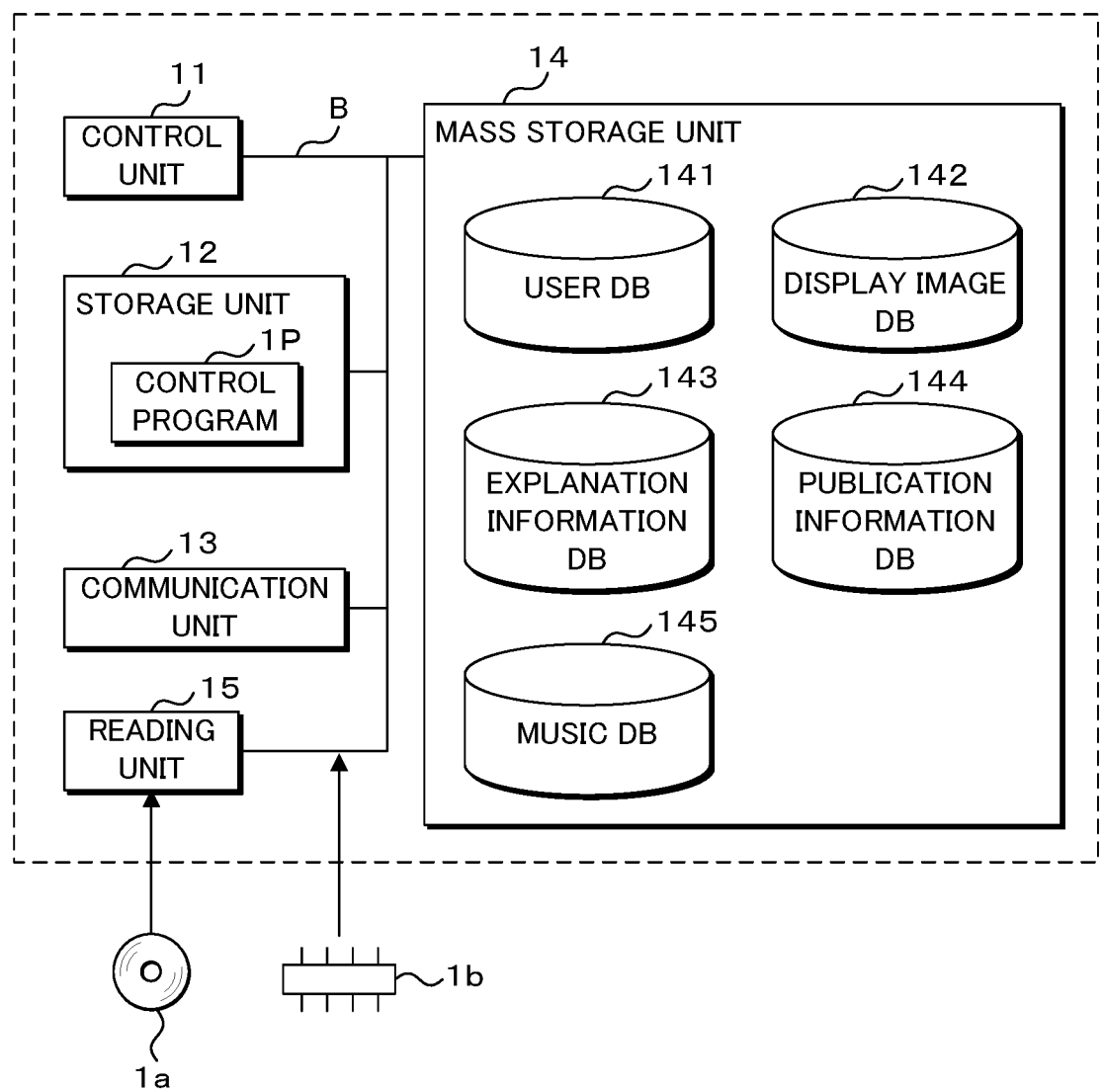
FIG. 25 is a block diagram illustrating a structure example of a server of Embodiment 3.

FIG. 25 is a block diagram illustrating a structure example of a server 1 of Embodiment 3. Components common to those illustrated in FIG. 2 are not described here with like reference signs used. The mass storage unit 14 includes a music DB 145. The music DB 145 stores data of music and sound effects.

FIG. 26 is an explanatory diagram illustrating an example of a record layout of the user DB 141 of Embodiment 3. Elements common to those illustrated in FIG. 3 are not described here. The user DB 141 includes a music ID column. In the music ID column, a music ID with which music transmitted from a terminal 2 can be uniquely identified is stored in association with a user ID.

FIG. 27 is an explanatory diagram illustrating an example of a record layout of the music DB 145. The music DB 145 includes a music ID column and a music column. In the music ID column, an ID of music to be uniquely specified for identifying the music is stored. In the music column, data of the music corresponding to the music ID is stored.

Game contents of the treasure hunting game include a display image and music. A terminal 2 of a game company providing the treasure hunting game (which terminal 2 will be hereinafter referred to as the game company terminal 2) transmits a display image of the treasure hunting game, and location information and music associated with the display image to the server 1 in association with a user ID of the game company. In the present embodiment, the music is, for example, a sound effect relating to a game scenario. The control unit 11 of the server 1 stores, in the mass storage unit 14 in association with the user ID of the game company, the display image, the location information and the sound effect that are transmitted from the game company terminal 2. Specifically, the control unit 11 of the server 1 assigns a unique display image ID to the display image, and assigns a unique music ID to the sound effect. The control unit 11 of the server 1 stores the user ID of the game company, the display image ID, the music ID and the location information as one record in the user DB 141. The control unit 11 of the server 1 stores the display image ID and data of the display image as one record in the display image DB 142. The control unit 11 of the server 1 stores the music ID and data of the music as one record in the music DB 145.

In this manner, the game contents provided by the game company can be displayed through the display unit 26 of the terminal 2 of a player (which terminal 2 will be hereinafter referred to as the player terminal 2) in a superimposed manner on a photographed image of the earth ball 3. A communication unit 23 of the player terminal 2 receives the display image corresponding to the user ID of the game company, and the location information and the sound effect associated with the display image that are transmitted from the server 1. A control unit 21 of the player terminal 2 specifies a spherical position in the photographed image of the earth ball 3 corresponding to the received location information. The control unit 21 of the player terminal 2 displays, through the display unit 26 of the player terminal 2, the received display image to be superimposed in the specified spherical position. The control unit 21 of the player terminal 2 reproduces the received sound effect through a speaker 20 of the player terminal 2.

FIG. 28 is an explanatory diagram used for explaining an operation of the AR system of Embodiment 3. Display images G1, G2 and G3 illustrated in these drawings are, for example, display images of spots where a treasure can be buried. A display image G4 illustrated in these drawings is a display image of a hint map. A display image G5 illustrated in the drawing is a display image of a treasure.

As illustrated in A of FIG. 28, the control unit 21 of the player terminal 2 specifies spherical positions in the photographed image of the earth ball 3 corresponding to location information associated with the received display images G1, G2 and G3. The control unit 21 of the player terminal 2 displays, through the display unit 26 of the player terminal 2, the display images G1, G2 and G3 to be superimposed in the specified spherical positions. When a tapping operation on the display image G2 is accepted through an input unit 25 of the player terminal 2, the control unit 21 of the player terminal 2 obtains, based on the game scenario, an instruction according with the display image G2. For example, when the control unit 21 of the player terminal 2 determines that the instruction according with the display image G2 is an instruction to display a hint map, the control unit 21 of the player terminal 2 obtains the display image G4. Incidentally, the game scenario may be included in an application, or may be received from the server 1 or an external apparatus not shown through the communication unit 23 of the terminal 2.

Subsequently, as illustrated in B of FIG. 28, the control unit 21 of the player terminal 2 specifies a spherical position in the photographed image of the earth ball 3 corresponding to the location information associated with the display image G4. The control unit 21 of the player terminal 2 displays, through the display unit 26 of the player terminal 2, the display image G4 to be superimposed in the specified spherical position. The control unit 21 of the player terminal 2 reproduces a sound effect corresponding to the hint map not shown through the speaker 20 of the player terminal 2. After displaying the display image G4 in a superimposed manner, the display image G4 can be switched to a thumbnail image thereof to be displayed. For example, the control unit 21 of the player terminal 2 accepts a tapping operation on the display image G4 again through the input unit 25 of the player terminal 2. The control unit 21 of the player terminal 2 may switch, in the photographed image of the earth ball 3, the display image G4 to display the thumbnail image of the display image G4. Besides, a timer function may be used. In using the timer function, the control unit 21 of the player terminal 2 activates a timer of a clock unit 28 of the player terminal 2 to count elapsed time. After the elapse of, for example, 5 seconds, the control unit 21 of the player terminal 2 may automatically switch, in the photographed image of the earth ball 3, the display image G4 to display the thumbnail image of the display image G4. After the switching to display the thumbnail image of the display image G4, the control unit 21 of the player terminal 2 stops the timer. Incidentally, a thumbnail image of a display image is exemplarily described in the present embodiment, which does not limit the present disclosure. Instead, for example, the display image G4 may be cleared from the photographed image of the earth ball 3, or the display image G4 may be continuously displayed in the photographed image of the earth ball 3.

Subsequently, as illustrated in C of FIG. 28, in response to the presented hint, a treasure is searched for in another spot where the treasure can be buried. For example, the control unit 21 of the player terminal 2 accepts, through the input unit 25 of the player terminal 2, a tapping operation on the display image G3 corresponding to another spot where the treasure can be buried. The control unit 21 of the player terminal 2 obtains, based on the game scenario, an instruction according with the display image G3. For example, when it is determined that the instruction according with the display image G3 is an instruction to display a treasure, the control unit 21 of the player terminal 2 obtains the display image G5.

Next, as illustrated in D of FIG. 28, the control unit 21 of the player terminal 2 specifies a spherical position in the photographed image corresponding to the location information associated with the display image G5. The control unit 21 of the player terminal 2 displays, through the display unit 26 of the player terminal 2, the display image G5 to be superimposed in the specified spherical position. The control unit 21 of the player terminal 2 reproduces a sound effect corresponding to treasure discovery not shown through the speaker 20 of the player terminal 2. Incidentally, the display image G4 of the hint map or the display image G5 of the treasure may be displayed in the whole screen of the display unit 26 of the player terminal 2, or may be displayed in a part of the screen.

Besides, when there is explanation information associated with a display image, the control unit 21 of the player terminal 2 may display, through the display unit 26 of the player terminal 2, the display image and the explanation information associated with the display image in a superimposed manner on the photographed image of the earth ball 3. For example, as illustrated in B of FIG. 28, explanation information associated with the display image G4 of the hint map is "Hint: Go to the sea and search!". As illustrated in D of FIG. 28, explanation information associated with the display image G5 of the treasure is "Congratulations! You won the treasure!".

Figure 29:
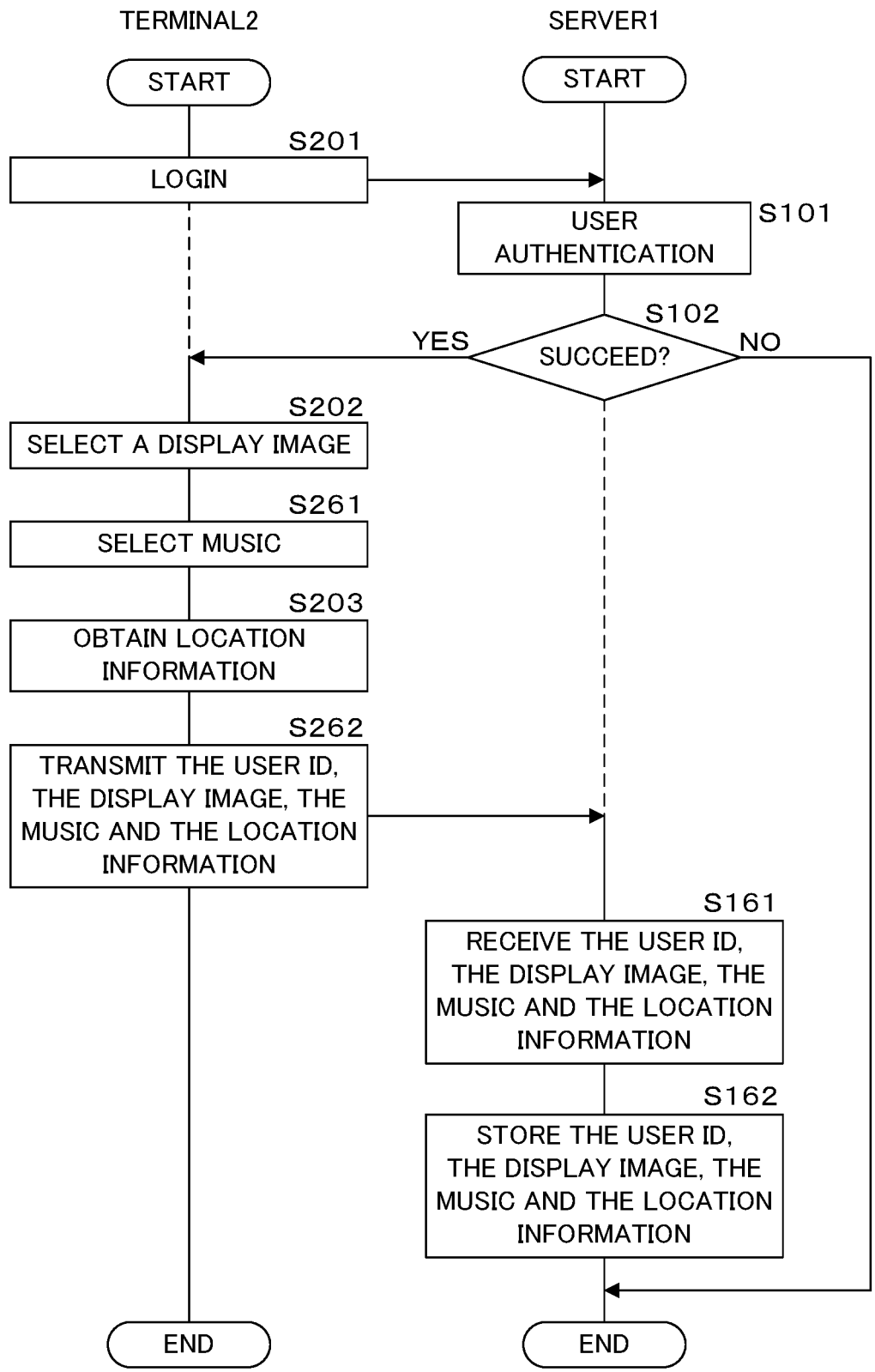
FIG. 29 is a flowchart illustrating procedures in processing for transmitting a display image and music by a terminal of Embodiment 3.

FIG. 29 is a flowchart illustrating procedures in processing for transmitting a display image and music by the terminal 2 of Embodiment 3. Procedures common to those illustrated in FIG. 11 are not described here with like reference signs used. The control unit 21 of the terminal 2 accepts selection of music to be reproduced correspondingly to display in a specific position in the photographed image of the earth ball 3 (step S261). The control unit 21 of the terminal 2 associates the selected display image, the music and the obtained location information with the user ID. The communication unit 23 of the terminal 2 transmits the user ID, the display image, the music and the location information to the server 1 (step S262). The communication unit 13 of the server 1 receives the user ID, the display image, the music and the location information that are transmitted from the terminal 2 (step S161). The control unit 11 of the server 1 stores the display image, the music and the location information thus received in the mass storage unit 14 in association with the user ID (step S162).

Figure 30:
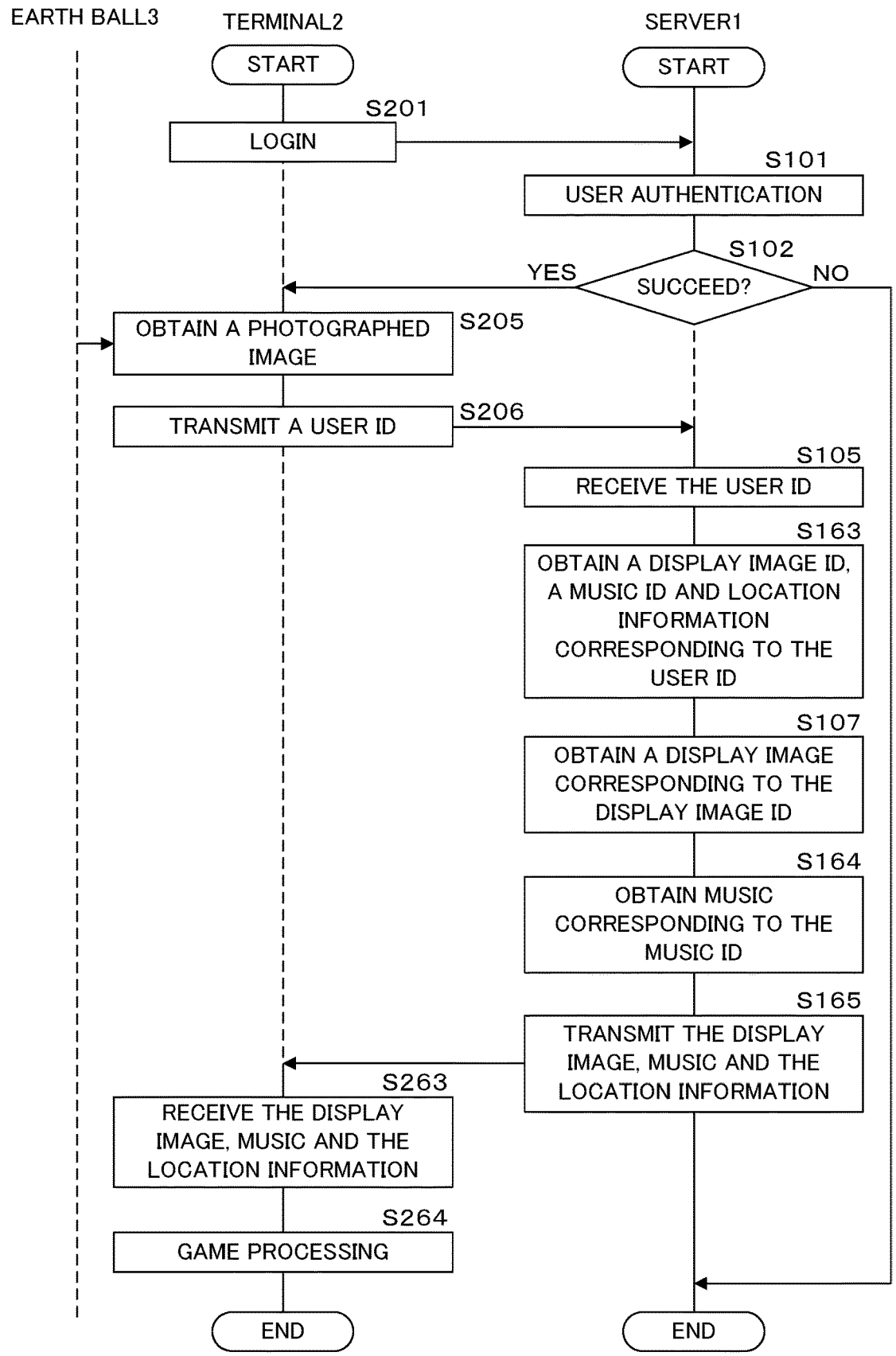
FIG. 30 is a flowchart illustrating procedures in processing for receiving a display image and music by the terminal of Embodiment 3.

FIG. 30 is a flowchart illustrating procedures in processing for receiving a display image and music by the terminal 2 of Embodiment 3. Procedures common to those illustrated in FIG. 12 are not described here with like reference signs used. The control unit 11 of the server 1 obtains, from the user DB 141 of the mass storage unit 14, a display image ID, a music ID and location information corresponding to the user ID transmitted from the terminal 2 (step S163). The control unit 11 of the server 1 obtains, from the music DB 145 of the mass storage unit 14, music corresponding to the obtained music ID (step S164). The communication unit 13 of the server 1 transmits, to the terminal 2, the obtained display image and music, and the location information associated with the display image (step S165). The communication unit 23 of the terminal 2 receives the display image, the music and the location information associated with the display image that are transmitted from the server 1 (step S263). The control unit 21 of the terminal 2 performs game processing in accordance with the display image, the music and the location information associated with the display image thus received (step S264). The flow of the game processing will be described next.

Figure 31:
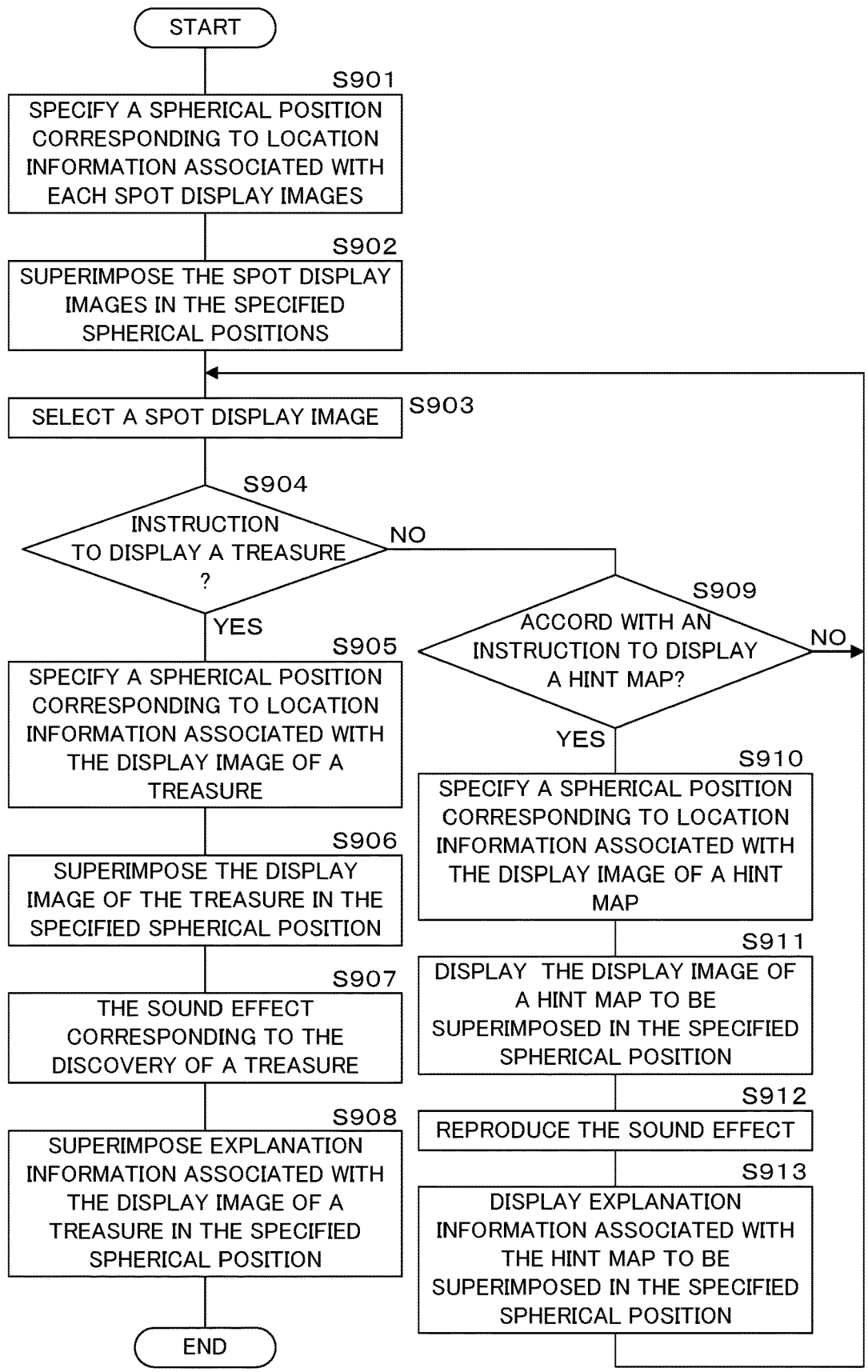
FIG. 31 is a flowchart illustrating procedures in game processing of Embodiment 3.

FIG. 31 is a flowchart illustrating procedures in the game processing of Embodiment 3. The control unit 21 of the terminal 2 specifies a spherical position in the photographed image corresponding to location information associated with each display image corresponding to a spot where a treasure can be buried (step S901). In the following description, the display image corresponding to the spot where the treasure can be buried is referred to as a spot display image for the sake of simplification. The control unit 21 of the terminal 2 displays, through the display unit 26 of the terminal 2, the spot display images to be superimposed in the specified spherical positions (step S902). The control unit 21 of the terminal 2 accepts, through the input unit 25 of the terminal 2, selection of a spot display image (step S903). On the basis of the game scenario, the control unit 21 of the terminal 2 determines whether or not the selected spot display image corresponds to the instruction to display a treasure (step S904). If it is determined that the selected spot display image accords with the instruction to display a treasure (YES in step S904), the control unit 21 of the terminal 2 specifies a spherical position in the photographed image corresponding to location information associated with the display image of a treasure (step S905). The control unit 21 of the terminal 2 displays, through the display unit 26 of the terminal 2, the display image of the treasure to be superimposed in the specified spherical position (step S906). The control unit 21 of the terminal 2 reproduces, through the speaker 20 of the terminal 2, the sound effect corresponding to the discovery of a treasure (step S907). The control unit 21 of the terminal 2 displays, through the display unit 26 of the terminal 2, explanation information associated with the display image of a treasure to be superimposed in the specified spherical position (step S908), and ends the processing. If it is determined that the selected spot display image does not accord with the instruction to display a treasure (NO in step S904), the control unit 21 of the terminal 2 determines whether or not the selected spot display image accords with an instruction to display a hint map (step S909). If it is determined that the selected spot display image accords with the instruction to display a hint map (YES in step S909), the control unit 21 of the terminal 2 specifies a spherical position in the photographed image corresponding to location information associated with the display image of a hint map (step S910). The control unit 21 of the terminal 2 displays, through the display unit 26 of the terminal 2, the display image of a hint map to be superimposed in the specified spherical position (step S911). The control unit 21 of the terminal 2 reproduces the sound effect of the hint map through the speaker 20 of the terminal 2 (step S912). The control unit 21 of the terminal 2 displays, through the display unit 26 of the terminal 2, explanation information associated with the display image of the hint map to be superimposed in the specified spherical position (step S913). After the procedure of step S913, if it is determined that the selected display image does not accord with an instruction to display a hint map (NO in step S909), the control unit 21 of the terminal 2 returns the processing to the procedure for accepting the selection of a spot display image (step S903).

According to the present embodiment, display images and music can be enjoyed together. If there is a scenario as in a treasure hunting game and the like, a player can easily get excited by using a sound effect and the like. Alternatively, a service for providing music alone may be offered. For example, when a user obtains location information of birthplaces of singers of various countries and transmits music of the singers and the obtained location information to the server 1, the user can obtain and enjoy reproducing music corresponding to the location information of the birthplaces of the singers of the various countries.

Embodiment 4

In the present embodiment, an aspect in which an AR system is applied to different types of spheres will be exemplarily described. There are a variety of types of spheres depending on the language to be displayed, the size, the maker and the like of the sphere. In different types of spheres, markers are recognized using different marker recognition systems.

Figure 32:
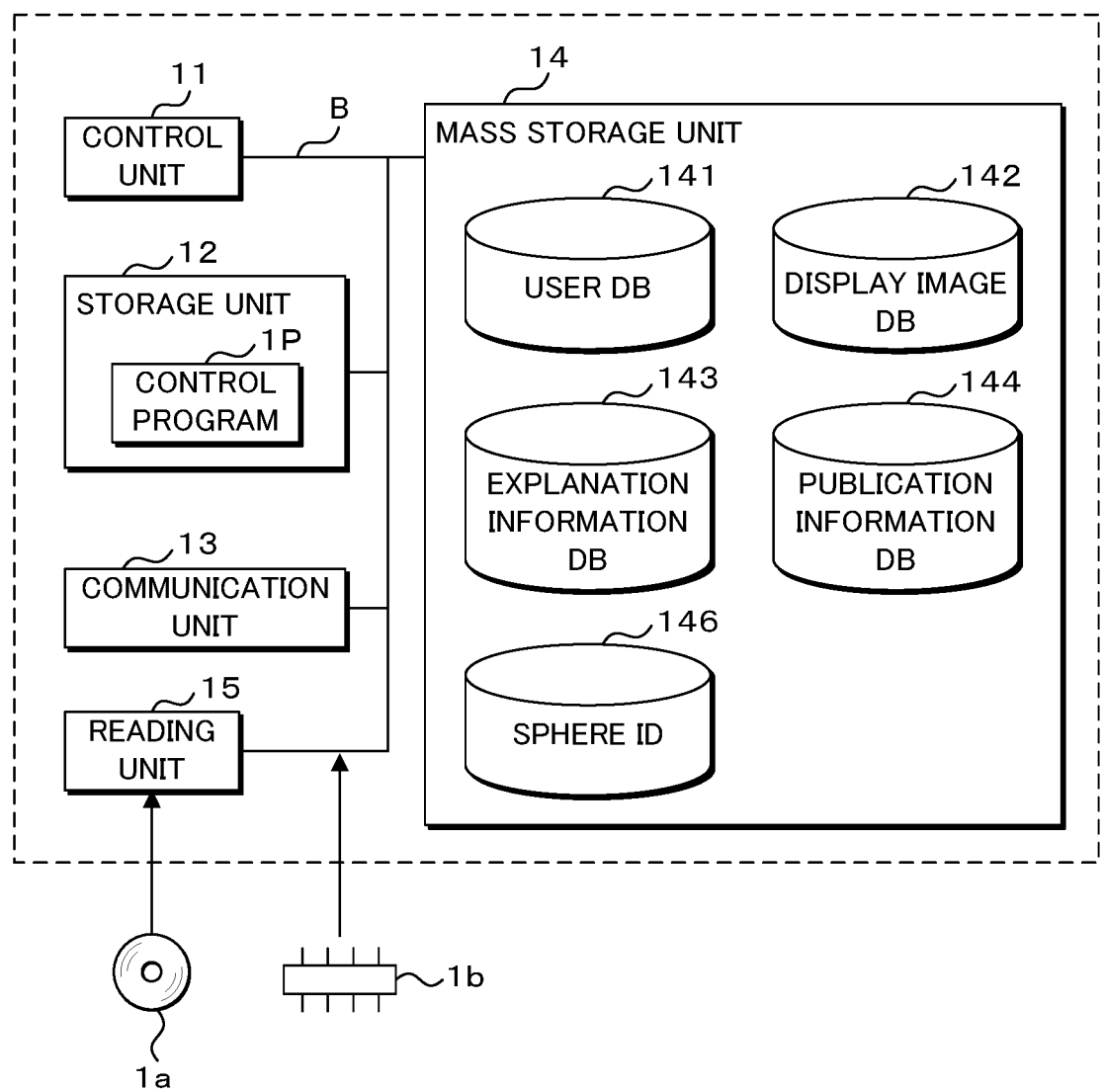
FIG. 32 is a block diagram illustrating a structure example of a server of Embodiment 4.

FIG. 32 is a block diagram illustrating a structure example of a server 1 of Embodiment 4. Components common to those illustrated in FIG. 2 are not described here with like reference signs used. The mass storage unit 14 includes a sphere DB 146. The sphere DB 146 stores sphere information.

FIG. 33 is an explanatory diagram illustrating an example of a record layout of the user DB 141 of Embodiment 4. Elements common to those illustrated in FIG. 3 are not described here. The user DB 141 includes a sphere ID column. In the sphere ID column, an ID with which sphere information can be uniquely identified is stored.

FIG. 34 is an explanatory diagram illustrating an example of a record layout of the sphere DB 146. The sphere DB 146 includes a sphere ID column, a maker column, a size column and a language column. In the sphere ID column, a sphere ID uniquely specified for identifying the sphere is stored. In the maker column, a name of the maker of the sphere is stored. In the size column, a size of the sphere is stored. In the language column, a language printed on the sphere is stored.

FIG. 35 is an explanatory diagram used for explaining an operation of the AR system of Embodiment 4. For example, for an overseas travel or a domestic travel, an airline company offers a service for providing movies, music and the like to a passenger. The airline company distributes or sells an earth ball 3 different among passengers depending on the attributes, such as the nationality, the age and the sex, of each passenger. For example, the earth ball 3 of English version is distributed to a European or American passenger, and the earth ball 3 of Japanese version is distributed to a Japanese passenger. Besides, the earth ball 3 with a small size may be distributed to a child.

Specifically, a control unit 21 of a terminal 2 of the airline company (which terminal 2 will be hereinafter referred to as the airline company terminal 2) specifies a sphere ID of the earth ball 3 by reading a QR code photographed with an imaging unit 27 of the airline company terminal 2. It is noted that the method for specifying the sphere ID is not limited to the QR code, but the sphere ID may be specified by a one-dimensional code or another two-dimensional code, or may be specified by manual input. Alternatively, the sphere ID may be specified based on AR marker information included in a photographed image of the earth ball 3. For example, the control unit 21 of the airline company terminal 2 obtains a photographed image of the earth ball 3 including an AR marker photographed with the imaging unit 27 of the airline company terminal 2. The control unit 21 of the airline company terminal 2 may recognize the AR marker included in the obtained photographed image to specify the sphere ID in accordance with the recognized AR marker. When letters used in names of seas, continents, countries or cities in the map correspond to AR markers, the sphere ID can be specified in accordance with the language of the letters by using the sphere DB 146 of the mass storage unit 14. Incidentally, the sphere ID is discriminated using the QR code, the letters or the AR marker provided on the earth ball 3 in this example, which does not limit the present disclosure. Different applications may be prepared respectively for different types of the spheres. In this case, the sphere ID can be specified by an application ID transmitted from the terminal 2.

The airline company terminal 2 transmits a user ID of the airline company, and a display image and location information associated with the display image to the server 1 in association with the specified sphere ID of the earth ball 3. The server 1 stores, in the mass storage unit 14 in association with the sphere ID, the user ID of the airline company, and the display image and the location information associated with the display image that are transmitted from the airline company terminal 2.

In this manner, the display image provided by the airline company can be displayed, through the display unit 26 of the terminal 2 of a passenger (which terminal 2 will be hereinafter referred to as the passenger terminal 2), in a superimposed manner on the photographed image of the distributed earth ball 3. For example, the imaging unit 27 of the passenger terminal 2 photographs a QR code provided on the spherical surface of the distributed earth ball 3. The control unit 21 of the passenger terminal 2 reads the photographed QR code to specify the sphere ID. A communication unit 23 of the passenger terminal 2 transmits the specified sphere ID and the user ID of the airline company to the server 1. A control unit 11 of the server 1 obtains a display image corresponding to the sphere ID and the user ID of the airline company thus received, and location information associated with the display image. A communication unit 13 of the server 1 transmits the display image and the location information associated with the display image to the passenger terminal 2. The communication unit 23 of the passenger terminal 2 receives the display image and the location information associated with the display image that are transmitted from the server 1. The control unit 21 of the passenger terminal 2 specifies a spherical position in the photographed image of the earth ball 3 corresponding to the location information associated with the received display image. The control unit 21 of the passenger terminal 2 displays, through a display unit 26 of the passenger terminal 2, the received display image to be superimposed in the specified spherical position.

Figure 36:
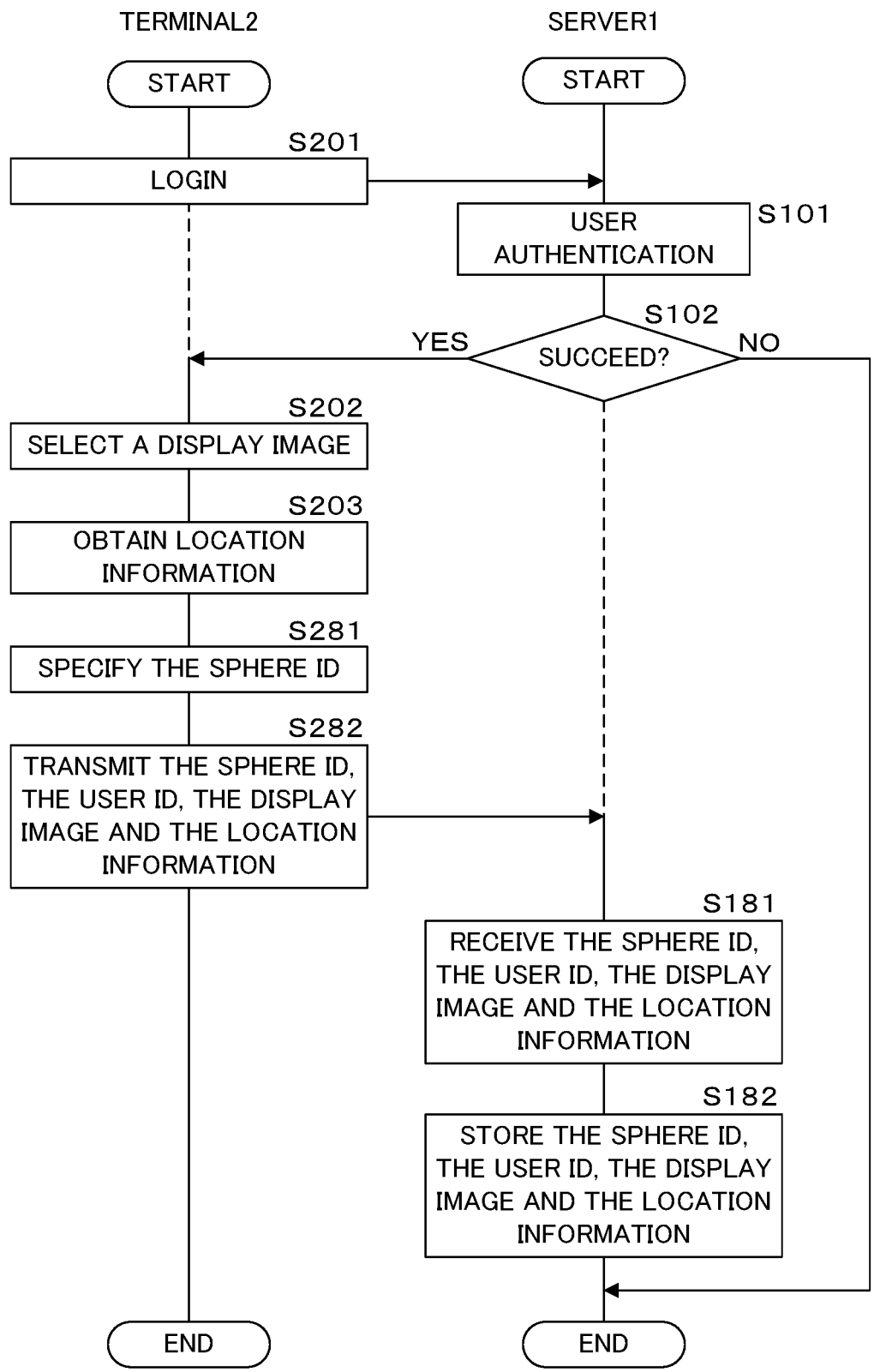
FIG. 36 is a flowchart illustrating procedures in processing for transmitting a display image based on a sphere ID by a terminal of Embodiment 4.

FIG. 36 is a flowchart illustrating procedures in processing for transmitting a display image based on a sphere ID by the terminal 2 of Embodiment 4. Procedures common to those illustrated in FIG. 11 are not described here with like reference signs used. The control unit 21 of the terminal 2 specifies the sphere ID (step S281), and associates, with the specified sphere ID, the user ID, the selected display image and the location information associated with the display image. The communication unit 23 of the terminal 2 transmits the sphere ID, the user ID, the display image and the location information associated with the display image to the server 1 (step S282). The communication unit 13 of the server 1 receives the sphere ID, the user ID, the display image and the location information associated with the display image that are transmitted from the terminal 2 (step S181). The control unit 11 of the server 1 stores the user ID, the display image and the location information associated with the display image thus received in the mass storage unit 14 in association with the sphere ID received (step S182).

Figure 37:
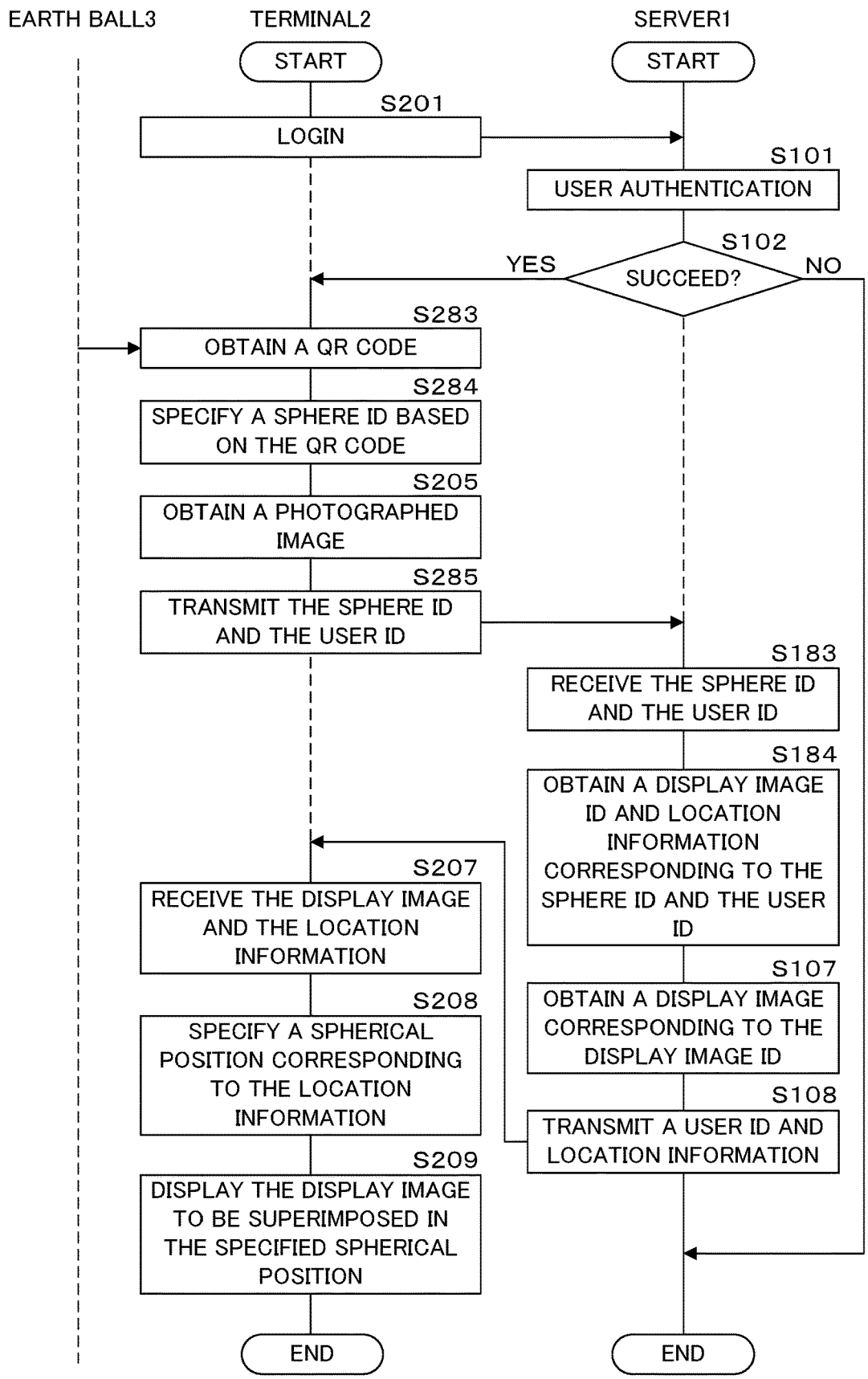
FIG. 37 is a flowchart illustrating procedures in processing for receiving a display image based on a sphere ID by the terminal of Embodiment 4.

FIG. 37 is a flowchart illustrating procedures in processing for receiving a display image based on a sphere ID by the terminal 2 of Embodiment 4. Procedures common to those illustrated in FIG. 12 are not described here with like reference signs used. It is noted that the procedures of the processing are described here on the assumption that the sphere ID is specified by using a QR code. The imaging unit 27 of the terminal 2 photographs a QR code provided on the surface of the earth ball 3. The control unit 21 of the terminal 2 obtains a QR code from the photographed image of the QR code on the spherical surface of the photographed earth ball 3 (step S283). The control unit 21 of the terminal 2 specifies a sphere ID based on the obtained QR code (step S284). The communication unit 23 of the terminal 2 transmits the specified sphere ID and the user ID to the sever 1 (step S285). The communication unit 13 of the server 1 receives the sphere ID and the user ID that are transmitted from the terminal 2 (step S183). The control unit 11 of the server 1 obtains, from the user DB 141 of the mass storage unit 14, a display image ID and location information corresponding to the sphere ID and the user ID thus received (step S184).

According to the present embodiment, the AR system can be employed for a plurality of types of spheres. When display images, music and the like are transmitted/received to/from a server with respect to each sphere ID, diversified or multipurpose services can be provided. In addition, an original earth ball 3 can be provided as a novelty good or a product of a company or the like.

Embodiment 5

In the present embodiment, an example where a medal is used as a display image will be described. When the Olympic Games, sporting events and the like are held, the number of medals won by each country with respect to each athlete and each type of medals is announced. In the present embodiment, medals are displayed in a superimposed manner on a photographed image of an earth ball 3.

FIG. 38 is a block diagram illustrating a structure example of a server 1 of Embodiment 5. Components common to those illustrated in FIG. 2 are not described here with like reference signs used. A mass storage unit 14 includes a medal DB 147. The medal DB 147 stores the number of medals won by each country with respect to each type of medals.

FIG. 39 is an explanatory diagram illustrating an example of a record layout of a display image DB 142 of Embodiment 5. Elements common to those illustrated in FIG. 4 are not described here. In the present embodiment, the display image DB 142 stores a display image of a national flag, a building, a landscape or the like representing each country, and a display image of each medal. For example, a display image p6 is a three-dimensional display image of a medal, and a display image p7 is a display image of a national flag of Japan.

FIG. 40 is an explanatory diagram illustrating an example of a record layout of the medal DB 147. The medal DB 147 includes a country column and a medal column. The country column includes a name column and an image ID1 column. In the name column, the name of each country is stored. It is noted that a code of the country may be stored instead of the name in the name column. In the image ID1 column, an ID of a display image representing the country is stored. The medal column includes a gold column, a silver column, a bronze column and an image ID2 column. In the gold column, the number of won gold medals is stored. In the silver column, the number of won silver medals is stored. In the bronze column, the number of won bronze medals is stored. In the image ID2 column, an ID of the display image of the medal is stored.

Now, the outline of processing for transmitting the number of won medals and the name of a country using a user terminal 2 will be described. A control unit 21 of the terminal 2 accepts selection of a display image of a medal and a display image of each country having won the medal to be displayed in a superimposed manner on a photographed image of the earth ball 3. The control unit 21 obtains the number of won medals with respect to each type of medals and the name of the country input through an input unit 25. Incidentally, the control unit 21 may receive, through a communication unit 23 from an external apparatus not shown, the number of won medals with respect to each type of medals and the name of the country. The control unit 21 of the terminal 2 obtains location information of the country based on the name of the country. Incidentally, the processing for obtaining the location information may be performed in the same manner as the processing for obtaining the location information of Embodiment 1. For example, the location information associated with the display image of the country may be manually input through the input unit 25 of the terminal 2. The control unit 21 transmits, through the communication unit 23 to the server 1, the accepted display image, the obtained location information of the country, the number of won medals with respect to each type of medals and the name of the country in association with a user ID.

In the present embodiment, the terminal 2 transmits the display image and the location information of each country to the server 1, which does not limit the present disclosure. For example, the terminal 2 may transmit, to the server 1, the number of won medals with respect to each type of medals and the name of the country alone. In this case, the server 1 may obtain, based on the received name of the country, the location information of the country and the display image of the country precedently prepared.

The server 1 stores, in the mass storage unit 14, the display image, the location information of the country, the number of won medals with respect to each type of medals and the name of the country that are transmitted from the terminal 2. Specifically, the control unit 11 of the server 1 assigns a unique display image ID to the display image of the medal, and stores a user ID and the display image ID of the medal as one record in a user DB 141. The control unit 11 stores the display image ID and data of the display image as one record in the display image DB 142. The control unit 11 of the server 1 stores the number of medals won by each country with respect to each type of medals as one record in the medal DB 147.

Subsequently, processing for displaying the display image having been transmitted by a user by using the user terminal 2 for browsing the number of medals won by each country with respect to each type of medals will be described. The control unit 21 of the terminal 2 obtains the user ID for registering the number of medals won by each country with respect to each type of medals, and transmits the user ID to the server 1 through the communication unit 23. It is noted that the processing for obtaining a user ID is performed in the same manner as the processing for obtaining a user ID of Embodiment 1 and hence is not described here.

A communication unit 13 of the server 1 receives the user ID transmitted from the terminal 2. The control unit 11 of the server 1 retrieves the received user ID from the user DB 141 of the mass storage unit 14, and obtains a display image ID and location information corresponding to the user ID. The control unit 11 obtains a display image corresponding to the display image ID from the display image DB 142. The control unit 11 obtains the number of won medals with respect to each type of medals from the medal DB 146. The communication unit 13 transmits, to the terminal 2, the obtained display image, the location information of the country, the number of won medals with respect to each type of medals and the name of the country thus obtained.

Figure 41:
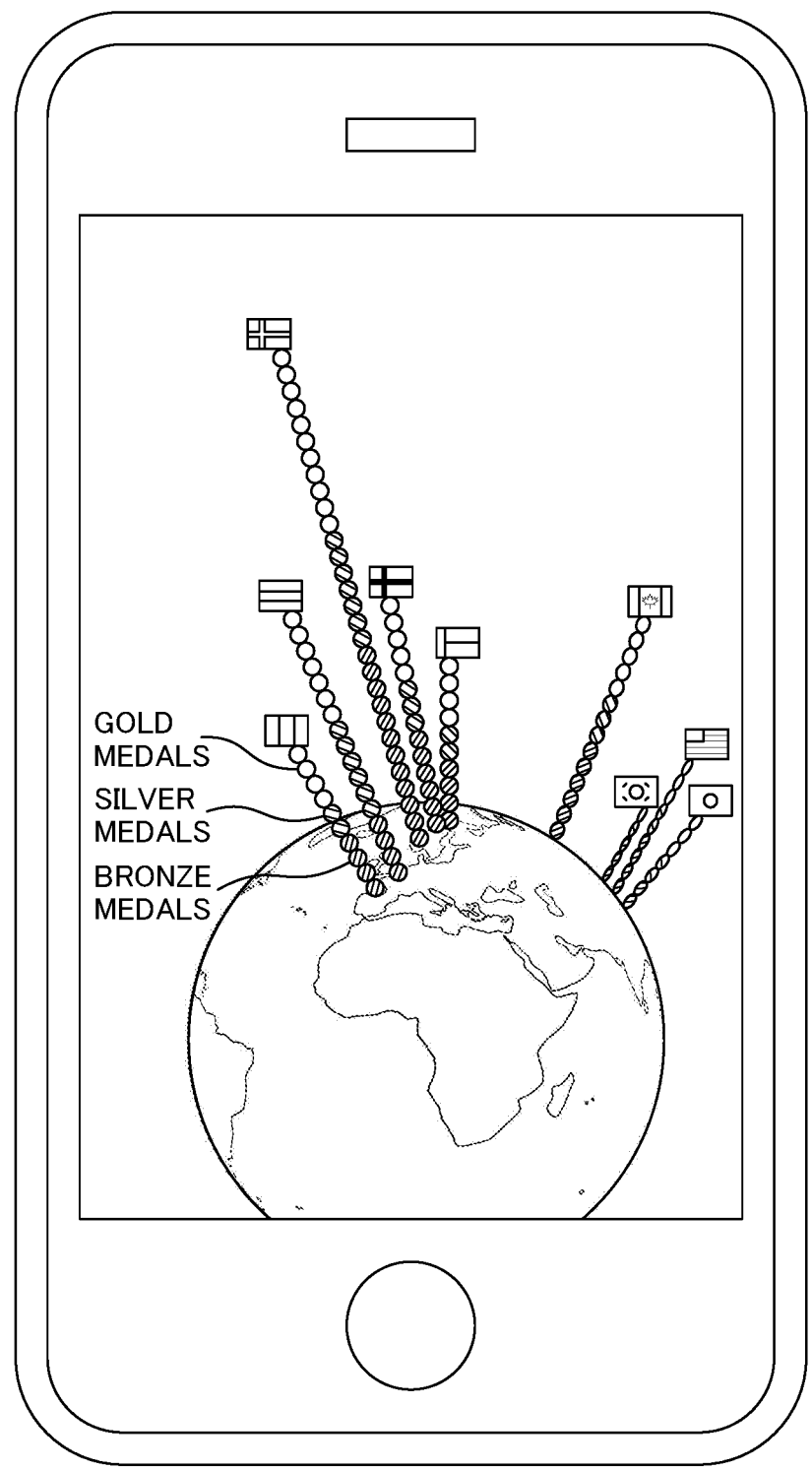
FIG. 41 is an image diagram illustrating a display example of display images of medals.

The communication unit 23 of the terminal 2 receives the display image corresponding to the user ID, the location information of the country, the number of won medals with respect to each type of medals and the name of the country that are transmitted from the server 1. FIG. 41 is an image diagram illustrating a display example of the display images of the medals. It is noted that a blank circle indicates a gold medal, a right-hatched circle indicates a silver medal and a left-hatched circle indicates a bronze medal as illustrated in this drawing. The control unit 21 of the terminal 2 specifies a spherical position in the photographed image of the earth ball 3 corresponding to the received location information of the country. The control unit 21 stacks the display images of the medals, respectively colored in accordance with the types of the medals, on the basis of the number of medals won by the country, and displays resultant to be superimposed in the specified spherical position through a display unit 26.

Now, displaying processing for bronze medals will be described as an example. The control unit 21 obtains the number of won bronze medals and the display image of the medal received. The control unit 21 makes copies of the display image of the medal in number equal to the number of the won bronze medals. For example, if the number of the won bronze medals is three, three copies of the display image of the medal are made. The control unit 21 colors the copies of the display image of the medal in bronze, stacks the copies in substantially vertical direction on the spherical surface of the earth ball 3 in the photographed image, and displays the resultant to be superimposed in a spherical position in the photographed image corresponding to the location information of the country. It is noted that display image data of each of a bronze medal, a silver medal and a gold medal may be precedently prepared.

Following the displaying processing for the display image of the bronze medal, the displaying processing for the display image of the silver medal and for the display image of the gold medal is performed. The displaying processing for the silver medal and the gold medal is not described here because it can be performed in a similar manner to that for the bronze medal. After performing the displaying processing for the gold medal, the control unit 21 displays a display image of the national flag of the country in such a manner that the flag is stacked on the display image of the gold medal. Incidentally, the displaying position of the national flag is not limited to one above the display image of the gold medal but may be, for example, between any of the display images of the medals. Besides, instead of the display image of the national flag, the name of the country may be displayed in the form of a character string. Although the displaying processing is performed in the order of the bronze medal, the silver medal and the gold medal in the present embodiment, which does not limit the present disclosure. For example, the displaying processing may be performed in the order of, for example, the gold medal, the silver medal and the bronze medal, or may be performed in a random order.

The display images of the respective medals are displayed in the corresponding colors in the present embodiment, which does not limit the present disclosure. For example, the display images of the medals may be provided with corresponding words of "gold", "silver" and "bronze" to be displayed. Incidentally, the display images of the medals are stacked in accordance with the number of won medals to be superimposed on the photographed image of the earth ball 3 in the present embodiment, which does not limit the present disclosure. For example, the terminal 2 may use a display image in a rectangular parallelepiped shape instead of the display image of the medal, so as to display the rectangular parallelepiped display image with its height adjusted in accordance with the number of won medals.

Figure 42:
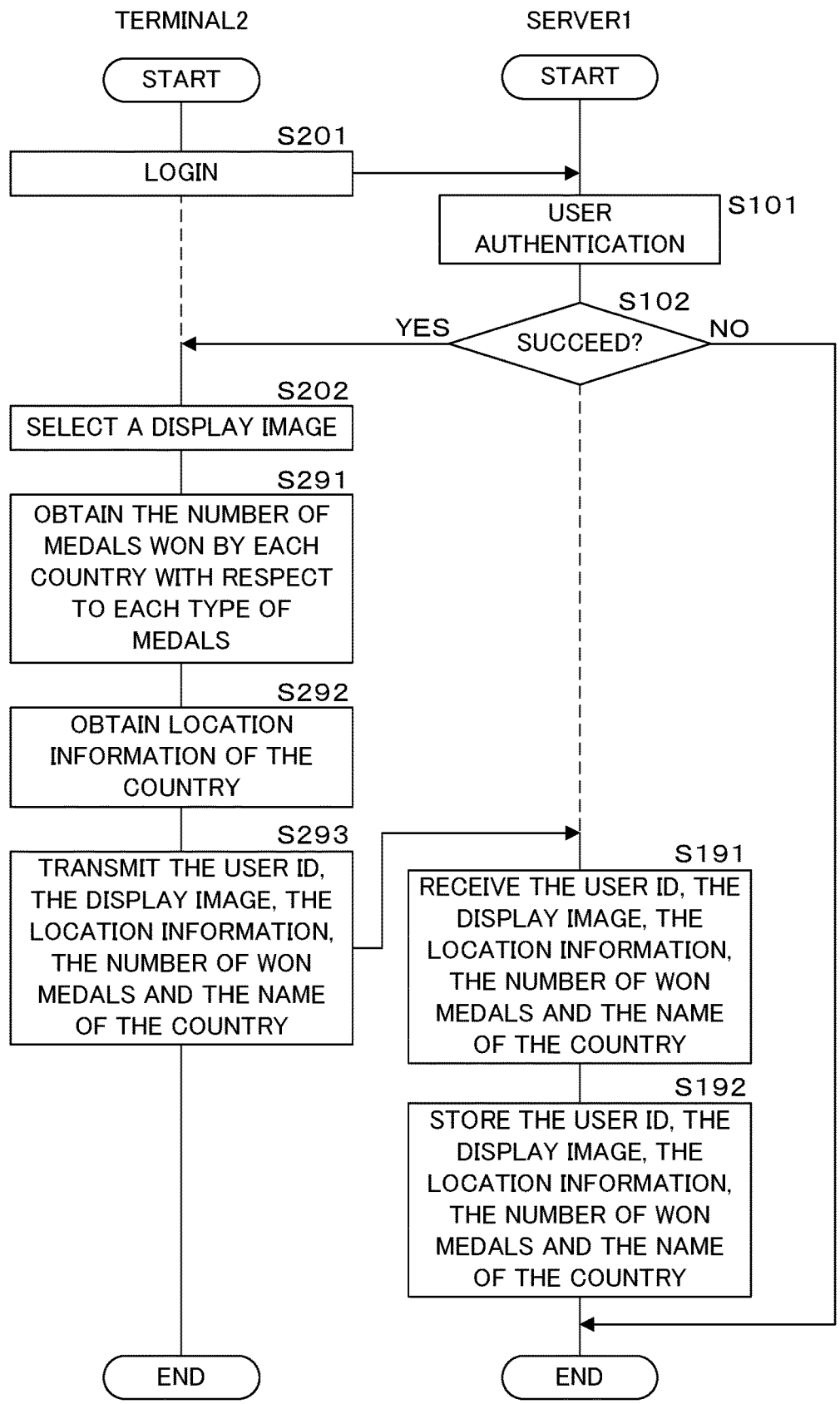
FIG. 42 is a flowchart illustrating procedures in processing for transmitting the number of medals won by each country with respect each type of medals by a terminal of Embodiment 5.

FIG. 42 is a flowchart illustrating procedures in processing for transmitting the number of medals won by each country with respect to each type of medals by the terminal of Embodiment 5. Procedures common to those illustrated in FIG. 11 are not described here with like reference signs used. The control unit 21 of the terminal 2 obtains the number of medals won by each country with respect to each type of medals through the input unit 25 (step S291). The control unit 21 obtains location information of the country based on the name of the country (step S292). The control unit 21 transmits, to the server 1 through the communication unit 23, the display image, the location information of the country, the number of won medals with respect to each type of medals and the name of the country in association with the user ID (step S293). The communication unit 13 of the server 1 receives the user ID, the display image, the location information of the country, the number of won medals with respect to each type of medals, and the name of the country that are transmitted from the terminal 2 (step S191). The control unit 11 of the server 1 stores, in the mass storage unit 14 in association with the user ID, the display image, the location information of the country, the number of won medals with respect to each type of medals and the name of the country thus received (step S192).

Figure 43:
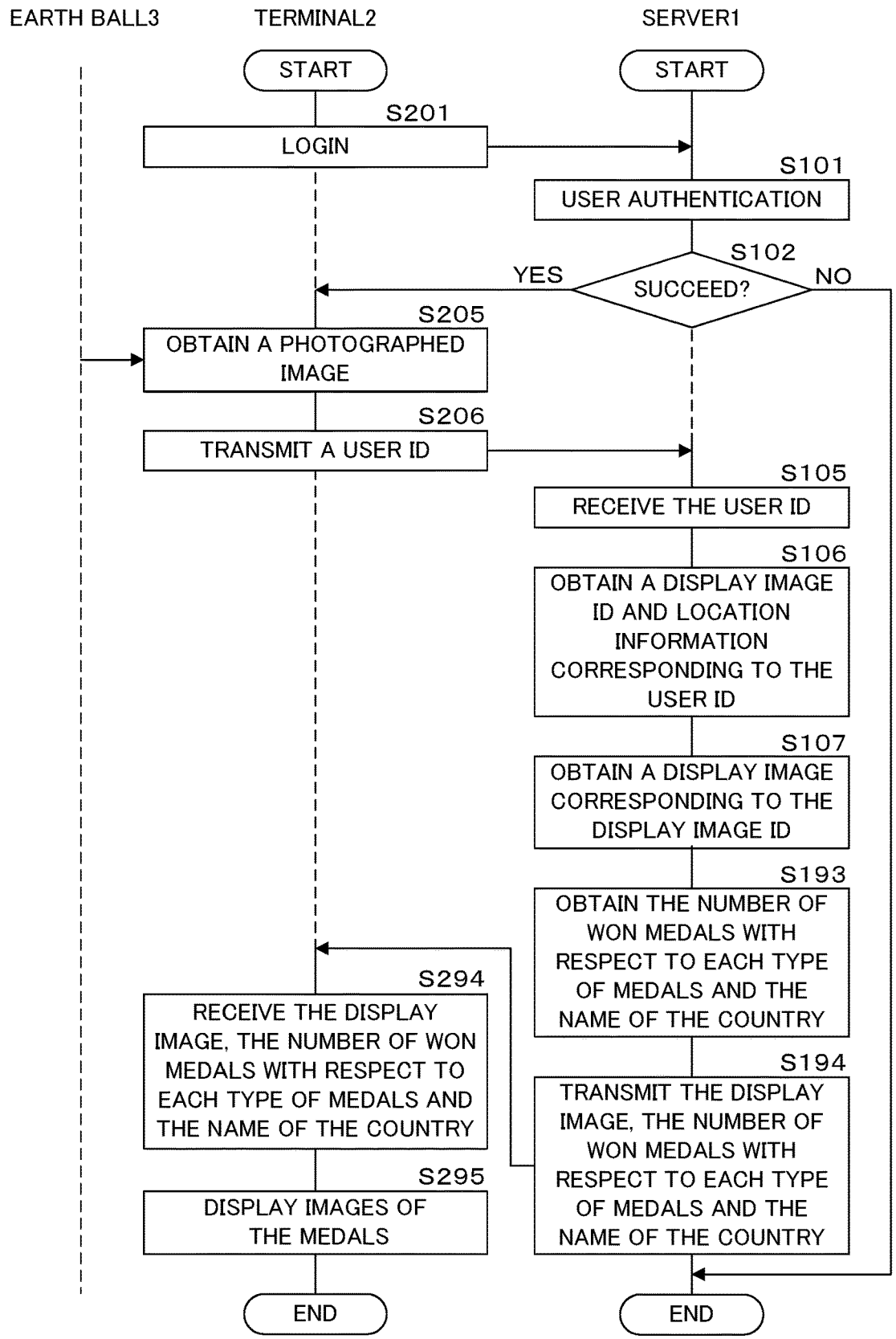
FIG. 43 is a flowchart illustrating procedures in processing for receiving the number of medals won by each country with respect to each type of medals by the terminal of Embodiment 5.

FIG. 43 is a flowchart illustrating procedures in processing for receiving the number of medals won by each country with respect to each type of medals by the terminal of Embodiment 5. Procedures common to those illustrated in FIG. 12 are not described here with like reference signs used. The control unit 11 of the server 1 obtains the number of won medals with respect to each type of medals and the name of the country from the medal DB 147 of the mass storage unit 14 (step S193). The communication unit 13 of the server 1 transmits, to the terminal 2, the display image, the location information of the country, the number of won medals with respect to each type of medals and the name of the country thus obtained (step S194). The communication unit 23 of the terminal 2 receives the display image, the location information of the country, the number of won medals with respect to each type of medals and the name of the country that are transmitted from the server 1 (step S294). The control unit 21 of the terminal 2 displays, based on the display image and the location information of the country received, the display images of the medals and the display image of the national flag to be stacked on the photographed image of the earth ball 3 (step S295). A subroutine for displaying the medals will be described later.

Figure 44:
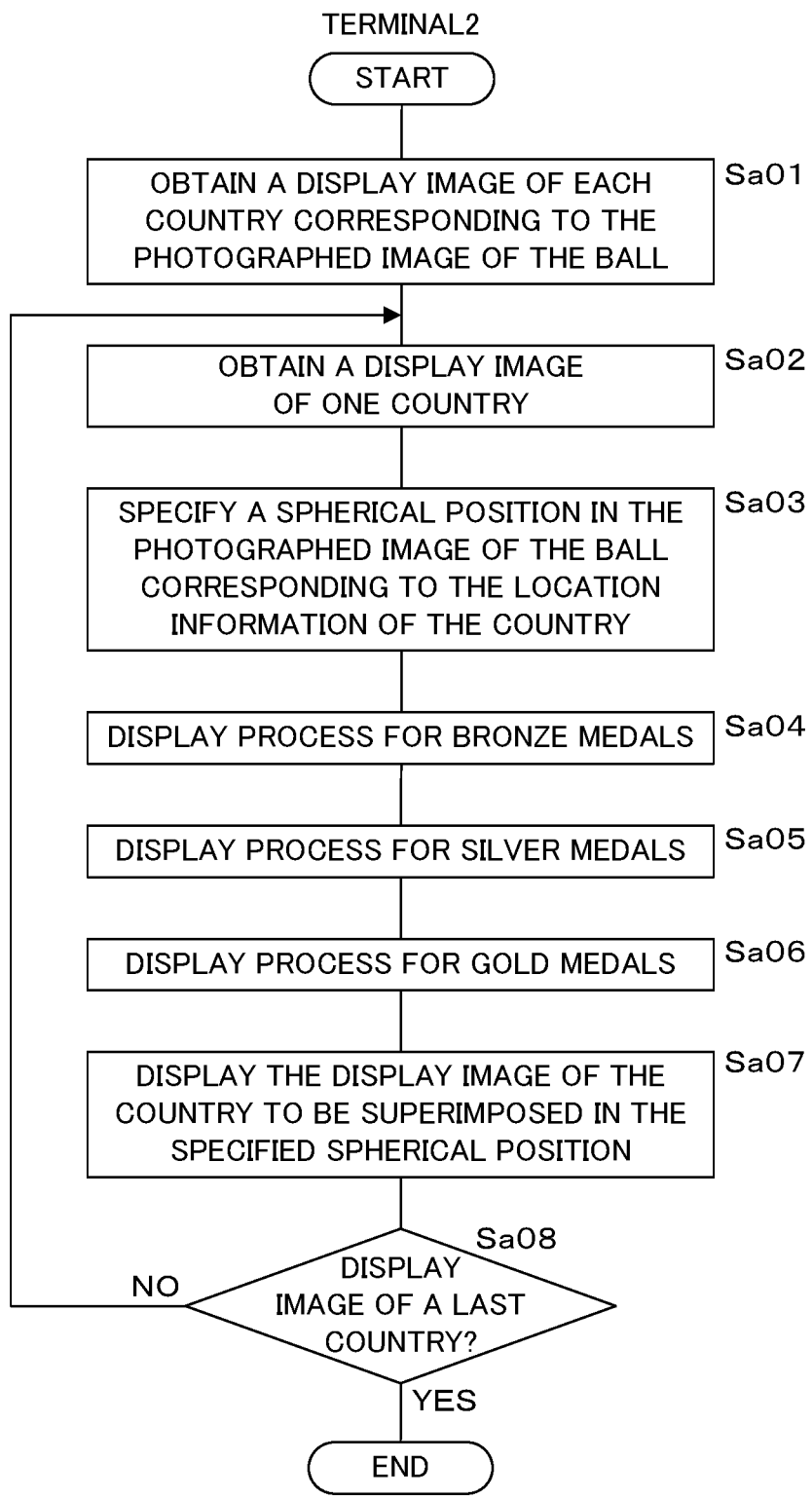
FIG. 44 is a flowchart illustrating procedures in subroutine processing for displaying medals.

FIG. 44 is a flowchart illustrating procedures in the subroutine processing for displaying the medals. The control unit 21 of the terminal 2 obtains, from received display images, a display image of each country included in a region corresponding to the photographed image of the earth ball 3 (step Sa01). For example, the control unit 21 may extract, from received display images, a display image included in a region according with the latitude and longitude of a photographing range of the earth ball 3. The control unit 21 obtains a display image of one country from the obtained display images of the countries (step Sa02). The control unit 21 specifies a spherical position in the photographed image of the earth ball 3 corresponding to the location information of the country (step Sa03).

Subsequently, the control unit 21 performs displaying processing for bronze medals, silver medals and gold medals (steps Sa04 to Sa06). The displaying processing for the respective medals will be described later. The control unit 21 displays the display image of the country to be superimposed in the specified spherical position (step Sa07). The control unit 21 determines whether or not the display image of the current country is a display image of a last one in the region according with the photographed image of the earth ball 3 (step Sa08). If it is determined that the display image of the current country is not the last one (NO in step Sa08), the control unit 21 returns the processing to the procedure for obtaining a display image of a country, and obtains the display image of the next country (step Sa02). If it is determined that the display image of the current country is the last one (YES in step Sa08), the control unit 21 ends the processing.

Figure 45:
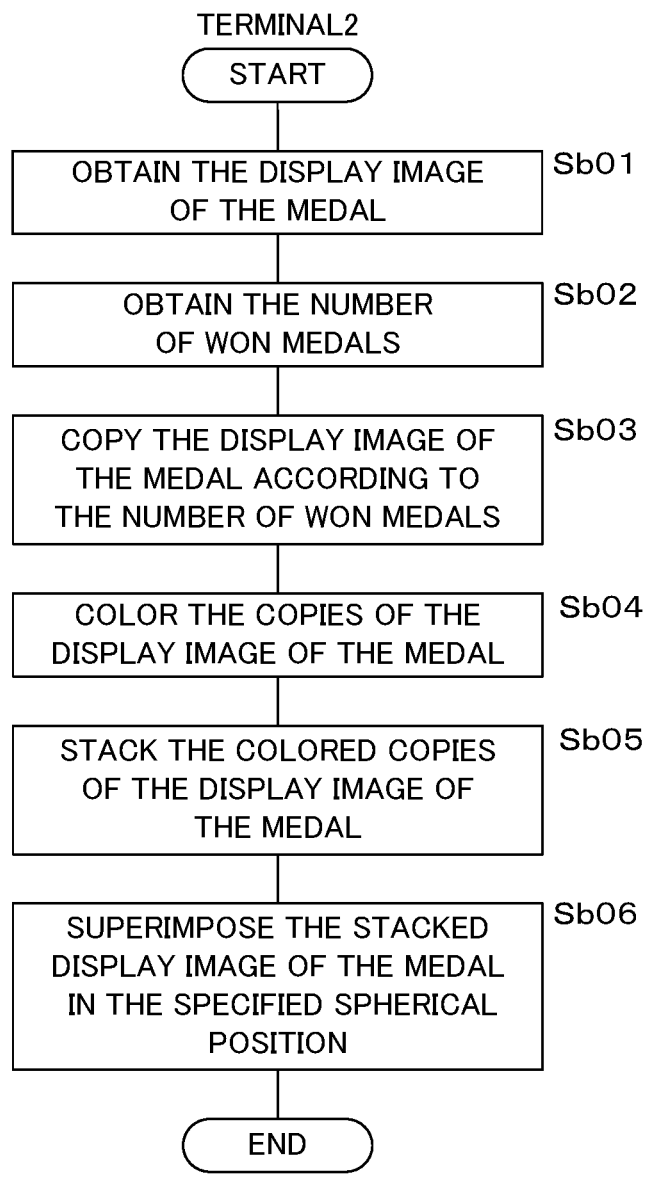
FIG. 45 is a flowchart illustrating procedures in processing for displaying respective types of medals.

FIG. 45 is a flowchart illustrating procedures in the processing for displaying a medal of each type, applicable to the displaying processing for any of gold medals, silver medals and bronze medals. The control unit 21 obtains the received display image of the medal (step Sb01) and obtains the received number of won medals (step Sb02). In the displaying processing for, for example, the gold medal, the control unit 21 obtains the number of gold medals won by the country. The control unit 21 makes copies of the medal in number equal to the number of won medals by using the display image of the medal as an original (step Sb03). For example, if the number of the won gold medals is three, three copies of the display image of the medal are made. The control unit 21 colors the copies of the display image of the medal (step Sb04). In the processing for, for example, the gold medal, the display image of the medal is colored in gold. The control unit 21 stacks the colored copies of the display image of the medal in substantially vertical direction on the spherical surface of the earth ball 3 in the photographed image (step Sb05), and displays the resultant to be superimposed in the specified spherical position in the photographed image together with the display image of the national flag (step Sb06).

Besides, explanation information on each display image can be set. Now, the outline of display of explanation information associated with a display image of a country will be described.

FIG. 46 is an explanatory diagram illustrating an example of a record layout of an explanation information DB 143 of Embodiment 5. Elements common to those illustrated in FIG. 5 are not described here. In the present embodiment, the explanation information DB 143 stores explanation information associated with a display image of a medal and a display image of each country.

Figure 47:
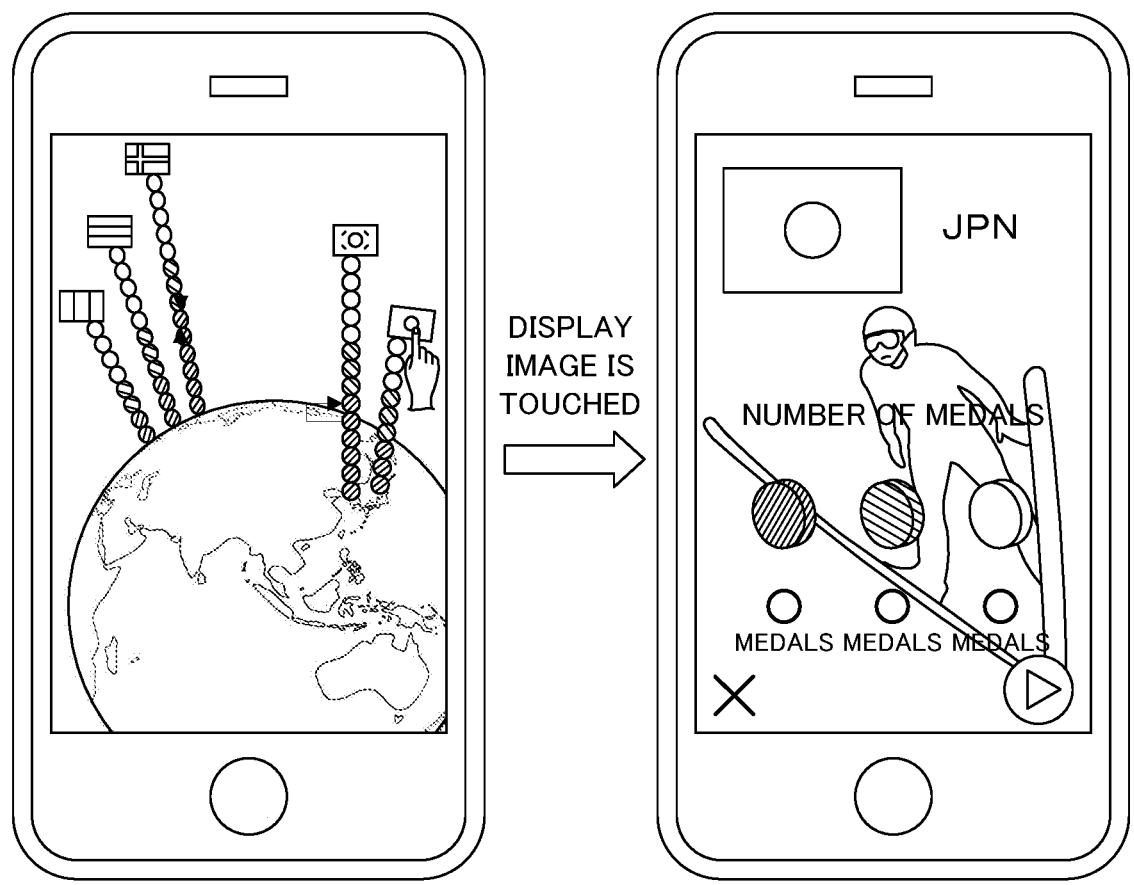
FIG. 47 is an image diagram illustrating a display example of explanation information associated with a display image of a country.

FIG. 47 is an image diagram illustrating a display example of explanation information associated with a display image of a country. In the present embodiment, the explanation information DB 143 stores explanation information in a URL format of "http://www.sports/japanInfo.co.jp" correspondingly to a display image of "Japan". The control unit 11 of the server 1 can obtain, through the communication unit 13, the contents of the explanation information of the above-described URL address from an external apparatus not shown. Incidentally, the explanation information is not limited to the above-described format, but may be precedently prepared in a text format to be stored in the explanation information DB 143. The control unit 11 of the server 1 transmits, through the communication unit 13, the obtained explanation information associated with the display image of "Japan" to the terminal 2. The control unit 21 of the terminal 2 receives, through the communication unit 23, the explanation information associated with the display image of "Japan". When a tapping operation on the display image of "Japan" is accepted through the input unit 25, the control unit 21 of the terminal 2 displays, through the display unit 26, the obtained explanation information in a superimposed manner on the photographed image of the earth ball 3.

Incidentally, the server 1 transmits the contents of the explanation information corresponding to a URL address to the terminal 2 in the present embodiment, which does not limit the present disclosure. For example, the server 1 may transmit explanation information itself in URL format to the terminal 2 so that the terminal 2 may obtain the contents of the explanation information corresponding to the received URL address to be displayed.

According to the present embodiment, the number of won medals, situations of respective events and the like in the Olympic Games or other sporting events are made visible at any time. Besides, since the display images of the medals are displayed in such a manner as to be stacked on the photographed image of the earth ball 3, the number of medals won by each country with respect to each type of medals can be obviously grasped. Furthermore, event information on the Olympic Games or other sporting events, and services for providing audio contents of sports or profiles of athletes can be provided.

Any of the technical features (the constituent features) described in the respective embodiments can be combined with each other, and such a combination can form a new technical feature.

It is to be noted that, as used herein and in the appended claims, the singular forms "a", "an", and "the" include plural referents unless the context clearly dictates otherwise.

It is to be understood that the embodiments disclosed herein are merely illustrative and not restrictive. The scope of the present invention is intended to be defined not by the above description but by the appended claims, and all changes and modifications are intended to be embraced within the scope and equivalents of the appended claims.

What is claimed is:

1. A non-transitory computer readable medium including program instructions which, when executed by a processor, cause a computer to execute a process comprising:
   accepting selection of a display image to be displayed in a superimposed manner on a photographed image of an earth ball having a plurality of markers on a surface thereof, each of the markers being different in shape and being located at a known latitude and a known longitude;
   obtaining location information corresponding to the display image through location designation via a touch panel for the photographed image of the earth ball that is taken with a camera and displayed on the touch panel;
   based on a positional relationship between the location information obtained via the touch panel for the photographed image of the earth ball and the plurality of markers included in the photographed image, obtaining a latitude and a longitude on the earth ball; and
   transmitting in association with a user ID the accepted display image, and the obtained latitude and longitude on the earth ball.

2. The non-transitory computer readable medium according to claim 1, further configured to cause the computer to execute processing for:
   obtaining the photographed image of the earth ball corresponding to the obtained latitude and longitude on the earth ball;
   receiving the display image corresponding to the user ID and the latitude and the longitude associated with the display image; and
   displaying the received display image to be superimposed in a position corresponding to the latitude and the longitude on the earth ball in the photographed image.

3. The non-transitory computer readable medium according to claim 1, further configured to cause the computer to execute processing for:
   receiving a display image ID assigned to the display image transmitted;
   accepting an input of explanation information including speech information or text information corresponding to the display image ID received; and
   transmitting the explanation information in association with the user ID and the display image ID.

4. The non-transitory computer readable medium according to claim 3, further configured to cause the computer to execute processing for:
   receiving the explanation information associated with the user ID and the display image ID; and
   displaying the received explanation information to be superimposed in a position corresponding to the latitude and the longitude on the earth ball in the photographed image, the latitude and the longitude being associated with the display image.

5. The non-transitory computer readable medium according to claim 1, further configured to cause the computer to execute processing for:
accepting setting of publication information of the display image of a type of "open", "not open" or "partly open"; and
transmitting the publication information in association with the user ID and the display image.

6. The non-transitory computer readable medium according to claim 1,
wherein the display image is plural in number, and
the program instructions, when executed by the processor, further cause the computer to execute processing for:
extracting time information from the plurality of display images each including the time information; and
displaying the plurality of display images to be superimposed in positions corresponding to the latitudes and the longitudes on the earth ball in the photographed image, the latitudes and the longitudes being associated with the display images, in a date and time order corresponding to the extracted time information.

7. The non-transitory computer readable medium according to claim 1,
wherein the display image is plural in number, and
the program instructions, when executed by the processor, further cause the computer to execute processing for:
accepting an input of a displaying order of the plural display images; and
displaying the plural display images to be superimposed in positions corresponding to the latitudes and the longitudes on the earth ball in the photographed image, the latitudes and the longitudes being associated with the display images, in the displaying order accepted.

8. The non-transitory computer readable medium according to claim 1,
wherein the display image is plural in number, and
the program instructions, when executed by the processor, further cause the computer to execute processing for:
generating route information based on the latitudes and longitudes associated with the plural display images; and
displaying the generated route information to be superimposed on the earth ball in the photographed image based on positions corresponding to the latitudes and the longitudes on the earth ball in the photographed image.

9. The non-transitory computer readable medium according to claim 1, further configured to cause the computer to execute processing for:
accepting selection of music to be reproduced when an image is displayed in a specific location on the earth ball in the photographed image;
obtaining the latitude and the longitude corresponding to the music; and
transmitting the accepted music and the obtained latitude and longitude on the earth ball in association with the user ID.

10. The non-transitory computer readable medium according to claim 1,
wherein the earth ball is plural in number of types thereof, and
the program instructions, when executed by the processor, further cause the computer to execute processing for:
specifying a sphere ID for identifying the earth ball; and
transmitting the user ID, the display image and the obtained latitude and the longitude on the earth ball in association with the specified sphere ID.

11. The non-transitory computer readable medium according to claim 1, further configured to cause the computer to execute processing for:
obtaining a number of medals won by each country with respect to each type of medal; and
transmitting the number of won medals with respect to each type of medal and a name of the country in association with the user ID.

12. The non-transitory computer readable medium according to claim 11, further configured to cause the computer to execute processing for:
receiving the number of won medals with respect to each type of medal and the name of the country in association with the user ID; and
displaying display images of the medals of the respective types won by the country to be stacked in a position corresponding to the latitude and the longitude of the country on the earth ball in the photographed image.

13. A non-transitory computer readable medium including program instructions which, when executed by a processor, cause a computer to execute a process comprising:
receiving a user ID, a display image to be displayed in a superimposed manner on a photographed image of an earth ball having a plurality of markers on a surface thereof, each of the markers being different in shape and being located at a known latitude and a known longitude, and a latitude and a longitude associated with the display image that is (i) obtained through location designation via a touch panel for the photographed image of the earth ball that is taken with a camera and displayed on the touch panel and (ii) based on a positional relationship between the location designation obtained via the touch panel for the photographed image of the earth ball and the plurality of markers included in the photographed image;
storing the display image and the latitude and the longitude in association with the received user ID;
reading, when the user ID is received, the display image corresponding to the user ID and the latitude and the longitude associated with the display image; and
transmitting the display image and the latitude and the longitude read.

14. The non-transitory computer readable medium according to claim 13, further configured to cause the computer to execute processing for:
receiving the user ID and explanation information associated with the display image;
storing the received explanation information in association with the user ID and the display image;
reading, when the user ID is received, the explanation information associated with the display image corresponding to the user ID; and
transmitting the read explanation information.

15. The non-transitory computer readable medium according to claim 13, further configured to cause the computer to execute processing for:
receiving publication information of a type of "open", "not open" or "partly open" in association with the user ID and the display image;
storing the received publication information in association with the user ID and the display image;
reading, when a second user ID is received, the publication information associated with the display image corresponding to the second user ID;

determining whether or not the display image is to be open based on the read publication information;

reading, if the publication information is determined to be the type of "open" or "partly open", the display image and the latitude and the longitude associated with the display image; and transmitting the display image and the latitude and the longitude read.

16. The non-transitory computer readable medium according to claim 13, wherein the earth ball is plural in number of types thereof, and the program instructions, when executed by the processor, further cause the computer to execute processing for:

receiving a sphere ID for identifying the earth ball, the user ID associated with the sphere ID, the display image and the latitude and the longitude;

storing the user ID, the display image and the latitude and the longitude in association with the received sphere ID;

reading, when the sphere ID and the user ID are received, the display image corresponding to the sphere ID and the user ID and the latitude and the longitude associated with the display image; and transmitting the display image and the latitude and the longitude read.

17. The non-transitory computer readable medium according to claim 13, further configured to cause the computer to execute processing for:

receiving the user ID, the number of won medals with respect each type of medal and a name of a country;

storing, in association with the user ID, the number of won medals and the name of the country received;

reading, when the user ID is received, the number of won medals with respect to each type of medal and the name of the country corresponding to the user ID; and transmitting the number of won medals and the name of the country read.

18. An information processing apparatus, comprising:

a processor executing program code to perform:

receiving a user ID, a display image to be displayed in a superimposed manner on a photographed image of an earth ball having a plurality of markers on a surface thereof, each of the markers being different in shape and being located at a known latitude and a known longitude, and a latitude and a longitude associated with the display image that is (i) obtained through location designation via a touch panel for the photographed image of the earth ball that is taken with a camera and displayed on the touch panel and (ii) based on a positional relationship between the location designation obtained via the touch panel for the photographed image of the earth ball and the plurality of markers included in the photographed image;

storing the display image and the latitude and the longitude in association with the user ID in a storage;

receiving a user ID;

reading, based on the received user ID, the display image and the latitude and the longitude associated with the display image from the storage; and transmitting the display image and the latitude and the longitude.

19. An information processing method for causing an information processing apparatus to perform processing for:

accepting selection of a display image to be displayed in a superimposed manner on a photographed image of an earth ball having a plurality of markers on a surface thereof, each of the markers being different in shape and being located at a known latitude and a known longitude;

obtaining location information corresponding to the display image through location designation via a touch panel for the photographed image of the earth ball that is taken with a camera and displayed on the touch panel;

based on a positional relationship between the location information obtained via the touch panel for the photographed image of the earth ball and the plurality of markers included in the photographed image, obtaining a latitude and a longitude on the earth ball; and transmitting in association with a user ID the accepted display image, and the obtained latitude and longitude on the earth ball.

20. The information processing method according to claim 19, further comprising causing the information processing apparatus to perform processing for:

obtaining the photographed image of the earth ball corresponding to the obtained latitude and longitude on the earth ball;

receiving the display image corresponding to the user ID and the latitude and the longitude associated with the display image; and displaying the received display image to be superimposed in a position corresponding to the latitude and the longitude on the earth ball in the photographed image.

* * * * *